US008190540B2

(12) United States Patent
Kiefer

(10) Patent No.: US 8,190,540 B2
(45) Date of Patent: *May 29, 2012

(54) MULTIMODAL FUSION DECISION LOGIC SYSTEM FOR DETERMINING WHETHER TO ACCEPT A SPECIMEN

(75) Inventor: Fred W. Kiefer, Clarence, NY (US)

(73) Assignee: Ultra-Scan Corporation, Amherst, NY (US)

( * ) Notice: Subject to any disclaimer, the term of this patent is extended or adjusted under 35 U.S.C. 154(b) by 760 days.

This patent is subject to a terminal disclaimer.

(21) Appl. No.: 12/254,699

(22) Filed: Oct. 20, 2008

(65) Prior Publication Data

US 2009/0171623 A1     Jul. 2, 2009

Related U.S. Application Data

(63) Continuation-in-part of application No. 11/876,521, filed on Oct. 22, 2007, now Pat. No. 7,558,765, and a continuation-in-part of application No. 11/273,824, filed on Nov. 15, 2005, now Pat. No. 7,287,013, said application No. 12/254,699 is a continuation-in-part of application No. 11/420,686, filed on May 26, 2006, now Pat. No. 7,440,929, and a continuation-in-part of application No. 11/273,824, filed on Nov. 15, 2005, now Pat. No. 7,287,013.

(60) Provisional application No. 60/970,791, filed on Sep. 7, 2007, provisional application No. 60/643,853, filed on Jan. 14, 2005, provisional application No. 60/685,429, filed on May 27, 2005.

(51) Int. Cl.
*G06K 9/03* (2006.01)
(52) U.S. Cl. .......................... 706/15; 382/116
(58) Field of Classification Search .................... 706/15; 382/116
See application file for complete search history.

(56) References Cited

U.S. PATENT DOCUMENTS

| 5,719,950 | A  | 2/1998  | Osten et al.   |
| 5,850,470 | A  | 12/1998 | Kung et al.    |
| 6,591,224 | B1 | 7/2003  | Sullivan et al.|
| 6,636,621 | B2 | 10/2003 | Thebaud        |

(Continued)

FOREIGN PATENT DOCUMENTS

WO  PCT/US2005/041290     2/2008

(Continued)

OTHER PUBLICATIONS

Duda, et al., Pattern Classification Second Edition, Ch. 2—Bayesian Decision Theory, Ch. 3—Maximum-Likelihood and Bayesian Parameter Estimation, first page of Ch. 4—Nonparametric Techniques, pp. 20-161.
Lindgren, Statistical Theory Third Edition, Ch. 6—Testing Hypotheses, pp. 276-324.
Maltoni, et al., Handbook of Fingerprint Recognition, Springer Professional Computing, Ch. 7—Multimodal Biometric Systems, pp. 233-255.

(Continued)

*Primary Examiner* — Jeffrey A Gaffin
*Assistant Examiner* — Ola Olude Afolabi
(74) *Attorney, Agent, or Firm* — Hodgson Russ LLP

(57) ABSTRACT

The present invention includes a method of deciding whether a data set is acceptable for making a decision. A first probability partition array and a second probability partition array may be provided. One or both of the probability partition arrays may be a Copula model. A no-match zone may be established and used to calculate a false-acceptance-rate ("FAR") and/or a false-rejection-rate ("FRR") for the data set. The FAR and/or the FAR may be compared to desired rates. Based on the comparison, the data set may be either accepted or rejected. The invention may also be embodied as a computer readable memory device for executing the methods.

16 Claims, 27 Drawing Sheets

U.S. PATENT DOCUMENTS

| | | |
|---|---|---|
| 6,655,585 B2 | 12/2003 | Shinn |
| 6,789,069 B1 | 9/2004 | Barnhill et al. |
| 2003/0031348 A1 | 2/2003 | Kuepper et al. |
| 2004/0068342 A1 | 4/2004 | Bedont, Jr. et al. |
| 2004/0075590 A1 | 4/2004 | Pearson |
| 2005/0238207 A1 | 10/2005 | Tavares |
| 2006/0204049 A1 | 9/2006 | Schneider et al. |
| 2006/0206315 A1 | 9/2006 | Hiroe et al. |
| 2008/0104006 A1 | 5/2008 | Kiefer |

FOREIGN PATENT DOCUMENTS

| | | |
|---|---|---|
| WO | PCT/US2007/082130 | 10/2008 |
| WO | PCT/US2008/080529 | 12/2008 |

OTHER PUBLICATIONS

Neyman, et al., On the Problem of the most Efficient Tests of Statistical Hypotheses, 1933, vol. CCXXXI.-A, 702, pp. 289-337.

Osadciw, et al.; Optimum Fusion Rules for Multimodal Biometric Systems; 2004; 28 pages.

Prabhakar, et al., Decision-level Fusion in Biometric Verification, Department of Computer Science and Engineering, Michigan State University, pp. 1-34.

Teoh, et al.; Nearest Neighbourhood Classifiers in Biometric Fusion; International Journal of the Computer, the Internet and Management, vol. 12, No. 1, Jan.-Apr. 2004; pp. 23-36.

Dass, et al.; A Principled Approach to Score Level Fusion in Multimodal Biometric Systems; In: AVBPA 2005, vol. 3546, No. 5; pp. 1049-1058.

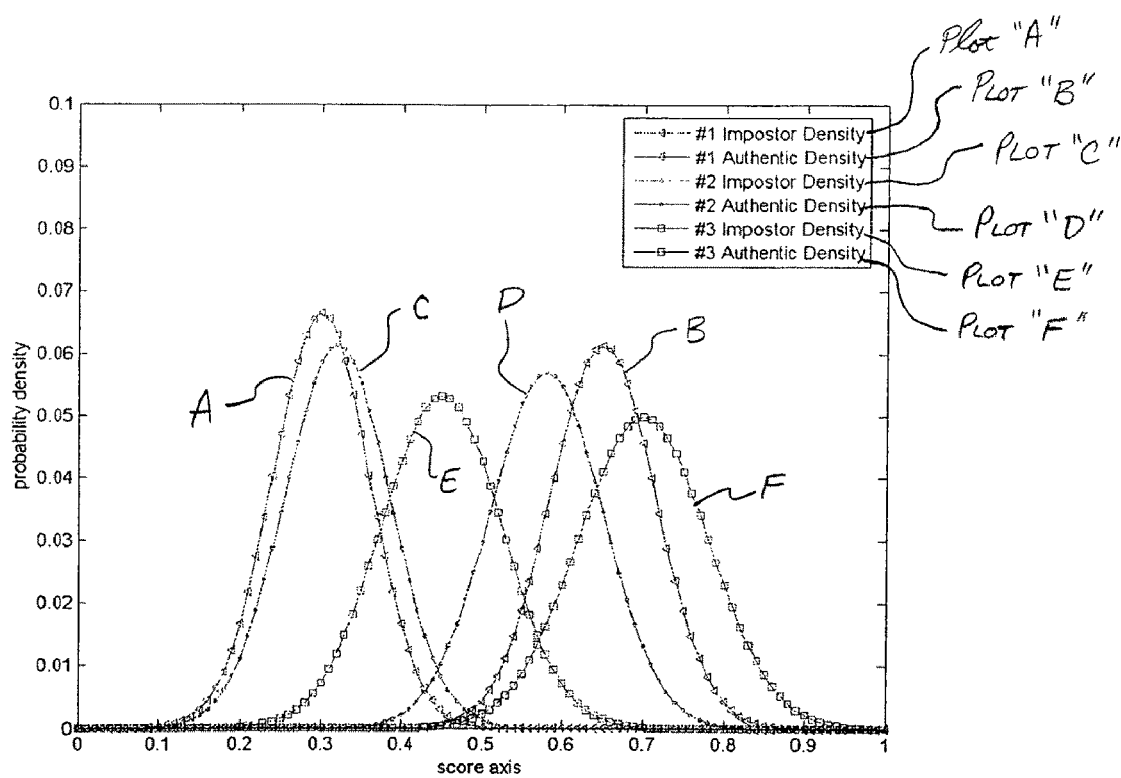
Figure 1  Example PDF for Three Biometrics

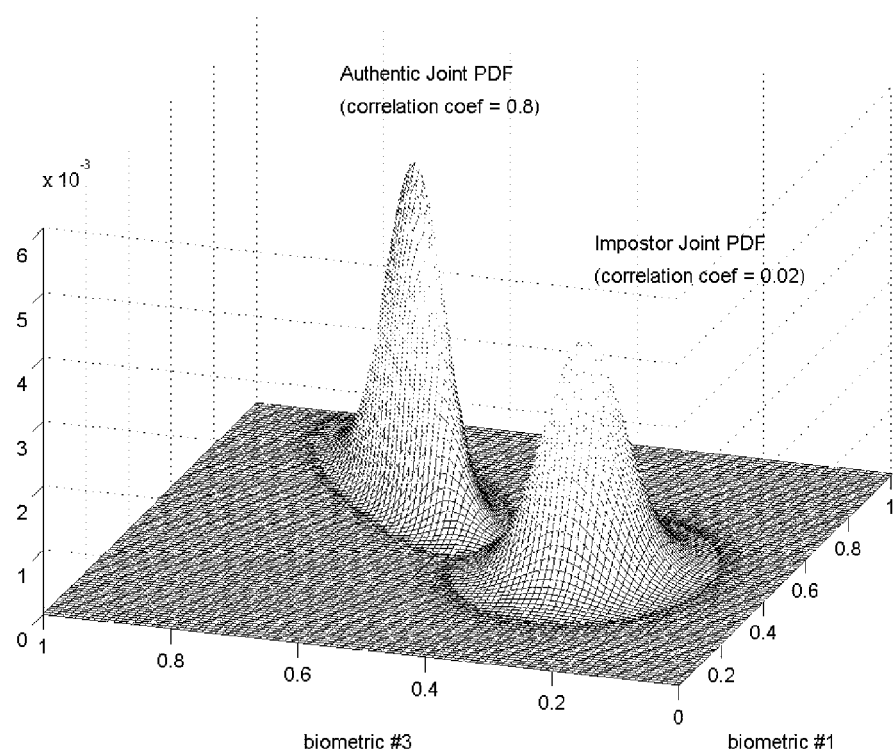
Figure 2  Joint PDF for System #1 + System #2

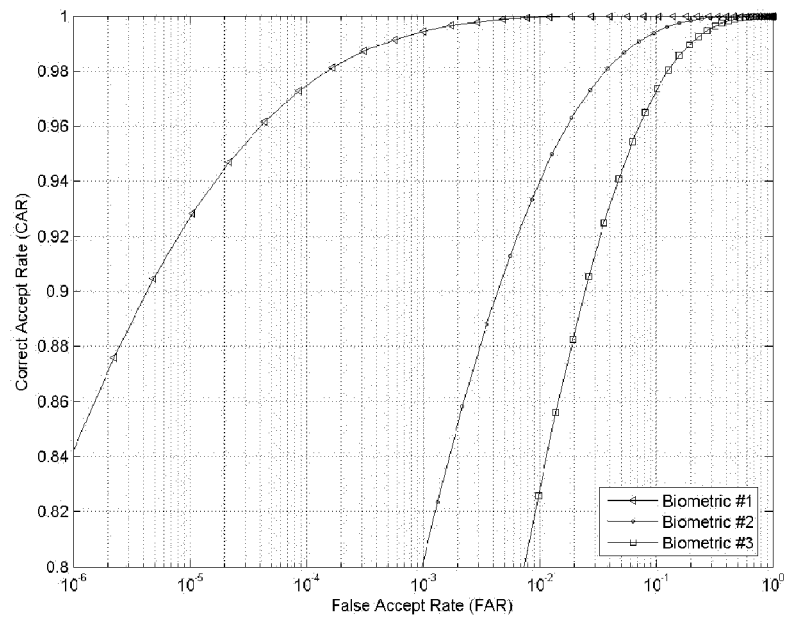
Figure 3 Single System ROC Curves
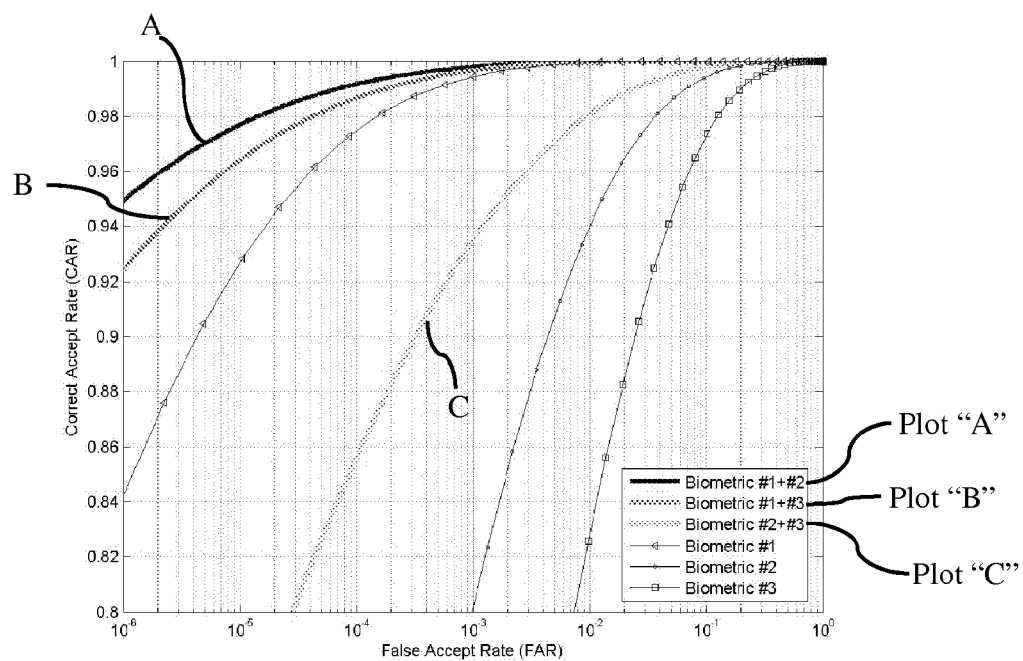
Figure 4 2D Systems Versus Single Systesm

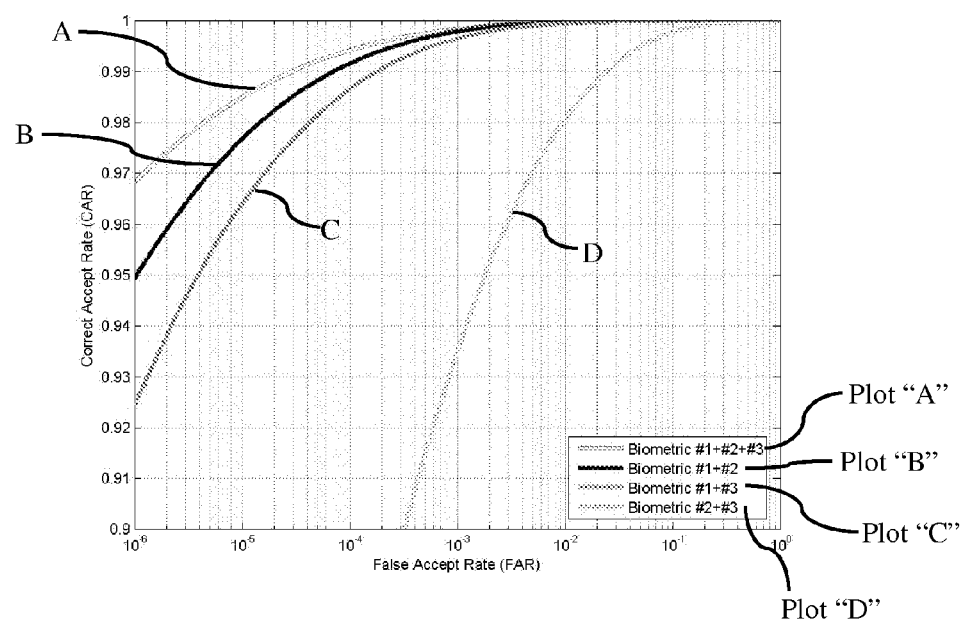
Figure 5 Fusion of All Three Systems

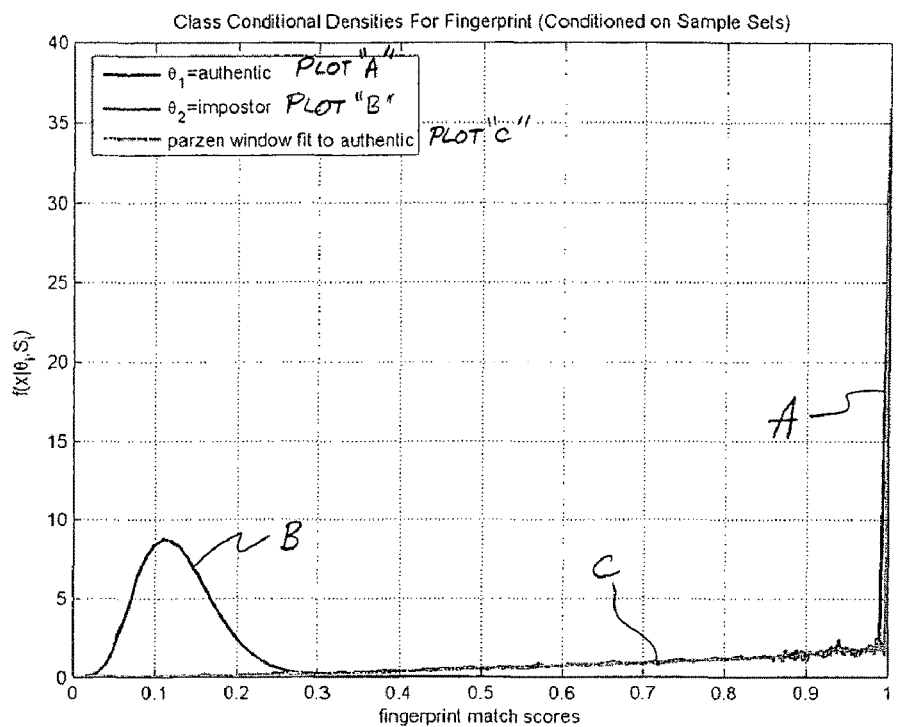
Figure 6 Fingerprint Densities
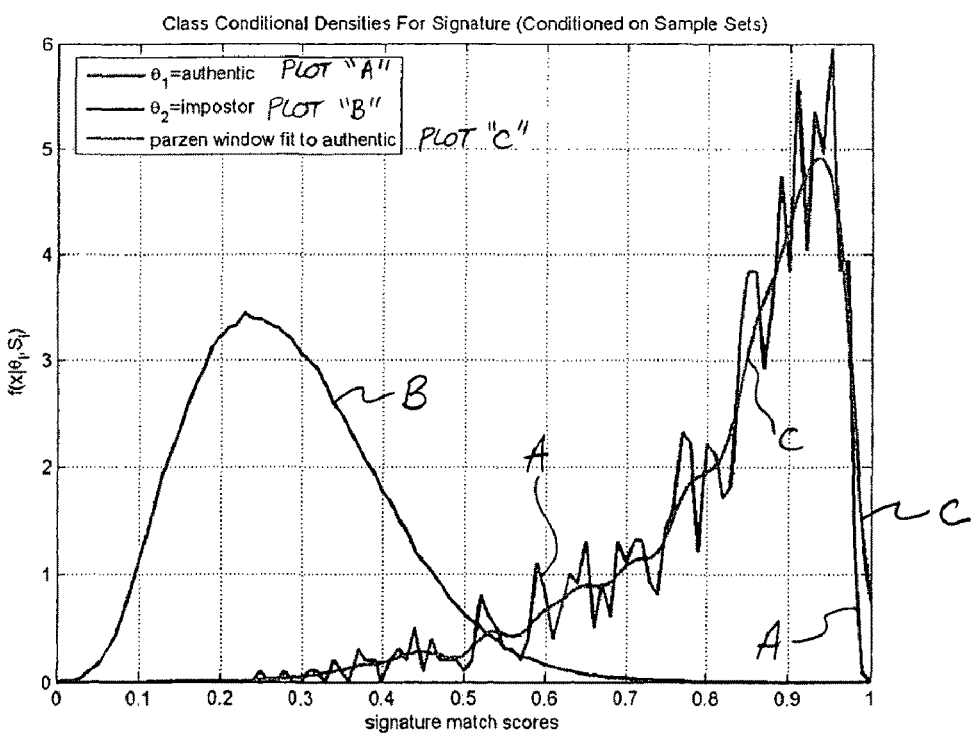
Figure 7 Signature Densities

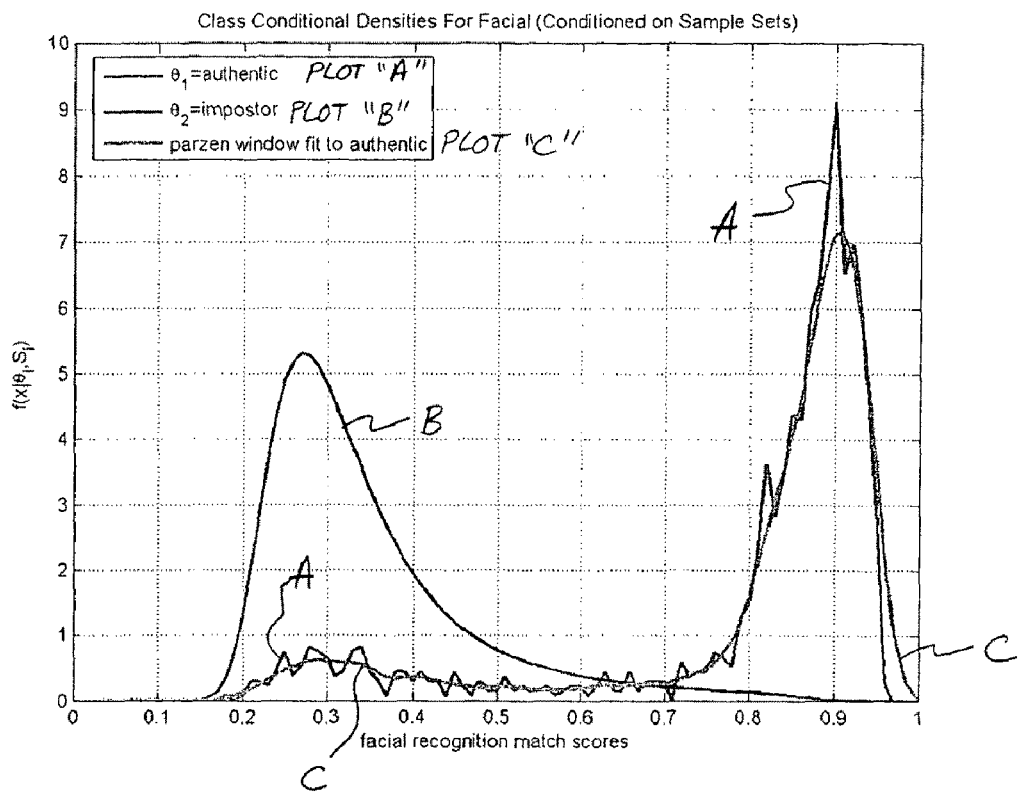
Figure 8 Facial Recognition Densities
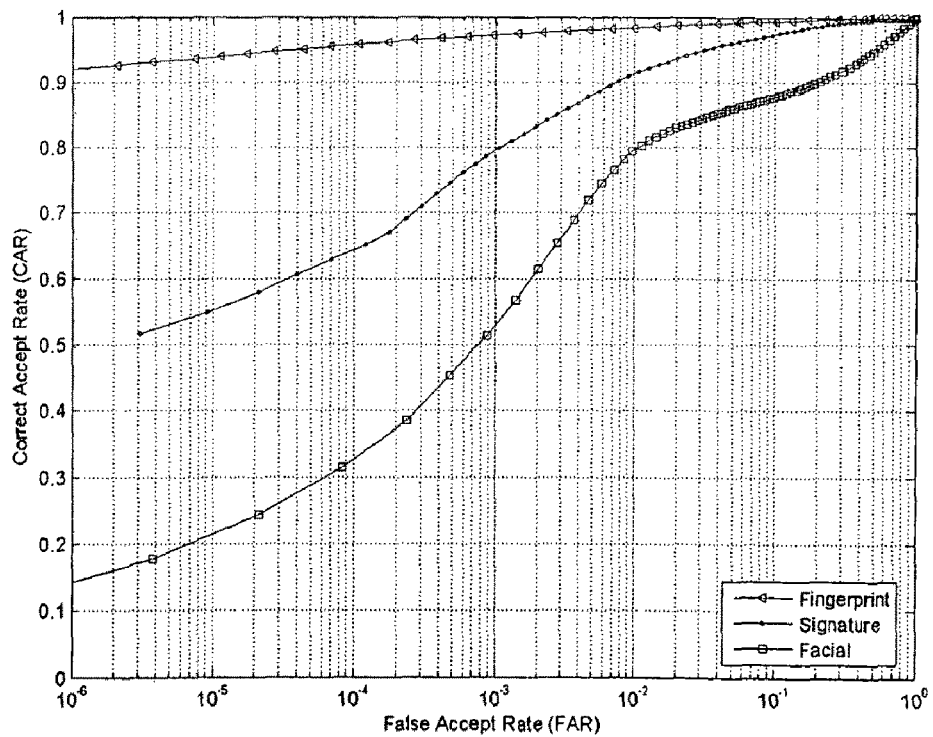
Figure 9 ROC for Individual Biometric Systems

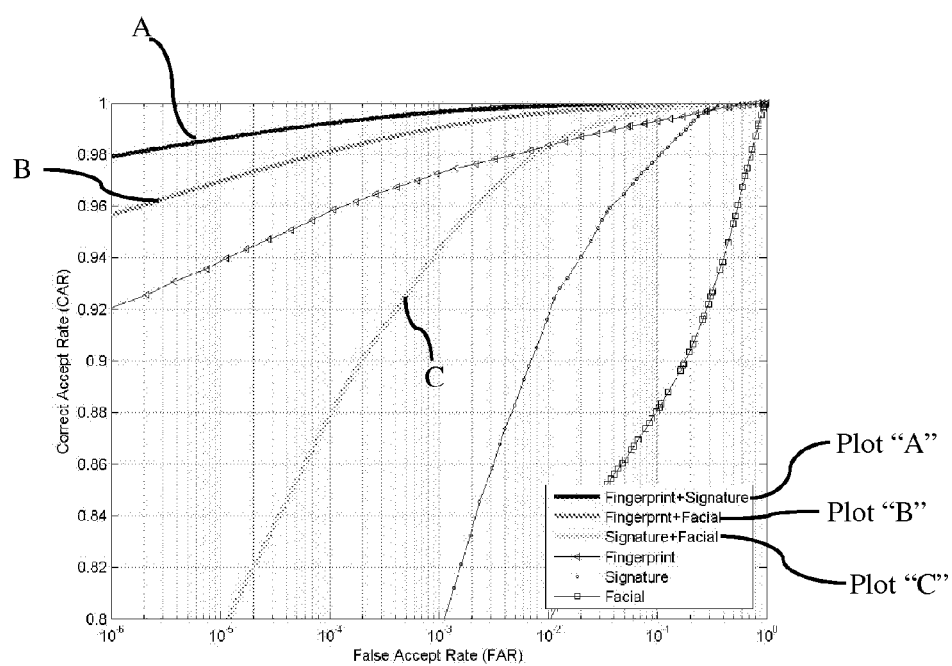
Figure 10  2D ROC - Histogram-Interpolation

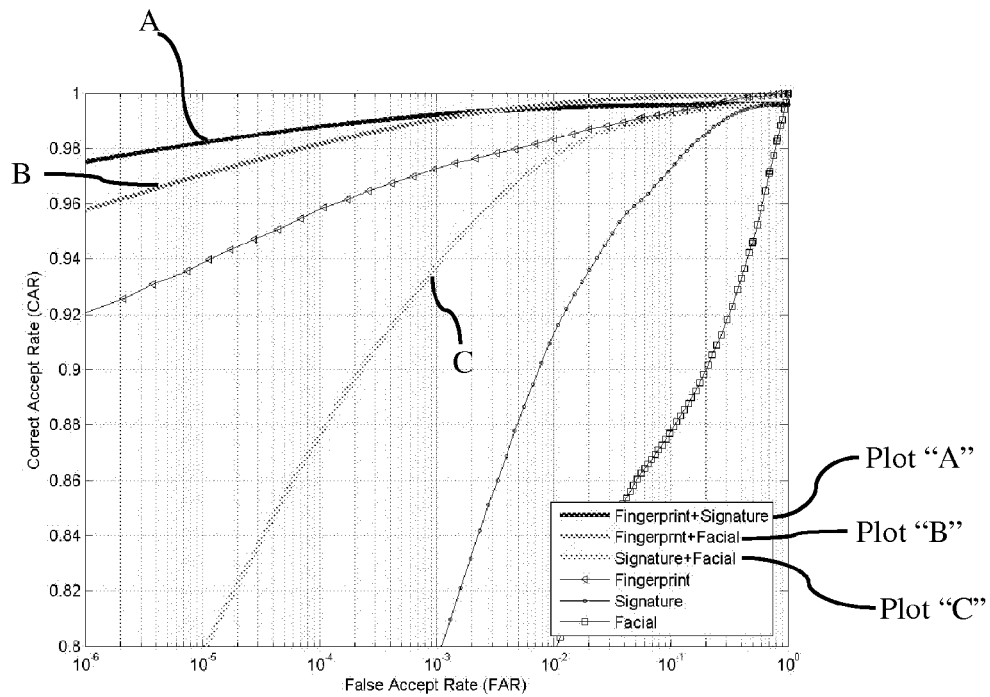
Figure 11 2D ROC - Parzen Window
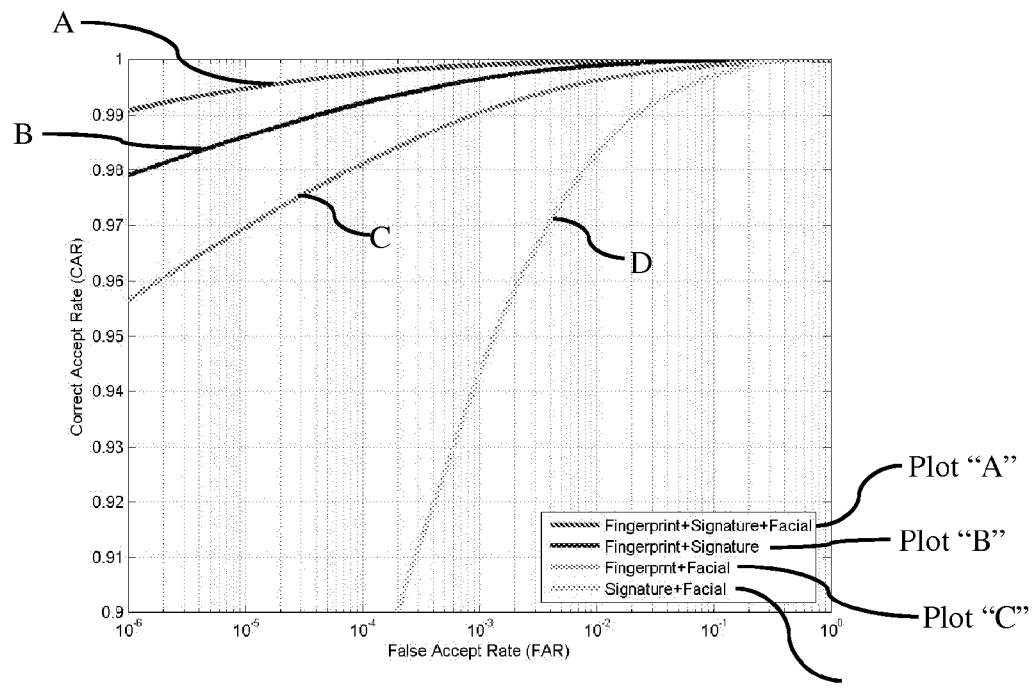
Figure 12 3D ROC - Interpolation Method

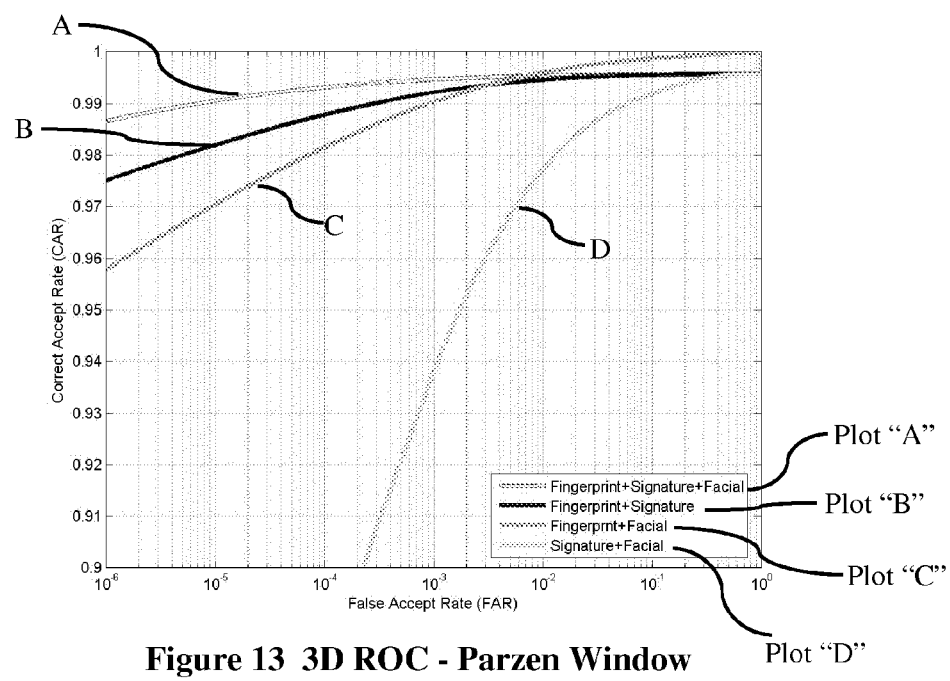
Figure 13 3D ROC - Parzen Window

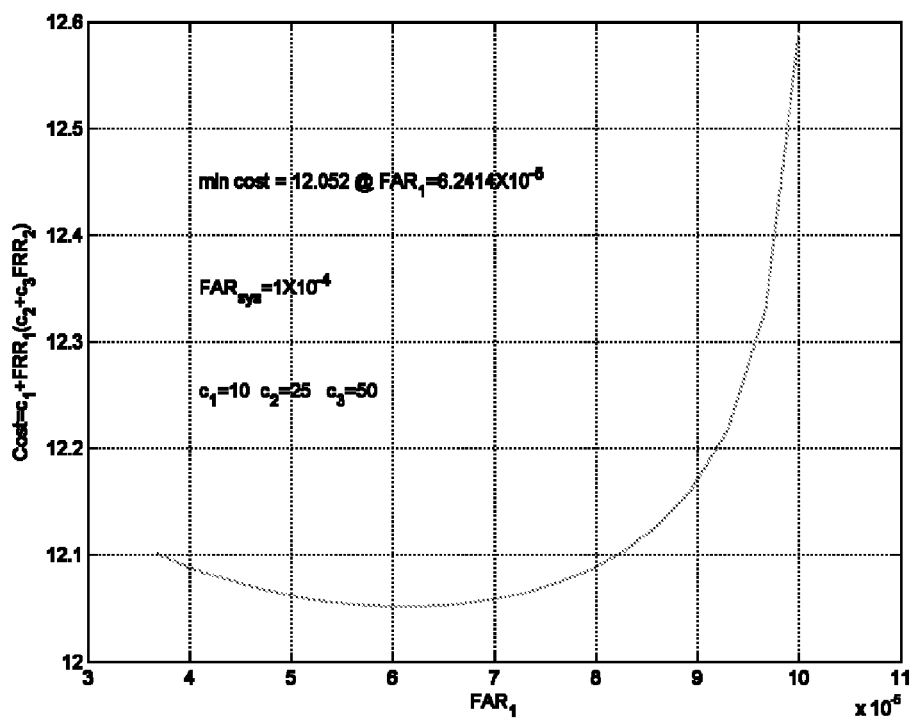
Figure 14 Verification Cost Function

Typical Secure Access Entry Checkpoint Portal with Multimodal Fusion Decision Logic

MULTIMODAL FUSION DECISION LOGIC SYSTEM FOR DETERMINING WHETHER TO ACCEPT A SPECIMEN

CROSS-REFERENCE TO RELATED APPLICATION

This application is a continuation-in-part of and claims the benefit of U.S. patent application Ser. No. 11/876,521 (filed Oct. 22, 2007 now U.S. Pat. No. 7,558,765). Application Ser. No. 11/876,521 claims the benefit of priority to U.S. provisional patent application Ser. No. 60/970,791, filed Sep. 7, 2007. Application Ser. No. 11/876,521 is a continuation-in-part patent application of 11/273,824 (filed Nov. 15, 2005), which issued as U.S. Pat. No. 7,287,013. U.S. Pat. No. 7,287,013 claims priority to 60/643,853, which was filed on Jan. 14, 2005.

This application is also a continuation-in-part of and claims the benefit of U.S. patent application Ser. No. 11/420,686 (filed May 26, 2006) now U.S. Pat. No. 7,440,929. Application Ser. No. 11/420,686 claims the benefit of priority to U.S. provisional patent application Ser. No. 60/685,429, filed May 27, 2005. Application Ser. No. 11/420,686 is a continuation-in-part patent application of 11/273,824 (filed Nov. 15, 2005), which issued as U.S. Pat. No. 7,287,013. U.S. Pat. No. 7,287,013 claims priority to 60/643,853, which was filed on Jan. 14, 2005.

FIELD OF THE INVENTION

The present invention relates to the use of multiple biometric modalities and multiple biometric matching methods in a biometric identification system. Biometric modalities may include (but are not limited to) such methods as fingerprint identification, iris recognition, voice recognition, facial recognition, hand geometry, signature recognition, signature gait recognition, vascular patterns, lip shape, ear shape and palm print recognition.

BACKGROUND OF THE INVENTION

Algorithms may be used to combine information from two or more biometric modalities. The combined information may allow for more reliable and more accurate identification of an individual than is possible with systems based on a single biometric modality. The combination of information from more than one biometric modality is sometimes referred to herein as "biometric fusion".

Reliable personal authentication is becoming increasingly important. The ability to accurately and quickly identify an individual is important to immigration, law enforcement, computer use, and financial transactions. Traditional security measures rely on knowledge-based approaches, such as passwords and personal identification numbers ("PINs"), or on token-based approaches, such as swipe cards and photo identification, to establish the identity of an individual. Despite being widely used, these are not very secure forms of identification. For example, it is estimated that hundreds of millions of dollars are lost annually in credit card fraud in the United States due to consumer misidentification.

Biometrics offers a reliable alternative for identifying an individual. Biometrics is the method of identifying an individual based on his or her physiological and behavioral characteristics. Common biometric modalities include fingerprint, face recognition, hand geometry, voice, iris and signature verification. The Federal government will be a leading consumer of biometric applications deployed primarily for immigration, airport, border, and homeland security. Wide scale deployments of biometric applications such as the US-VISIT program are already being done in the United States and else where in the world.

Despite advances in biometric identification systems, several obstacles have hindered their deployment. Every biometric modality has some users who have illegible biometrics. For example a recent NIST (National Institute of Standards and Technology) study indicates that nearly 2 to 5% of the population does not have legible fingerprints. Such users would be rejected by a biometric fingerprint identification system during enrollment and verification. Handling such exceptions is time consuming and costly, especially in high volume scenarios such as an airport. Using multiple biometrics to authenticate an individual may alleviate this problem.

Furthermore, unlike password or PIN based systems, biometric systems inherently yield probabilistic results and are therefore not fully accurate. In effect, a certain percentage of the genuine users will be rejected (false non-match) and a certain percentage of impostors will be accepted (false match) by existing biometric systems. High security applications require very low probability of false matches. For example, while authenticating immigrants and international passengers at airports, even a few false acceptances can pose a severe breach of national security. On the other hand false non matches lead to user inconvenience and congestion.

Existing systems achieve low false acceptance probabilities (also known as False Acceptance Rate or "FAR") only at the expense of higher false non-matching probabilities (also known as False-Rejection-Rate or "FRR"). It has been shown that multiple modalities can reduce FAR and FRR simultaneously. Furthermore, threats to biometric systems such as replay attacks, spoofing and other subversive methods are difficult to achieve simultaneously for multiple biometrics, thereby making multimodal biometric systems more secure than single modal biometric systems.

Systematic research in the area of combining biometric modalities is nascent and sparse. Over the years there have been many attempts at combining modalities and many methods have been investigated, including "Logical And", "Logical Or", "Product Rule", "Sum Rule", "Max Rule", "Min Rule", "Median Rule", "Majority Vote", "Bayes' Decision", and "Neyman-Pearson Test". None of these methods has proved to provide low FAR and FRR that is needed for modern security applications.

The need to address the challenges posed by applications using large biometric databases is urgent. The US-VISIT program uses biometric systems to enforce border and homeland security. Governments around the world are adopting biometric authentication to implement National identification and voter registration systems. The Federal Bureau of Investigation maintains national criminal and civilian biometric databases for law enforcement.

Although large-scale databases are increasingly being used, the research community's focus is on the accuracy of small databases, while neglecting the scalability and speed issues important to large database applications. Each of the example applications mentioned above require databases with a potential size in the tens of millions of biometric records. In such applications, response time, search and retrieval efficiency also become important in addition to accuracy.

SUMMARY OF THE INVENTION

The present invention includes a method of deciding whether to accept a specimen. For example, a specimen may include two or more biometrics, such as two fingerprints, two iris scans, or a combination of different biometrics, such as a fingerprint and an iris scan. In order to determine whether the specimen is from a particular individual, a dataset of samples may be provided. The data set may have information pieces about objects, each object having a number of modalities, the number being at least two. The modalities may be information about two biometrics that were previously enrolled.

Each object in the data set may include information corresponding to at least two biometric samples that were previously taken from an individual. The information pieces may be scores describing features of the biometric samples.

In one method according to the invention, a first probability partition array ("Pm(i,j)") may be determined. The Pm(i,j) may be comprised of probability values for information pieces in the data set. Each probability value in the Pm(i,j) may correspond to the probability of an authentic match.

Then a second probability partition array ("Pfm(i,j)") may be determined. The Pfm(i,j) may be comprised of probability values for information pieces in the data set, each probability value in the Pfm(i,j) may correspond to the probability of a false match.

The Pfm(i,j) may be similar to a Neyman-Pearson Lemma probability partition array. Further, the Pm(i,j) may be similar to a Neyman-Pearson Lemma probability partition array.

Then the method may be executed so as to identify a first index set ("A"). The indices in set A may be the (i,j) indices that have values in both Pfm(i,j) and Pm(i,j). A no-match zone ("Z∞") may be identified. The Z∞ may include the indices of set A for which Pm(i,j) is equal to zero, and use Z∞ to identify a second index set ("C"), the indices of C being the (i,j) indices that are in A but not Z∞.

Next, a third index set ("Cn") may be identified. The indices of Cn may be the N indices of C which have the lowest λ values. The λ value may equal $$\frac{P_{fm}(i, j)_k}{P_m(i, j)_k},$$

where N is a number for which the following is true:

$$\text{FAR}_{Z_\infty \cup C_N} = 1 - \Sigma_{(i,j) \in Z_\infty} P_{fm}(i,j) - \Sigma_{(i,j) \in C_N} P_{fm}(i,j) \leq \text{FAR}$$

where FAR is the false acceptance rate that is acceptable.

When indices of the specimen are determined, they may be compared to Cn, and if the specimen indices are in Cn, then a decision may be made to accept the specimen as being authentic. In addition, or alternatively, if the indices of the specimen are not in Cn, then a decision may be made to reject the specimen as being not authentic.

Cn may be identified by arranging the (i,j) indices of C such that $$\frac{P_{fm}(i, j)_k}{P_m(i, j)_k} >= \frac{P_{fm}(i, j)_{k+1}}{P_m(i, j)_{k+1}}$$

to provide an arranged C index. The first N indices (i,j) of the arranged C index may be identified as being in Cn.

The invention also may be implemented as a computer readable memory device having stored thereon instructions that are executable by a computer to carry out the method described above. The memory device may be used to decide whether to accept or reject a specimen. The instructions may cause a computer to:

provide a data set having information pieces about objects, each object having a number of modalities, the number being at least two:

determine a first probability partition array ("Pm(i,j)"), the Pm(i,j) being comprised of probability values for information pieces in the data set, each probability value in the Pm(i,j) corresponding to the probability of an authentic match;

determine a second probability partition array ("Pfm(i,j)"), the Pfm(i,j) being comprised of probability values for information pieces in the data set, each probability value in the Pfm(i,j) corresponding to the probability of a false match;

identify a first index set ("A"), the indices in set A being the (i,j) indices that have values in both Pfm(i,j) and Pm(i,j);

identify a no-match zone ("Z∞") that includes the indices of set A for which Pm(i,j) is equal to zero, and use Z∞ to identify a second index set ("C"), the indices of C being the (i,j) indices that are in A but not Z∞;

identify a third index set ("Cn"), the indices of Cn being the N indices of C which have the lowest λ values, where λ equals $$\frac{P_{fm}(i, j)_k}{P_m(i, j)_k},$$

where N is a number for which the following is true:

$$\text{FAR}_{Z_\infty \cup C_N} = 1 - \Sigma_{(i,j) \in Z_\infty} P_{fm}(i,j) - \Sigma_{(i,j) \in C_N} P_{fm}(i,j) \leq \text{FAR}$$

determine indices of the specimen and compare the specimen's indices to Cn; and if the specimen indices are in Cn, then accept the specimen as being authentic.

The memory device may include instructions for causing the computer to identify Cn by arranging the (i,j) indices of C such that $$\frac{P_{fm}(i, j)_k}{P_m(i, j)_k} >= \frac{P_{fm}(i, j)_{k+1}}{P_m(i, j)_{k+1}}$$

to provide an arranged C index, and identifying the first N indices (i,j) of the arranged C index as being in Cn.

The memory device may include instructions for causing the computer to reject the specimen as being not authentic if the specimen indices are not in Cn.

BRIEF DESCRIPTION OF THE DRAWINGS

For a fuller understanding of the nature and objects of the invention, reference should be made to the accompanying drawings and the subsequent description. Briefly, the drawings are:

FIG. 1, which represents example PDFs for three biometrics data sets;

FIG. 2, which represents a joint PDF for two systems;

FIG. 3, which is a plot of the receiver operating curves (ROC) for three biometrics;

FIG. 4, which is a plot of the two-dimensional fusions of the three biometrics taken two at a time versus the single systems;

FIG. 5, which is a plot the fusion of all three biometric systems;

FIG. 6, which is a plot of the scores versus fingerprint densities;

FIG. 7, which is a plot of the scores versus signature densities;

FIG. 8, which is a plot of the scores versus facial recognition densities;

FIG. 9, which is the ROC for the three individual biometric systems;

FIG. 10, which is the two-dimensional ROC-Histogram_interpolations for the three biometrics singly and taken two at a time;

FIG. 11, which is the two-dimensional ROC similar to FIG. 10 but using the Parzen Window method;

FIG. 12, which is the three-dimensional ROC similar to FIG. 10 and interpolation;

FIG. 13, which is the three-dimensional ROC similar to FIG. 12 but using the Parzen Window method;

FIG. 14, which is a cost function for determining the minimum cost given a desired FAR and FRR;

FIG. 32A shows a subset fit and FIG. 32B shows the fit for the full set of data.

FURTHER DESCRIPTION OF THE INVENTION

Figure 15:
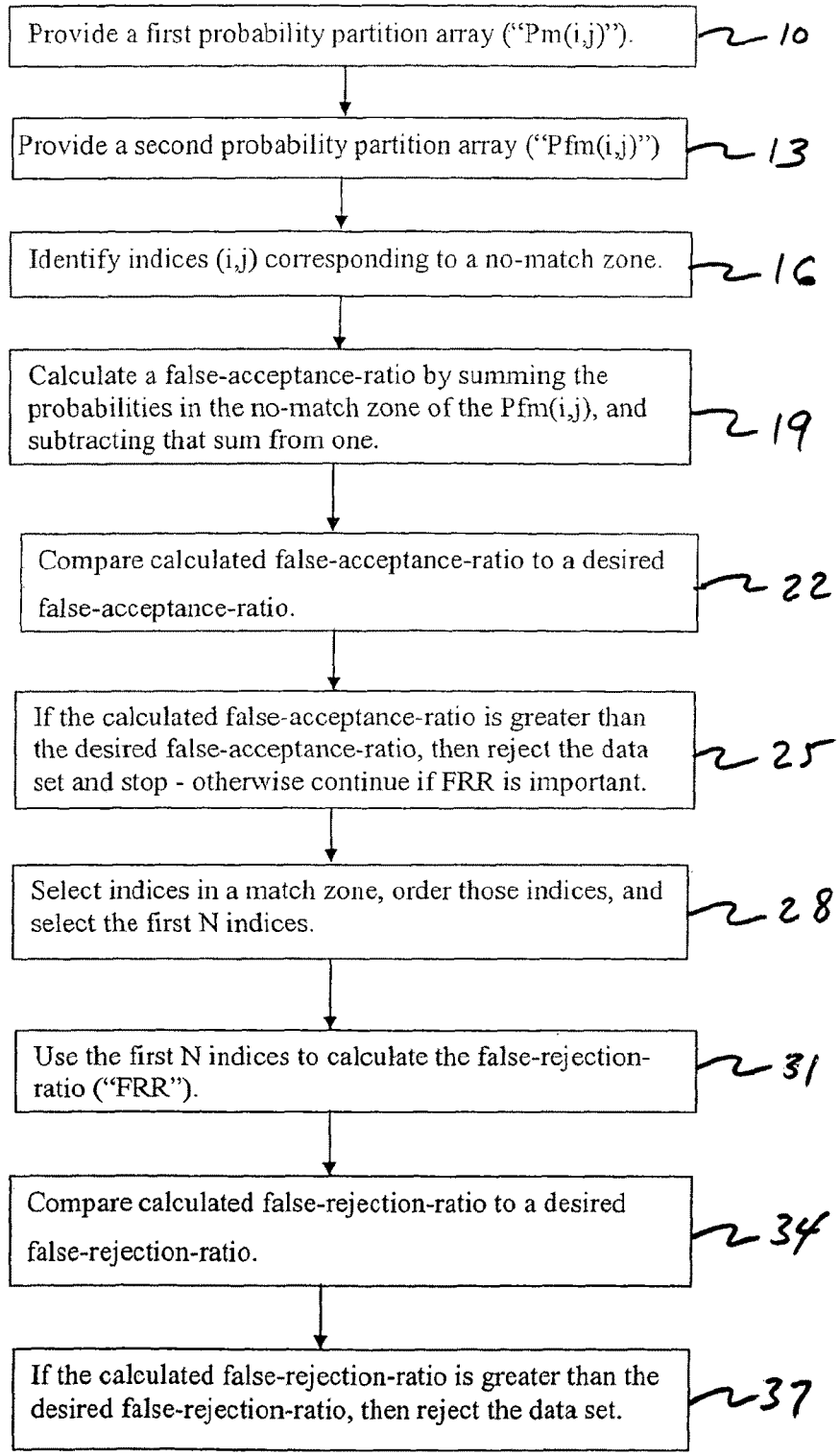
FIG. 15, which depicts a method according to the invention.

Preliminary Considerations: To facilitate discussion of the invention it may be beneficial to establish some terminology and a mathematical framework. Biometric fusion may be viewed as an endeavor in statistical decision theory [1] [2]; namely, the testing of simple hypotheses. This disclosure uses the term simple hypothesis as used in standard statistical theory: the parameter of the hypothesis is stated exactly. The hypotheses that a biometric score "is authentic" or "is from an impostor" are both simple hypotheses.

In a match attempt, the N-scores reported from $N<\infty$ biometrics is called the test observation. The test observation, $x \in S$, where $S \subset R^N$ (Euclidean N-space) is the score sample space, is a vector function of a random variable X from which is observed a random sample $(X_1, X_2, \ldots, X_N)$. The distribution of scores is provided by the joint class-conditional probability density function ("pdf"):

$$f(x|\theta) = f(x_1, x_2, \ldots, x_N | \theta) \qquad (1)$$

where θ equals either Au to denote the distribution of authentic scores or Im to denote the distribution of impostor scores. So, if θ=Au, Equation (1) is the pdf for authentic distribution of scores and if θ=Im it is the pdf for the impostor distribution. It is assumed that $f(x|\theta) = f(x_1, x_2, \ldots, x_N|\theta) > 0$ on S.

Given a test observation, the following two simple statistical hypotheses are observed: The null hypothesis, $H_0$, states that a test observation is an impostor; the alternate hypothesis, $H_1$, states that a test observation is an authentic match. Because there are only two choices, the fusion logic will partition S into two disjoint sets: $R_{Au} \subset S$ and $R_{Im} \subset S$, where $R_{Au} \cap R_{Im} = \emptyset$ and $R_{Au} \cup R_{Im} = S$. Denoting the compliment of a set A by $A_C$, so that $R_{Au}{}^C = R_{Im}$ and $R_{Im}{}^C = R_{Au}$.

The decision logic is to accept $H_1$ (declare a match) if a test observation, x, belongs to $R_{Au}$ or to accept $H_0$ (declare no match and hence reject $H_1$) if x belongs to $R_{Im}$. Each hypothesis is associated with an error type: A Type I error occurs when $H_0$ is rejected (accept $H_1$) when $H_0$ is true; this is a false accept (FA); and a Type II error occurs when $H_1$ is rejected (accept $H_0$) when $H_1$ is true; this is a false reject (FR). Thus denoted, respectively, the probability of making a Type I or a Type II error follows:

$$FAR = P_{Type\,I} = P(x \in R_{Au} | Im) = \int_{R_{Au}} f(x|Im) dx \qquad (2)$$

$$FRR = P_{Type\,II} = P(x \in R_{Im} | Au) = \int_{R_{Im}} f(x|Au) dx \qquad (3)$$

So, to compute the false-acceptance-rate (FAR), the impostor score's pdf is integrated over the region which would declare a match (Equation 2). The false-rejection-rate (FRR) is computed by integrating the pdf for the authentic scores over the region in which an impostor (Equation 3) is declared. The correct-acceptance-rate (CAR) is 1-FRR.

The class-conditional pdf for each individual biometric, the marginal pdf, is assumed to have finite support; that is, the match scores produced by the $i^{th}$ biometric belong to a closed interval of the real line, $\gamma_i = [\alpha_i, \omega_i]$, where $-\infty < \alpha_i < \omega_i < +\infty$. Two observations are made. First, the sample space, S, is the Cartesian product of these intervals, i.e., $S = \gamma_1 \times \gamma_2 \times \ldots \times \gamma_N$.

Secondly, the marginal pdf, which we will often reference, for any of the individual biometrics can be written in terms of the joint pdf:

$$f_i(x_i \mid \theta) = \int_{\gamma_j} \int_{\forall j \neq i} \cdots \int f(x \mid \theta) dx \qquad (4)$$

For the purposes of simplicity the following definitions are stated:

Definition 1: In a test of simple hypothesis, the correct-acceptance-rate, CAR=1-FRR is known as the power of the test.

Definition 2: For a fixed FAR, the test of simple $H_0$ versus simple $H_1$ that has the largest CAR is called most powerful.

Definition 3: Verification is a one-to-one template comparison to authenticate a person's identity (the person claims their identity).

Definition 4: Identification is a one-to-many template comparison to recognize an individual (identification attempts to establish a person's identity without the person having to claim an identity).

The receiver operation characteristics (ROC) curve is a plot of CAR versus FAR, an example of which is shown in FIG. 3. Because the ROC shows performance for all possible specifications of FAR, as can be seen in the FIG. 3, it is an excellent tool for comparing performance of competing systems, and we use it throughout our analyses.

Fusion and Decision Methods: Because different applications have different requirements for error rates, there is an interest in having a fusion scheme that has the flexibility to allow for the specification of a Type-I error yet have a theoretical basis for providing the most powerful test, as defined in Definition 2. Furthermore, it would be beneficial if the fusion scheme could handle the general problem, so there are no restrictions on the underlying statistics. That is to say that:

Biometrics may or may not be statistically independent of each other.

The class conditional pdf can be multi-modal (have local maximums) or have no modes.

The underlying pdf is assumed to be nonparametric (no set of parameters define its shape, such as the mean and standard deviation for a Gaussian distribution).

A number of combination strategies were examined, all of which are listed by Jain [4] on page 243. Most of the schemes, such as "Demptster-Shafer" and "fuzzy integrals" involve training. These were rejected mostly because of the difficulty in analyzing and controlling their performance mechanisms in order to obtain optimal performance. Additionally, there was an interest in not basing the fusion logic on empirical results. Strategies such as SUM, MEAN, MEDIAN, PRODUCT, MIN, MAX were likewise rejected because they assume independence between biometric features.

When combining two biometrics using a Boolean "AND" or "OR" it is easily shown to be suboptimal when the decision to accept or reject $H_1$ is based on fixed score thresholds. However, the "AND" and the "OR" are the basic building blocks of verification (OR) and identification (AND). Since we are focused on fixed score thresholds, making an optimal decision to accept or reject $H_1$ depends on the structure of: $R_{Au} \subset S$ and $R_{Im} \subset S$, and simple thresholds almost always form suboptimal partitions.

If one accepts that accuracy dominates the decision making process and cost dominates the combination strategy, certain conclusions may be drawn. Consider a two-biometric verification system for which a fixed FAR has been specified. In that system, a person's identity is authenticated if $H_1$ is accepted by the first biometric OR if accepted by the second biometric. If $H_1$ is rejected by the first biometric AND the second biometric, then manual intervention is required. If a cost is associated with each stage of the verification process, a cost function can be formulated. It is a reasonable assumption to assume that the fewer people that filter down from the first biometric sensor to the second to the manual check, the cheaper the system.

Suppose a fixed threshold is used as the decision making process to accept or reject $H_1$ at each sensor and solve for thresholds that minimize the cost function. It will obtain settings that minimize cost, but it will not necessarily be the cheapest cost. Given a more accurate way to make decisions, the cost will drop. And if the decision method guarantees the most powerful test at each decision point it will have the optimal cost.

It is clear to us that the decision making process is crucial. A survey of methods based on statistical decision theory reveals many powerful tests such as the Maximum-Likelihood Test and Bayes' Test. Each requires the class conditional probability density function, as given by Equation 1. Some, such as the Bayes' Test, also require the a priori probabilities $P(H_0)$ and $P(H_1)$, which are the frequencies at which we would expect an impostor and authentic match attempt. Generally, these tests do not allow the flexibility of specifying a FAR—they minimize making a classification error.

In their seminal paper of 1933 [3], Neyman and Pearson presented a lemma that guarantees the most powerful test for a fixed FAR requiring only the joint class conditional pdf for $H_0$ and $H_1$. This test may be used as the centerpiece of the biometric fusion logic employed in the invention. The Neyman-Pearson Lemma guarantees the validity of the test. The proof of the Lemma is slightly different than those found in other sources, but the reason for presenting it is because it is immediately amenable to proving the Corollary to the Neyman Pearson Lemma. The corollary states that fusing two biometric scores with Neyman-Pearson, always provides a more powerful test than either of the component biometrics by themselves. The corollary is extended to state that fusing N biometric scores is better than fusing N−1 scores Deriving the Neyman-Pearson Test: Let FAR=α be fixed. It is desired to find $R_{Au} \subset S$ such that $$\alpha = \int_{R_{Au}} f(x \mid Im) dx \text{ and } \int_{R_{Au}} f(x \mid Au) dx$$

is most powerful. To do this the objective set function is formed that is analogous to Lagrange's Method:

$$u(R_{Au}) = \int_{R_{Au}} f(x \mid Au) dx - \lambda \left[ \int_{R_{Au}} f(x \mid Im) dx - \alpha \right]$$

where $\lambda \geq 0$ is an undetermined Lagrange multiplier and the external value of u is subject to the constraint $$\alpha = \int_{R_{Au}} f(x \mid Im) dx.$$

Rewriting the above equation as $$u(R_{Au}) = \int_{R_{Au}} [f(x|Au) - f(x|Im)]dx + \lambda\alpha$$

which ensures that the integrand in the above equation is positive for all $x \in R_{Au}$. Let $\lambda \geq 0$, and, recalling that the class conditional pdf is positive on S is assumed, define $$R_{Au} = \{x : [f(x|Au) - \lambda f(x|Im)] > 0\} = \left\{x : \frac{f(x|Au)}{f(x|Im)} > \lambda\right\}$$

Then u is a maximum if $\lambda$ is chosen such that $$\alpha = \int_{R_{Au}} f(x|Im)dx$$

is satisfied.

The Neyman-Pearson Lemma: Proofs of the Neyman-Pearson Lemma can be found in their paper [4] or in many texts [1] [2]. The proof presented here is somewhat different. An "in-common" region, $R_{IC}$ is established between two partitions that have the same FAR. It is possible this region is empty. Having $R_{IC}$ makes it easier to prove the corollary presented.

Neyman-Pearson Lemma: Given the joint class conditional probability density functions for a system of order N in making a decision with a specified FAR=$\alpha$, let $\lambda$ be a positive real number, and let $$R_{Au} = \left\{x \in S | \frac{f(x|Au)}{f(x|Im)} > \lambda\right\} \quad (5)$$

$$R_{Au}^C = R_{Im} = \left\{x \in S | \frac{f(x|Au)}{f(x|Im)} \leq \lambda\right\} \quad (6)$$

such that $$\alpha = \int_{R_{Au}} f(x|Im)dx. \quad (7)$$

then $R_{Au}$ is the best critical region for declaring a match—it gives the largest correct-acceptance-rate (CAR), hence $R_\lambda^C$ gives the smallest FRR.

Proof: The lemma is trivially true if $R_{Au}$ is the only region for which Equation (7) holds. Suppose $R_\phi \neq R_{Au}$ with $m(R_\phi \cap R_{Au}^C) > 0$ (this excludes sets that are the same as $R_{Au}$ except on a set of measure zero that contribute nothing to the integration), is any other region such that $$\alpha = \int_{R_\phi} f(x|Im)dx. \quad (8)$$

Let $R_{IC} = R_\phi \cap R_{Au}$, which is the "in common" region of the two sets and may be empty. The following is observed:

$$\int_{R_{Au}} f(x|\theta)dx = \int_{R_{Au}-R_{IC}} f(x|\theta)dx + \int_{R_{IC}} f(x|\theta)dx \quad (9)$$

$$\int_{R_\phi} f(x|\theta)dx = \int_{R_\phi-R_{IC}} f(x|\theta)dx + \int_{R_{IC}} f(x|\theta)dx \quad (10)$$

If $R_{Au}$ has a better CAR than $R_\phi$ then it is sufficient to prove that $$\int_{R_{Au}} f(x|Au)dx - \int_{R_\phi} f(x|Au)dx > 0 \quad (11)$$

From Equations (7), (8), (9), and (10) it is seen that (11) holds if $$\int_{R_{Au}-R_{IC}} f(x|Au)dx - \int_{R_\phi-R_{IC}} f(x|Au)dx > 0 \quad (12)$$

Equations (7), (8), (9), and (10) also gives $$\alpha_{R_\phi-R_{IC}} = \int_{R_{Au}-R_{IC}} f(x|Im)dx = \int_{R_\phi-R_{IC}} f(x|Im)dx \quad (13)$$

When $x \in R_{Au} - R_{IC} \subset R_{Au}$ it is observed from (5) that $$\int_{R_{Au}-R_{IC}} f(x|Au)dx > \int_{R_{Au}-R_{IC}} \lambda f(x|Im)dx = \lambda\alpha_{R_\phi-R_{IC}} \quad (14)$$

and when $x \in R_\phi - R_{IC} \subset R_{Au}^C$ it is observed from (6) that $$\int_{R_\phi-R_{IC}} f(x|Au)dx \leq \int_{R_\phi-R_{IC}} \lambda f(x|Im)dx = \lambda\alpha_{R_\phi-R_{IC}} \quad (15)$$

Equations (14) and (15) give $$\int_{R_{Au}-R_{IC}} f(x|Au)dx > \lambda\alpha_{R_\phi-R_{IC}} \geq \int_{R_\phi-R_{IC}} f(x|Au)dx \quad (16)$$

This establishes (12) and hence (11), which proves the lemma.// In this disclosure, the end of a proof is indicated by double slashes "//."

Corollary: Neyman-Pearson Test Accuracy Improves with Additional Biometrics: The fact that accuracy improves with additional biometrics is an extremely important result of the Neyman-Pearson Lemma. Under the assumed class conditional densities for each biometric, the Neyman-Pearson Test provides the most powerful test over any other test that considers less than all the biometrics available. Even if a biometric has relatively poor performance and is highly correlated to one or more of the other biometrics, the fused CAR is optimal. The corollary for N-biometrics versus a single component biometric follows.

Corollary to the Neyman Pearson Lemma. Given the joint class conditional probability density functions for an N-biometric system, choose $\alpha$=FAR and use the Neyman-Pearson Test to find the critical region $R_{Au}$ that gives the most powerful test for the N-biometric system $$CAR_{R_{Au}} = \int_{R_{Au}} f(x|Au)dx. \quad (17)$$

Consider the $i^{th}$ biometric. For the same $\alpha$=FAR, use the Neyman-Pearson Test to find the critical collection of disjoint intervals $I_{Au} \subset R^1$ that gives the most powerful test for the single biometric, that is, $$CAR_{I_{Au}} = \int_{I_{Au}} f(x_i|Au)dx \quad (18)$$

then $$CAR_{R_{Au}} \geq CAR_{I_{Au}}. \quad (19)$$

Proof: Let $R_i = I_{Au} \times \gamma_1 \times \gamma_2 \Delta \ldots \times \gamma_N \subset R^N$, where the Cartesian products are taken over all the $\gamma_k$ except for k=i. From (4) the marginal pdf can be recast in terms of the joint pdf $$\int_{R_i} f(x|\theta)dx = \int_{I_{Au}} f(x_i|\theta)dx \quad (20)$$

First, it will be shown that equality holds in (19) if and only if $R_{Au} = R_i$. Given that $R_{Au} = R_i$ except on a set of measure zero, i.e., $m(R_{Au}{}^C \cap R_i) = 0$, then clearly $CAR_{R_{Au}} = CAR_{I_{Au}}$. On the other hand, assume $CAR_{R_{Au}} = CAR_{I_{Au}}$ and $m(R_{Au}{}^C \cap R_i) > 0$, that is, the two sets are measurably different. But this is exactly the same condition previously set forth in the proof of the Neyman-Pearson Lemma from which from which it was concluded that $CAR_{R_{Au}} > CAR_{I_{Au}}$, which is a contradiction. Hence equality holds if and only if $R_{Au} = R_i$. Examining the inequality situation in equation (19), given that $R_{Au} \neq R_i$ such that $m(R_{Au}{}^C \cap R_i) > 0$, then it is shown again that the exact conditions as in the proof of the Neyman-Pearson Lemma have been obtained from which we conclude that $CAR_{R_{Au}} > CAR_{I_{Au}}$, which proves the corollary.//

Examples have been built such that $CAR_{R_{Au}} = CAR_{I_{Au}}$ but it is hard to do and it is unlikely that such densities would be seen in a real world application. Thus, it is safe to assume that $CAR_{R_{Au}} > CAR_{I_{Au}}$, is almost always true.

The corollary can be extended to the general case. The fusion of N biometrics using Neyman-Pearson theory always results in a test that is as powerful as or more powerful than a test that uses any combination of M<N biometrics. Without any loss to generality, arrange the labels so that the first M biometrics are the ones used in the M<N fusion. Choose $\alpha$=FAR and use the Neyman-Pearson Test to find the critical region $R_M \subset R^M$ that gives the most powerful test for the M-biometric system. Let $R_N = R_M \times \gamma_{M+1} \times \gamma_{M+2} \times \ldots \times \gamma_N \subset R^N$, where the Cartesian products are taken over all the $\gamma$-intervals not used in the M biometrics combination. Then writing $$\int_{R_N} f(x|\theta)dx = \int_{R_M} f(x_1, x_2 \ldots, x_M|\theta)dx \quad (21)$$

gives the same construction as in (20) and the proof flows as it did for the corollary.

We now state and prove the following five mathematical propositions. The first four propositions are necessary to proving the fifth proposition, which will be cited in the section that details the invention. For each of the propositions we will use the following: Let $r = \{r_1, r_2, \ldots, r_n\}$ be a sequence of real valued ratios such that $r_1 \geq r_2 \geq \ldots \geq r_n$. For each $r_i$ we know the numerator and denominator of the ratio, so that $$r_i = \frac{n_i}{d_i}, n_i, d_i > 0 \forall\ i.$$

Proposition #1: For $r_i, r_{i+1} \in r$ and $$r_i = \frac{n_i}{d_i}, r_{i+1} = \frac{n_{i+1}}{d_{i+1}}, \text{ then } \frac{n_i + n_{i+1}}{d_i + d_{i+1}} \leq \frac{n_i}{d_i} = r_i.$$

Proof: Because $r_i, r_{i+1} \in r$ we have $$\frac{n_{i+1}}{d_{i+1}} \leq \frac{n_i}{d_i}$$

$$\Rightarrow \frac{d_i n_{i+1}}{n_i d_{i+1}} \leq 1$$

$$\Rightarrow \frac{d_i}{n_i}(n_i + n_{i+1}) \leq d_i + d_{i+1}$$

$$\Rightarrow \frac{n_i + n_{i+1}}{d_i + d_{i+1}} \leq \frac{n_i}{d_i} = r_i$$

Proposition #2: For $r_i, r_{i+1} \in r$ and $$r_i = \frac{n_i}{d_i}, r_{i+1} = \frac{n_{i+1}}{d_{i+1}}, \text{ then } r_{i+1} = \frac{n_{i+1}}{d_{i+1}} \leq \frac{n_i + n_{i+1}}{d_i + d_{i+1}}.$$

Proof: The proof is the same as for proposition #1 except the order is reversed.

Proposition #3: For $$r_i = \frac{n_i}{d_i}, i = (1, \ldots, n), \text{ then } \frac{\sum_{i=m}^{M} n_i}{\sum_{i=m}^{M} d_i} \leq \frac{n_m}{d_m}, 1 \leq m \leq M \leq n.$$

Proof: The proof is by induction. We know from proposition #1 that the result holds for N=1, that is $$\frac{n_i + n_{i+1}}{d_i + d_{i+1}} \leq \frac{n_i}{d_i}.$$

Now assume it holds for any N>1, we need to show that it holds for N+1. Let m=2 and M=N+1 (note that this is the $N^{th}$ case and not the N+1 case), then we assume $$\frac{\sum_{i=2}^{N+1} n_i}{\sum_{i=2}^{N+1} d_i} \leq \frac{n_2}{d_2} \leq \frac{n_1}{d_1}$$

-continued $$\Rightarrow \frac{d_1}{n_1} \frac{\sum_{i=2}^{N+1} n_i}{\sum_{i=2}^{N+1} d_i} \le 1$$

$$\Rightarrow \frac{d_1}{n_1} \sum_{i=2}^{N+1} n_i \le \sum_{i=2}^{N+1} d_i$$

$$\Rightarrow \frac{d_1}{n_1} \sum_{i=2}^{N+1} n_i + d_1 \le \sum_{i=2}^{N+1} d_i + d_1 = \sum_{i=2}^{N+1} d_i$$

$$\Rightarrow d_1 \left(1 + \frac{\sum_{i=2}^{N+1} n_i}{n_1}\right) \le \sum_{i=1}^{N+1} d_i$$

$$\Rightarrow d_1 \left(\frac{n_1 + \sum_{i=2}^{N+1} n_i}{n_1}\right) = \frac{d_1}{n_1} \sum_{i=1}^{N+1} n_i \le \sum_{i=1}^{N+1} d_i$$

$$\Rightarrow \frac{\sum_{i=1}^{N+1} n_i}{\sum_{i=1}^{N+1} d_i} \le \frac{n_1}{d_1}$$

which is the N+1 case as was to be shown.

Proposition #4: For $$r_i = \frac{n_i}{d_i}, i = (1, \ldots, n), \text{ then } \frac{n_M}{d_M} \le \frac{\sum_{i=m}^{M} n_i}{\sum_{i=m}^{M} d_i}, 1 \le m \le M \le n.$$

Proof: As with proposition #3, the proof is by induction. We know from proposition #2 that the result holds for N=1, that is $$\frac{n_{i+1}}{d_{i+1}} \le \frac{n_i + n_{i+1}}{d_i + d_{i+1}}.$$

The rest of the proof follows the same format as for proposition #3 with the order reversed.//

Proposition #5: Recall that the r is an ordered sequence of decreasing ratios with known numerators and denominators. We sum the first N numerators to get $S_n$ and sum the first N denominators to get $S_d$. We will show that for the value $S_n$, there is no other collection of ratios in r that gives the same $S_n$ and a smaller $S_d$. For $$r_i = \frac{n_i}{d_i}, i = (1, \ldots, n),$$

let S be the sequence of the first N terms of r, with the sum of numerators given by $$S_n = \sum_{i=1}^{N} n_i,$$

and the sum of denominators by $$S_d = \sum_{i=1}^{N} d_i, 1 \le N \le n.$$

Let S' be any other sequence of ratios in r, with numerator sum $S'_n = \Sigma n_i$ and denominator sum $S'_d = \Sigma d_i$ such that $S'_n = S_n$, then we have $S_d \le S'_d$. Proof: The proof is by contradiction. Suppose the proposition is not true, that is, assume another sequence, S', exists such that $S'_d < S_d$. For this sequence, define the indexing sets A={indices that can be between 1 and N inclusive} and B={indices that can be between N+1 and n inclusive}. We also define the indexing set $A^c$={indices between 1 and N inclusive and not in A}, which means $A \cap A^c = \emptyset$ and $A \cup A^c$={all indices between 1 and N inclusive}. Then our assumption states:

$$S'_n = \Sigma_{i \in A} n_i + \Sigma_{i \in B} n_i = S_n$$

and $$S'_d = \Sigma_{i \in A} d_i + \Sigma_{i \in B} d_i < S_d.$$

This implies that $$\sum_{i \in A} d_i + \sum_{i \in B} d_i < \sum_{i=1}^{N} d_i = \sum_{i \in A} d_i + \sum_{i \in A^c} d_i. \quad (22)$$

$$\Rightarrow \sum_{i \in B} d_i < \sum_{i \in A^c} d_i$$

$$\Rightarrow \frac{1}{\sum_{i \in A^c} d_i} < \frac{1}{\sum_{i \in B} d_i}$$

Because the numerators of both sequences are equal, we can write $$\Sigma_{i \in A} n_i + \Sigma_{i \in B} n_i = \Sigma_{i \in A \cup A^c} n_i \Rightarrow \Sigma_{i \in B} n_i = \Sigma_{i \in A \cup A^c} n_i - \Sigma_{i \in A} n_i = \Sigma_{i \in A^c} n_i \quad (23)$$

Combining (22) and (23), and from propositions #3 and #4, we have $$r_N = \frac{n_N}{d_N} \le \frac{\sum_{i \in A^c} n_i}{\sum_{i \in A^c} d_i} < \frac{\sum_{i \in B} n_i}{\sum_{i \in B} d_i} \le \frac{n_{N+1}}{d_{N+1}} = r_{N+1},$$

which contradicts the fact that $r_N \ge r_{N+1}$, hence the validity of the proposition follows.//

Cost Functions for Optimal Verification and Identification: In the discussion above, it is assumed that all N biometric scores are simultaneously available for fusion. The Neyman-Pearson Lemma guarantees that this provides the most powerful test for a fixed FAR. In practice, however, this could be an expensive way of doing business. If it is assumed that all aspects of using a biometric system, time, risk, etc., can be equated to a cost, then a cost function can be constructed. The inventive process described below constructs the cost function and shows how it can be minimized using the Neyman-Pearson test. Hence, the Neyman-Pearson theory is not limited to "all-at-once" fusion; it can be used for serial, parallel, and hierarchal systems.

Having laid a basis for the invention, a description of two cost functions is now provided as a mechanism for illustrating an embodiment of the invention. A first cost function for a verification system and a second cost function for an identification system are described. For each system, an algorithm is presented that uses the Neyman-Pearson test to minimize the cost function for a second order biometric system, that is a biometric system that has two modalities. The cost functions are presented for the general case of N-biometrics. Because minimizing the cost function is recursive, the computational load grows exponentially with added dimensions. Hence, an efficient algorithm is needed to handle the general case.

First Cost Function—Verification System. A cost function for a 2-stage biometric verification (one-to-one) system will be described, and then an algorithm for minimizing the cost function will be provided. In a 2-stage verification system, a subject may attempt to be verified by a first biometric device. If the subject's identity cannot be authenticated, the subject may attempt to be authenticated by a second biometric. If that fails, the subject may resort to manual authentication. For example, manual authentication may be carried out by interviewing the subject and determining their identity from other means.

The cost for attempting to be authenticated using a first biometric, a second biometric, and a manual check are $c_1$, $c_2$, and $c_3$, respectively. The specified $FAR_{sys}$ is a system false-acceptance-rate, i.e. the rate of falsely authenticating an impostor includes the case of it happening at the first biometric or the second biometric. This implies that the first-biometric station test cannot have a false-acceptance-rate, $FAR_1$, that exceeds $FAR_{sys}$. Given a test with a specified $FAR_1$, there is an associated false-rejection-rate, $FRR_1$, which is the fraction of subjects that, on average, are required to move on to the second biometric station. The FAR required at the second station is $FAR_2 = FAR_{sys} - FAR_1$. It is known that $P(A \cup B) = P(A) + P(B) - P(A)P(B)$, so the computation of $FAR_2$ appears imperfect. However, if $FAR_{sys} = P(A \cup B)$ and $FAR_1 = P(A)$, in the construction of the decision space, it is intended that $FAR_2 = P(B) - P(A)P(B)$.

Note that $FAR_2$ is a function of the specified $FAR_{sys}$ and the freely chosen $FAR_1$; $FAR_2$ is not a free parameter. Given a biometric test with the computed $FAR_2$, there is an associated false-rejection-rate, $FRR_2$ by the second biometric test, which is the fraction of subjects that are required to move on to a manual check. This is all captured by the following cost function:

$$Cost = c_1 + FRR_1(c_2 + c_3 FRR_2) \qquad (30)$$

There is a cost for every choice of $FAR_1 \leq FAR_{sys}$, so the Cost in Equation 30 is a function of $FAR_1$. For a given test method, there exists a value of $FAR_1$ that yields the smallest cost and we present an algorithm to find that value. In a novel approach to the minimization of Equation 30, a modified version of the Neyman-Pearson decision test has been developed so that the smallest cost is optimally small.

An algorithm is outlined below. The algorithm seeks to optimally minimize Equation 30. To do so, we (a) set the initial cost estimate to infinity and, (b) for a specified $FAR_{sys}$, loop over all possible values of $FAR_1 \leq FAR_{sys}$. In practice, the algorithm may use a uniformly spaced finite sample of the infinite possible values. The algorithm may proceed as follows: (c) set $FAR_1 = FAR_{sys}$, (d) set Cost=$\infty$, and (e) loop over possible $FAR_1$ values. For the first biometric at the current $FAR_1$ value, the algorithm may proceed to (f) find the optimal Match-Zzone, $R_1$, and (g) compute the correct-acceptance-rate over $R_1$ by:

$$CAR_1 = \int_{R_1} f(x|Au) dx \qquad (31)$$

and (h) determine $FRR_1$ using $FRR_1 = 1 - CAR_1$.

Next, the algorithm may test against the second biometric. Note that the region $R_1$ of the score space is no longer available since the first biometric test used it up. The Neyman-Pearson test may be applied to the reduced decision space, which is the compliment of $R_1$. So, at this time, (h) the algorithm may compute $FAR_2 = FAR_{sys} - FAR_1$, and $FAR_2$ may be (i) used in the Neyman-Pearson test to determine the most powerful test, $CAR_2$, for the second biometric fused with the first biometric over the reduced decision space $R_1^C$. The critical region for $CAR_2$ is $R_2$, which is disjoint from $R_1$ by our construction. Score pairs that result in the failure to be authenticated at either biometric station must fall within the region $R_3 = (R_1 \cup R_2)^C$, from which it is shown that $$FRR_2 = \frac{\int_{R_3} f(x|Au) dx}{FRR_1}$$

The final steps in the algorithm are (j) to compute the cost using Equation 30 at the current setting of $FAR_1$ using $FRR_1$ and $FRR_2$, and (k) to reset the minimum cost if cheaper, and keep track of the $FAR_1$ responsible for the minimum cost.

To illustrate the algorithm, an example is provided. Problems arising from practical applications are not to be confused with the validity of the Neyman-Pearson theory. Jain states in [5]: "In case of a larger number of classifiers and relatively small training data, a classifier my actually degrade the performance when combined with other classifiers . . . " This would seem to contradict the corollary and its extension. However, the addition of classifiers does not degrade performance because the underlying statistics are always true and the corollary assumes the underlying statistics. Instead, degradation is a result of inexact estimates of sampled densities. In practice, a user may be forced to construct the decision test from the estimates, and it is errors in the estimates that cause a mismatch between predicted performance and actual performance.

Given the true underlying class conditional pdf for, $H_0$ and $H_1$, the corollary is true. This is demonstrated with a challenging example using up to three biometric sensors. The marginal densities are assumed to be Gaussian distributed. This allows a closed form expression for the densities that easily incorporates correlation. The general $n^{th}$ order form is well known and is given by $$f(x|\theta) = \frac{1}{(2\pi)^{\frac{n}{2}} |C|^{1/2}} \exp\left(-\frac{1}{2}[(x-\mu)^T C^{-1}(x-\mu)]\right) \qquad (32)$$

where $\mu$ is the mean and C is the covariance matrix. The mean ($\mu$) and the standard deviation ($\sigma$) for the marginal densities are given in Table 1. Plots of the three impostor and three authentic densities are shown in FIG. 1.

TABLE 1

| Biometric | Impostors | | Authentics | |
|---|---|---|---|---|
| Number | μ | Σ | μ | σ |
| #1 | 0.3 | 0.06 | 0.65 | 0.065 |
| #2 | 0.32 | 0.065 | 0.58 | 0.07 |
| #3 | 0.45 | 0.075 | 0.7 | 0.08 |

TABLE 2

| Correlation Coefficient | Impostors | Authentics |
|---|---|---|
| $\rho_{12}$ | 0.03 | 0.83 |
| $\rho_{13}$ | 0.02 | 0.80 |
| $\rho_{23}$ | 0.025 | 0.82 |

To stress the system, the authentic distributions for the three biometric systems may be forced to be highly correlated and the impostor distributions to be lightly correlated. The correlation coefficients (ρ) are shown in Table 2. The subscripts denote the connection. A plot of the joint pdf for the fusion of system #1 with system #2 is shown in FIG. 2, where the correlation between the authentic distributions is quite evident.

The single biometric ROC curves are shown in FIG. 3. As could be predicted from the pdf curves plotted in FIG. 1, System #1 performs much better than the other two systems, with System #3 having the worst performance.

Fusing 2 systems at a time; there are three possibilities: #1+#2, #1+#3, and #2+#3. The resulting ROC curves are shown in FIG. 4. As predicted by the corollary, each 2-system pair outperforms their individual components. Although the fusion of system #2 with system #3 has worse performance than system #1 alone, it is still better than the single system performance of either system #2 or system #3.

Finally, FIG. 5 depicts the results when fusing all three systems and comparing its performance with the performance of the 2-system pairs. The addition of the third biometric system gives substantial improvement over the best performing pair of biometrics.

Tests were conducted on individual and fused biometric systems in order to determine whether the theory presented above accurately predicts what will happen in a real-world situation. The performance of three biometric systems were considered. The numbers of score samples available are listed in Table 3. The scores for each modality were collected independently from essentially disjoint subsets of the general population.

TABLE 3

| Biometric | Number of Impostor Scores | Number of Authentic Scores |
|---|---|---|
| Fingerprint | 8,500,000 | 21,563 |
| Signature | 325,710 | 990 |
| Facial Recognition | 4,441,659 | 1,347 |

To simulate the situation of an individual obtaining a score from each biometric, the initial thought was to build a "virtual" match from the data of Table 3. Assuming independence between the biometrics, a 3-tuple set of data was constructed. The 3-tuple set was an ordered set of three score values, by arbitrarily assigning a fingerprint score and a facial recognition score to each signature score for a total of 990 authentic score 3-tuples and 325,710 impostor score 3-tuples.

By assuming independence, it is well known that the joint pdf is the product of the marginal density functions, hence the joint class conditional pdf for the three biometric systems, $f(x|\theta)=f(x_1, x_2, x_3|\theta)$ can be written as $$f(x|\theta)=f_{fingerprint}(x|\theta)f_{signature}(x|\theta)f_{facial}(x|\theta) \qquad (33)$$

So it is not necessary to dilute the available data. It is sufficient to approximate the appropriate marginal density functions for each modality using all the data available, and compute the joint pdf using Equation 33.

The class condition density functions for each of the three modalities, $f_{fingerprint}(x|\theta)$, $f_{signature}(x|\theta)$ and $f_{facial}(x|\theta)$, were estimated using the available sampled data. The authentic score densities were approximated using two methods: (1) the histogram-interpolation technique and (2) the Parzen-window method. The impostor densities were approximated using the histogram-interpolation method. Although each of these estimation methods are guaranteed to converge in probability to the true underlying density as the number of samples goes to infinity, they are still approximations and can introduce error into the decision making process, as will be seen in the next section. The densities for fingerprint, signature, and facial recognition are shown in FIG. 6, FIG. 7 and FIG. 8 respectively. Note that the authentic pdf for facial recognition is bimodal. The Neyman-Pearson test was used to determine the optimal ROC for each of the modalities. The ROC curves for fingerprint, signature, and facial recognition are plotted in FIG. 9.

There are three possible unique pairings of the three biometric systems: (1) fingerprints with signature, (2) fingerprints with facial recognition, and (3) signatures with facial recognition. Using the marginal densities (above) to create the required 2-D joint class conditional density functions, two sets of 2-D joint density functions were computed—one in which the authentic marginal densities were approximated using the histogram method, and one in which the densities were approximated using the Parzen window method. Using the Neyman-Pearson test, an optimal ROC was computed for each fused pairing and each approximation method. The ROC curves for the histogram method are shown in FIG. 10 and the ROC curves for the Parzen window method are shown in FIG. 11.

As predicted by the corollary, the fused performance is better than the individual performance for each pair under each approximation method. But, as we cautioned in the example, error due to small sample sizes can cause pdf distortion. This is apparent when fusing fingerprints with signature data (see FIG. 10 and FIG. 11). Notice that the Parzen-window ROC curve (FIG. 11) crosses over the curve for fingerprint-facial-recognition fusion, but does not cross over when using the histogram interpolation method (FIG. 10). Small differences between the two sets of marginal densities are magnified when using their product to compute the 2-dimensional joint densities, which is reflected in the ROC.

As a final step, all three modalities were fused. The resulting ROC using histogram interpolating is shown in FIG. 12, and the ROC using the Parzen window is shown FIG. 13. As might be expected, the Parzen window pdf distortion with the 2-dimensional fingerprint-signature case has carried through to the 3-dimensional case. The overall performance, however, is dramatically better than any of the 2-dimensional configurations as predicted by the corollary.

In the material presented above, it was assumed that all N biometric scores would be available for fusion. Indeed, the Neyman-Pearson Lemma guarantees that this provides the most powerful test for a fixed FAR. In practice, however, this could be an expensive way of doing business. If it is assumed that all aspects of using a biometric system, time, risk, etc., can be equated to a cost, then a cost function can be constructed. Below, we construct the cost function and show how it can be minimized using the Neyman-Pearson test. Hence, the Neyman-Pearson theory is not limited to "all-at-once" fusion—it can be used for serial, parallel, and hierarchal systems.

In the following section, a review of the development of the cost function for a verification system is provided, and then a cost function for an identification system is developed. For each system, an algorithm is presented that uses the Neyman-Pearson test to minimize the cost function for a second order modality biometric system. The cost function is presented for the general case of N-biometrics. Because minimizing the cost function is recursive, the computational load grows exponentially with added dimensions. Hence, an efficient algorithm is needed to handle the general case.

From the prior discussion of the cost function for a 2-station system, the costs for using the first biometric, the second biometric, and the manual check are $c_1$, $c_2$, and $c_3$, respectively, and $FAR_{sys}$ is specified. The first-station test cannot have a false-acceptance-rate, $FAR_1$, that exceeds $FAR_{sys}$. Given a test with a specified $FAR_1$, there is an associated false-rejection-rate, $FRR_1$, which is the fraction of subjects that, on average, are required to move on to the second station. The FAR required at the second station is $FAR_2=FAR_{sys}-FAR_1$. It is known that $P(A \cup B)=P(A)+P(B)-P(A)P(B)$, so the computation of $FAR_2$ appears imperfect. However, if $FAR_{sys}=P(A \cup B)$ and $FAR_1=P(A)$, in the construction of the decision space, it is intended that $FAR_2=P(B)-P(A)P(B)$.

Given a test with the computed $FAR_2$, there is an associated false-rejection-rate, $FRR_2$ by the second station, which is the fraction of subjects that are required to move on to a manual checkout station. This is all captured by the following cost function $$\text{Cost} = c_1 + FRR_1(c_2 + c_3 FRR_2) \quad (30)$$

There is a cost for every choice of $FAR_1 \leq FAR_{sys}$, so the Cost in Equation 30 is a function of $FAR_1$. For a given test method, there exists a value of $FAR_1$ that yields the smallest cost and we develop an algorithm to find that value.

Using a modified Neyman-Pearson test to optimally minimize Equation 30, an algorithm can be derived. Step 1: set the initial cost estimate to infinity and, for a specified $FAR_{sys}$, loop over all possible values of $FAR_1 \leq FAR_{sys}$. To be practical, in the algorithm a finite sample of the infinite possible values may be used. The first step in the loop is to use the Neyman-Pearson test at $FAR_1$ to determine the most powerful test, $CAR_1$, for the first biometric, and $FRR_1=1-CAR_1$ is computed. Since it is one dimensional, the critical region is a collection of disjoint intervals $I_{Au}$. As in the proof to the corollary, the 1-dimensional $I_{Au}$ is recast as a 2-dimensional region, $R_1=I_{Au} \times \gamma_2 \subset R^2$, so that $$CAR_1 = \int_{R_1} f(x|Au) dx = \int_{I_{Au}} f(x_1|Au) dx \quad (34)$$

When it is necessary to test against the second biometric, the region $R_1$ of the decision space is no longer available since the first test used it up. The Neyman-Pearson test can be applied to the reduced decision space, which is the compliment of $R_1$. Step 2: $FAR_2=FAR_{sys}-FAR_1$ is computed. Step 3: $FAR_2$ is used in the Neyman-Pearson test to determine the most powerful test, $CAR_2$, for the second biometric fused with the first biometric over the reduced decision space $R_1^C$. The critical region for $CAR_2$ is $R_2$, which is disjoint from $R_1$ by the construction. Score pairs that result in the failure to be authenticated at either biometric station must fall within the region $R_3=(R_1 \cup R_2)^C$, from which it is shown that $$FRR_2 = \frac{\int_{R_3} f(x|Au) dx}{FRR_1}$$

Step 4: compute the cost at the current setting of $FAR_1$ using $FRR_1$ and $FRR_2$. Step 5: reset the minimum cost if cheaper, and keep track of the $FAR_1$ responsible for the minimum cost. A typical cost function is shown in FIG. 14.

Two special cases should be noted. In the first case, if $c_1>0$, $c_2>0$, and $c_3=0$, the algorithm shows that the minimum cost is to use only the first biometric—that is, $FAR_1=FAR_{sys}$. This makes sense because there is no cost penalty for authentication failures to bypass the second station and go directly to the manual check.

In the second case, $c_1=c_2=0$ and $c_3>0$, the algorithm shows that scores should be collected from both stations and fused all at once; that is, $FAR_1=1.0$. Again, this makes sense because there is no cost penalty for collecting scores at both stations, and because the Neyman-Pearson test gives the most powerful CAR (smallest FRR) when it can fuse both scores at once.

To extend the cost function to higher dimensions, the logic discussed above is simply repeated to arrive at $$\text{Cost} = c_1 + c_2 FRR_1 + c_3 \prod_{i=1}^{2} FRR_i + \ldots + c_{N+1} \prod_{i=1}^{N} FRR_i \quad (35)$$

In minimizing Equation 35, there is 1 degree of freedom, namely $FAR_1$. Equation 35 has N−1 degrees of freedom. When $FAR_1 \leq FAR_{sys}$ are set, then $FAR_2 \leq FAR_1$ can bet set, then $FAR_3 \leq FAR_2$, and so on—and to minimize thus, N−1 levels of recursion.

Identification System Identification (one-to-many) systems are discussed. With this construction, each station attempts to discard impostors. Candidates that cannot be discarded are passed on to the next station. Candidates that cannot be discarded by the biometric systems arrive at the manual checkout. The goal, of course, is to prune the number of impostor templates thus limiting the number that move on to subsequent steps. This is a logical AND process—for an authentic match to be accepted, a candidate must pass the test at station 1 and station 2 and station 3 and so forth. In contrast to a verification system, the system administrator must specify a system false-rejection-rate, $FRR_{sys}$ instead of a $FAR_{sys}$ But just like the verification system problem the sum of the component FRR values at each decision point cannot exceed $FRR_{sys}$. If FRR with FAR are replaced in Equations 34 or 35 the following cost equations are arrived at for 2-biometric and an N-biometric identification system $$\text{Cost} = c_1 + FAR_1(c_2 + c_3 FAR_2) \quad (36)$$

$$\text{Cost} = c_1 + c_2 FAR_1 + c_3 \prod_{i=1}^{2} FAR_i + \ldots + c_{N+1} \prod_{i=1}^{N} FAR_i \quad (37)$$

Alternately, equation 37 may be written as:

$$\text{Cost} = \sum_{j=0}^{N} \left( c_{j+1} \prod_{i=1}^{j} FAR_i \right), \quad (37A)$$

These equations are a mathematical dual of Equations 34 and 35 are thus minimized using the logic of the algorithm that minimizes the verification system.

Algorithm: Generating Matching and Non-Matching PDF Surfaces. The optimal fusion algorithm uses the probability of an authentic match and the probability of a false match for each $p_{ij} \epsilon P$. These probabilities may be arrived at by numerical integration of the sampled surface of the joint pdf. A sufficient number of samples may be generated to get a "smooth" surface by simulation. Given a sequence of matching score pairs and non-matching score pairs, it is possible to construct a numerical model of the marginal cumulative distribution functions (cdf). The distribution functions may be used to generate pseudo random score pairs. If the marginal densities are independent, then it is straightforward to generate sample score pairs independently from each cdf. If the densities are correlated, we generate the covariance matrix and then use Cholesky factorization to obtain a matrix that transforms independent random deviates into samples that are appropriately correlated.

Assume a given partition P. The joint pdf for both the authentic and impostor cases may be built by mapping simulated score pairs to the appropriate $p_{ij} \epsilon P$ and incrementing a counter for that sub-square. That is, it is possible to build a 2-dimensional histogram, which is stored in a 2-dimensional array of appropriate dimensions for the partition. If we divide each array element by the total number of samples, we have an approximation to the probability of a score pair falling within the associated sub-square. We call this type of an array the probability partition array (PPA). Let $P_{fm}$ be the PPA for the joint false match distribution and let $P_m$ be the PPA for the authentic match distribution. Then, the probability of an impostor's score pair, $(s_1,s_2) \epsilon p_{ij}$, resulting in a match is $P_{fm}(i,j)$. Likewise, the probability of a score pair resulting in a match when it should be a match is $P_m(i,j)$. The PPA for a false reject (does not match when it should) is $P_{fr}=1-P_m$.

Consider the partition arrays, $P_{fm}$ and $P_m$, defined in Section #5. Consider the ratio $$\frac{P_{fm}(i,j)}{P_m(i,j)}, P_{fr} > 0.$$

The larger this ratio the more the sub-square indexed by (i,j) favors a false match over a false reject. Based on the propositions presented in Section 4, it is optimal to tag the sub-square with the largest ratio as part of the no-match zone, and then tag the next largest, and so on.

Therefore, an algorithm that is in keeping with the above may proceed as:

Step 1. Assume a required FAR has been given.
Step 2. Allocate the array $P_{mz}$ to have the same dimensions as $P_m$ and $P_{fm}$. This is the match zone array. Initialize all of its elements as belonging to the match zone.
Step 3. Let the index set A={all the (i,j) indices for the probability partition arrays}.
Step 4. Identify all indices in A such that $P_m(i,j)=P_{fm}(i,j)=0$ and store those indices in the indexing set $Z=\{(i,j): P_m(i,j)=P_{fm}(i,j)=0\}$. Tag each element in $P_{mz}$ indexed by Z as part of the no-match zone.
Step 5. Let $B=A-Z=\{(i,j): P_m(i,j) \neq 0$ and $P(i,j) \neq 0\}$. We process only those indices in B. This does not affect optimality because there is most likely zero probability that either a false match score pair or a false reject score pair falls into any sub-square indexed by elements of Z.
Step 6. Identify all indices in B such that $P_{fm}(i,j)>0$ and $P_m(i,j)=0$ and store those indices in $Z_\infty = \{(i,j)_k: P_{fm}(i,j)>0, P_m(i,j)=0\}$. Simply put, this index set includes the indexes to all the sub-squares that have zero probability of a match but non-zero probability of false match.
Step 7. Tag all the sub-squares in $P_{mz}$ indexed by $Z_\infty$ as belonging to the no-match zone. At this point, the probability of a matching score pair falling into the no-match zone is zero. The probability of a non-matching score pair falling into the match zone is:

$FAR_{Z_\infty} = 1 - \Sigma_{(i,j) \epsilon Z_\infty} P_{fm}(i,j)$

Furthermore, if $FAR_{Z_\infty} \leq =FAR$ then we are done and can exit the algorithm.

Step 8. Otherwise, we construct a new index set $$C = A - Z - Z_\infty = \left\{ (i,j)_k : P_{fm}(i,j)_k > 0, P_m(i,j)_k > 0, \frac{P_{fm}(i,j)_k}{P_m(i,j)_k} >= \frac{P_{fm}(i,j)_{k+1}}{P_m(i,j)_{k+1}} \right\}.$$

We see that C holds the indices of the non-zero probabilities in a sorted order—the ratios of false-match to match probabilities occur in descending order.

Step 9. Let $C_N$ be the index set that contains the first N indices in C. We determine N so that:

$FAR_{Z_\infty \cup C_N} = 1 - \Sigma_{(i,j) \epsilon Z_\infty} P_{fm}(i,j) - \Sigma_{(i,j) \epsilon C_N} P_{fm}(i,j) \leq FAR$ Step 10. Label elements of $P_{mz}$ indexed by members of $C_N$ as belonging to the no-match zone. This results in a FRR given by $FRR = \Sigma_{(i,j) \epsilon C_N} P_m(i,j)$, and furthermore this FRR is optimal.

It will be recognized that other variations of these steps may be made, and still be within the scope of the invention. For clarity, the notation "(i,j)" is used to identify arrays that have at least two modalities. Therefore, the notation "(i,j)" includes more than two modalities, for example (i,j,k), (i,j,k,l), (i,j,k,l,m), etc.

For example, FIG. 15 illustrates one method according to the invention in which Pm(i,j) is provided 10 and Pfm(i,j) 13 is provided. As part of identifying 16 indices (i,j) corresponding to a no-match zone, a first index set ("A") may be identified. The indices in set A may be the (i,j) indices that have values in both Pfm(i,j) and Pm(i,j). A second index set ("Z∞") may be identified, the indices of Z∞ being the (i,j) indices in set A where both Pfm(i,j) is larger than zero and Pm(i,j) is equal to zero. Then determine FAR $_{Z\infty}$ 19, where $FAR_{Z_\infty}=1-\Sigma_{(i,j) \epsilon Z_\infty} P_{fm}(i,j)$. It should be noted that the indices of Z∞ may be the indices in set A where Pm(i,j) is equal to zero, since the indices where both Pfm(i,j)=Pm(i,j)=0 will not affect FAR $_{Z\infty}$, and since there will be no negative values in the probability partition arrays. However, since defining the indices of Z∞ to be the (i,j) indices in set A where both Pfm(i,j) is larger than zero and Pm(i,j) is equal to zero yields the smallest number of indices for Z∞, we will use that definition for illustration purposes since it is the least that must be done for the mathematics of FAR $_{Z\infty}$ to work correctly. It will be understood that larger no-match zones may be defined, but they will include Z∞, so we illustrate the method using the smaller Z∞ definition believing that definitions of no-match zones that include Z∞ will fall within the scope of the method described.

FAR $_{Z\infty}$ may be compared 22 to a desired false-acceptance-rate ("FAR"), and if FAR $_{Z\infty}$ is less than or equal to the desired false-acceptance-rate, then the data set may be accepted, if false-rejection-rate is not important. If FAR $_{Z\infty}$ is greater than the desired false-acceptance-rate, then the data set may be rejected 25.

If false-rejection-rate is important to determining whether a data set is acceptable, then indices in a match zone may be selected, ordered, and some of the indices may be selected for further calculations 28. Toward that end, the following steps may be carried out. The method may further include identifying a third index set ZM∞, which may be thought of as a modified Z∞, that is to say a modified no-match zone. Here we modify Z∞ so that ZM∞ includes indices that would not affect the calculation for $FAR_{Z\infty}$, but which might affect calculations related to the false-rejection-rate. The indices of ZM∞ may be the (i,j) indices in Z∞ plus those indices where both Pfm(i,j) and Pm(i,j) are equal to zero. The indices where Pfm(i,j)=Pm(i,j)=0 are added to the no-match zone because in the calculation of a fourth index set ("C"), these indices should be removed from consideration. The indices of C may be the (i,j) indices that are in A but not ZM∞. The indices of C may be arranged such that $$\frac{P_{fm}(i,j)_k}{P_m(i,j)_k} >= \frac{P_{fm}(i,j)_{k+1}}{P_m(i,j)_{k+1}}$$

to provide an arranged C index. A fifth index set ("Cn") may be identified. The indices of Cn may be the first N (i,j) indices of the arranged C index, where N is a number for which the following is true:

$$FAR_{Z\infty \cup CN} = 1 - \Sigma_{(i,j)\in Z\infty} P_{fm}(i,j) - \Sigma_{(i,j)\in C_N} P_{fm}(i,j) \leq FAR.$$

The FRR may be determined 31, where $FRR = \Sigma_{(i,j)\in C_N} P_m(i,j)$, and compared 34 to a desired false-rejection-rate. If FRR is greater than the desired false-rejection-rate, then the data set may be rejected 37, even though $FAR_{Z\infty}$ is less than or equal to the desired false-acceptance-rate. Otherwise, the data set may be accepted.

Figure 16:
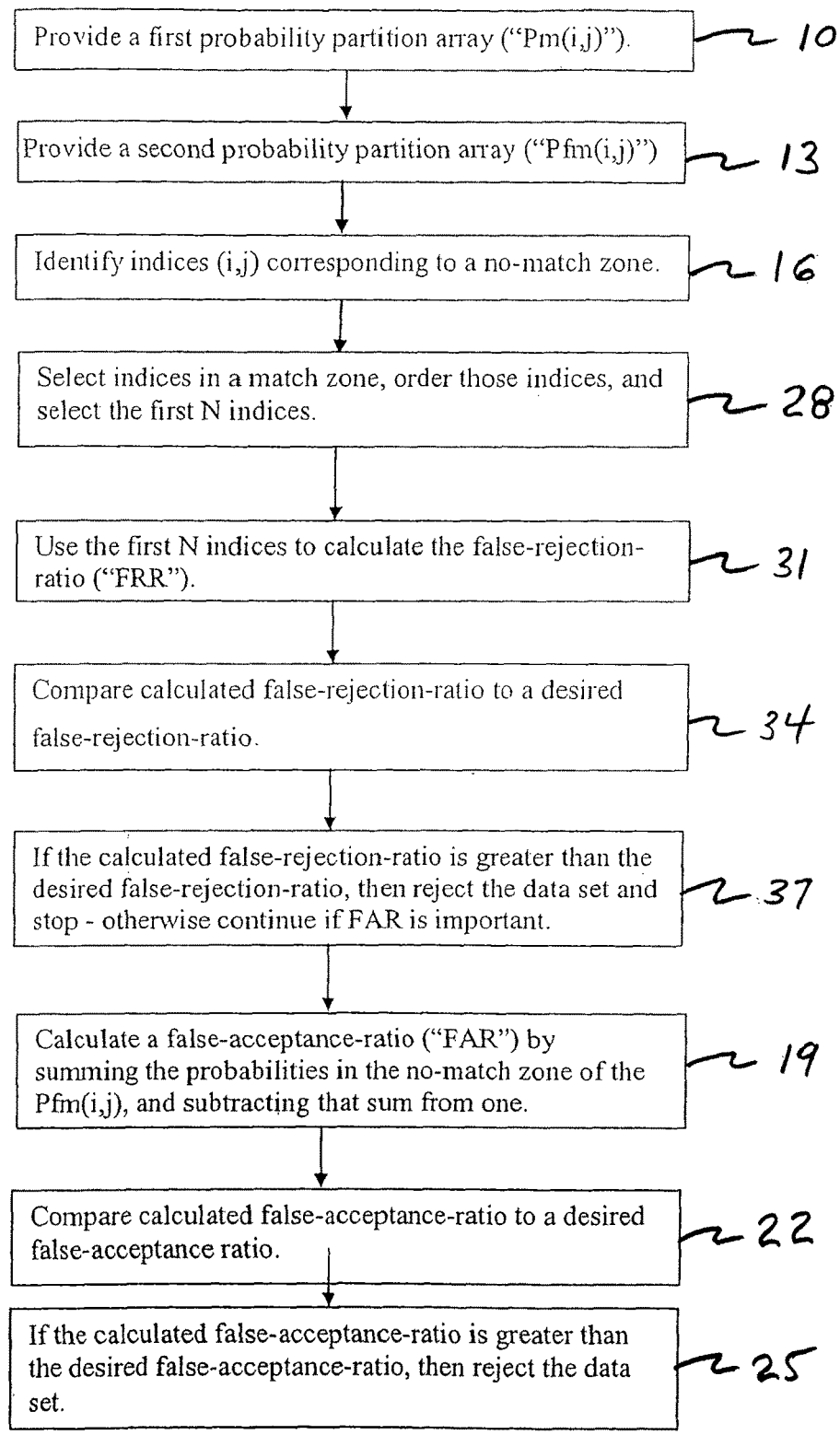
FIG. 16, which depicts another method according to the invention.

FIG. 16 illustrates another method according to the invention in which the FRR may be calculated first. In FIG. 16, the reference numbers from FIG. 15 are used, but some of the steps in FIG. 16 may vary somewhat from those described above. In such a method, a first index set ("A") may be identified, the indices in A being the (i,j) indices that have values in both Pfm(i,j) and Pm(i,j). A second index set ("Z∞"), which is the no match zone, may be identified 16. The indices of Z∞ may be the (i,j) indices of A where Pm(i,j) is equal to zero. Here we use the more inclusive definition for the no-match zone because the calculation of set C comes earlier in the process. A third index set ("C") may be identified, the indices of C being the (i,j) indices that are in A but not Z∞. The indices of C may be arranged such that $$\frac{P_{fm}(i,j)_k}{P_m(i,j)_k} >= \frac{P_{fm}(i,j)_{k+1}}{P_m(i,j)_{k+1}}$$

to provide an arranged C index, and a fourth index set ("Cn") may be identified. The indices of Cn may be the first N (i,j) indices of the arranged C index, where N is a number for which the following is true: $FAR_{Z\infty \cup C_N} = 1 - \Sigma_{(i,j)\in Z\infty} P_{fm}(i,j) - \Sigma_{(i,j)\in C_N} P_{fm}(i,j) \leq FAR$. The FRR may be determined, where $FRR = \Sigma_{(i,j)\in C_N} P_m(i,j)$, and compared to a desired false-rejection-rate. If the FRR is greater than the desired false-rejection-rate, then the data set may be rejected. If the FRR is less than or equal to the desired false-rejection-rate, then the data set may be accepted, if false-acceptance-rate is not important. If false-acceptance-rate is important, the $FAR_{Z\infty}$ may be determined, where $FAR_{Z\infty} = 1 - \Sigma_{(i,j)\in Z\infty} P_{fm}(i,j)$. Since the more inclusive definition is used for Z∞ in this method, and that more inclusive definition does not affect the value of $FAR_{Z\infty}$, we need not add back the indices where both Pfm(i,j)=Pm(i,j)=0. The $FAR_{Z\infty}$ may be compared to a desired false-acceptance-rate, and if $FAR_{Z\infty}$ is greater than the desired false-acceptance-rate, then the data set may be rejected. Otherwise, the data set may be accepted.

It may now be recognized that a simplified form of a method according to the invention may be executed as follows:

step 1: provide a first probability partition array ("Pm (i,j)"), the Pm(i,j) being comprised of probability values for information pieces in the data set, each probability value in the Pm(i,j) corresponding to the probability of an authentic match;

step 2: provide a second probability partition array ("Pfm (i,j)"), the Pfm(i,j) being comprised of probability values for information pieces in the data set, each probability value in the Pfm(i,j) corresponding to the probability of a false match;

step 3: identify a first index set ("A"), the indices in set A being the (i,j) indices that have values in both Pfm(i,j) and Pm(i,j);

step 4: execute at least one of the following:
(a) identify a first no-match zone ("Z1∞") that includes at least the indices of set A for which both Pfm(i,j) is larger than zero and Pm(i,j) is equal to zero, and use Z1∞ to determine $FAR_{Z\infty}$, where $FAR_{Z\infty} = 1 - \Sigma_{(i,j)\in Z\infty} P_{fm}(i,j)$, and compare $FAR_{Z\infty}$ to a desired false-acceptance-rate, and if $FAR_{Z\infty}$ is greater than the desired false-acceptance-rate, then reject the data set;

(b) identify a second no-match zone ("Z2∞") that includes the indices of set A for which Pm(i,j) is equal to zero, and use Z2∞ to identify a second index set ("C"), the indices of C being the (i,j) indices that are in A but not Z2∞, and arrange the (i,j) indices of C such that $$\frac{P_{fm}(i,j)_k}{P_m(i,j)_k} >= \frac{P_{fm}(i,j)_{k+1}}{P_m(i,j)_{k+1}}$$

to provide an arranged C index, and identify a third index set ("Cn"), the indices of Cn being the first N (i,j) indices of the arranged C index, where N is a number for which the following is true:

$$FAR_{Z\infty \cup C_N} = 1 - \Sigma_{(i,j)\in Z\infty} P_{fm}(i,j) - \Sigma_{(i,j)\in C_N} P_{fm}(i,j) \leq FAR$$

and determine FRR, where $FRR = \Sigma_{(i,j)\in C_N} P_m(i,j)$, and compare FRR to a desired false-rejection-rate, and if FRR is greater than the desired false-rejection-rate, then reject the data set.

If $FAR_{Z\infty}$ is less than or equal to the desired false-acceptance-rate, and FRR is less than or equal to the desired false-rejection-rate, then the data set may be accepted. Z1∞ may be expanded to include additional indices of set A by including in Z1∞ the indices of A for which Pm(i,j) is equal to zero. In this manner, a single no-match zone may be defined and used for the entire step 4.

Figure 17:
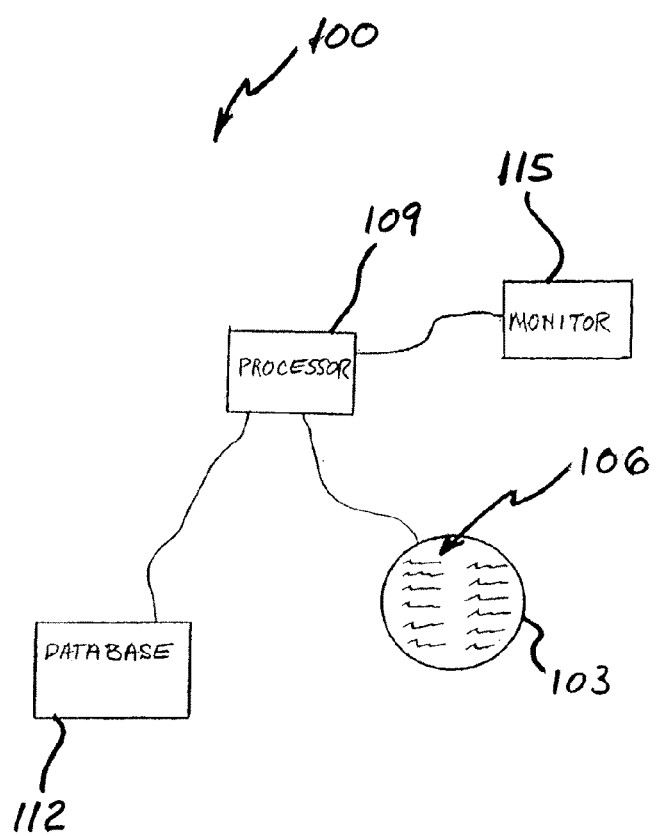
FIG. 17, which depicts a memory device according to the invention.
Figure 18:
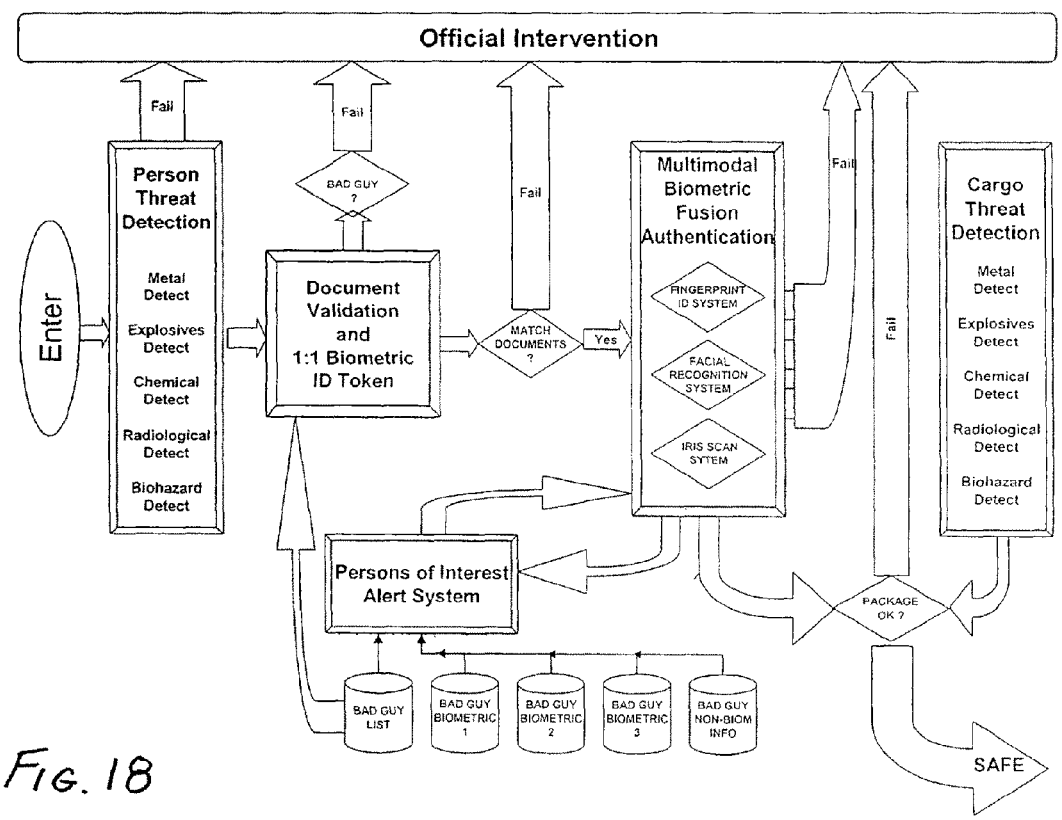
FIG. 18, which is an exemplary embodiment flow diagram demonstrating a security system typical of and in accordance with the methods presented by this invention.

The invention may also be embodied as a computer readable memory device for executing a method according to the invention, including those described above. See FIG. 17. For example, in a system 100 according to the invention, a memory device 103 may be a compact disc having computer readable instructions 106 for causing a computer processor 109 to execute steps of a method according to the invention. A processor 109 may be in communication with a data base 112 in which the data set may be stored, and the processor 109 may be able to cause a monitor 115 to display whether the data set is acceptable. Additional detail regarding a system according to the invention is provided in FIG. 18. For brevity, the steps of such a method will not be outlined here, but it should suffice to say that any of the methods outlined above may be translated into computer readable code which will cause a computer to determine and compare $FAR_{Z\infty}$ and/or FRR as part of a system designed to determine whether a data set is acceptable for making a decision.

Algorithm for Estimating a Joint PDF Using a Gaussian Copula Model

If all the score producing recognition systems that comprise a biometric identification system were statistically independent, then it is well known that the joint pdf is a product of its marginal probability density functions (the "marginal densities"). It is almost certain that when we use multiple methods within one modality (multiple fingerprint matchers and one finger) or multiple biometric features of a modality within one method (multiple fingers and one fingerprint matcher or multiple images of the same finger and one fingerprint matcher) that the scores will be correlated. It is possible that different modalities are not statistically independent. For example, we may not be sure that fingerprint identification scores are independent of palm print identification scores, and we may not be sure these are different modalities.

Correlation leads to the "curse of dimensionality." If we cannot rule out correlation in an n-dimensional biometric system of "n" recognition systems, then to have an accurate representation of the joint pdf, we would need to store an n-dimensional array. Because each dimension can require a partition of 1000 bins or more, an "n" of four or more could easily swamp storage capacity.

Fortunately, an area of mathematical statistics known as copulas provides an accurate estimate of the joint pdf by weighting a product of the marginal densities with a n-dimensional normal distribution that has the covariance of the correlated marginals. This Gaussian copula model is derived in [1: Nelsen, Roger B., *An Introduction to Copulas, 2nd Edition*, Springer 2006, ISBN 10-387-28659-4]. Copulas are a relatively new area of statistics; as is stated in [1], the word "copula" did not appear in the *Encyclopedia of Statistical Sciences* until 1997 and [1] is essentially the first text on the subject. The theory allows us to defeat the "curse" by storing the one-dimensional marginal densities and an n-by-n covariance matrix, which transforms storage requirements from products of dimensions to sums of dimensions—or in other words, from billions to thousands.

A biometric system with "n" recognitions systems that produce "n" scores $s=[s_1, s_2, \ldots, s_n]$ for each identification event has both an authentic and an impostor cdf of the form $F(s_1, s_2, \ldots, s_n)$ with an n-dimensional joint density $f(s_1, s_2, \ldots, s_n)$. According to Sklar's Theorem (see [1] and [2: Duss, Sarat C., Nandakumar, Karthik, Jain, Anil K., *A Principled Approach to Score Level Fusion in Multimodal Biometric Systems*, Proceedings of AVBPA, 2005]), we can represent the density f as the product of its associated marginals, $f_i(s_i)$, for $i=1, \ldots, n$, and an n-dimensional Gaussian copula function with correlation matrix R is given by $$C_{R_{n \times n}}(x_1, x_2, \ldots, x_n) = \Phi_{R_{n \times n}}(\Phi^{-1}(x_1), \Phi^{-1}(x_2) \ldots \Phi^{-1}(x_n)) \quad (74)(1)$$

In Equation 74, $x_i \in [0,1]$ for $i=1, \ldots, n$, $\Phi$ is the cdf of the standard normal distribution and $\Phi^{-1}$ is its inverse, and $\Phi_{R_{n \times n}}$ is an n-dimensional Gaussian cdf whose arguments are the random deviates of standard normal distributions, that is they have a mean of zero and a standard deviation of unity. $\Phi_{R_{n \times n}}$ is assumed to have covariance given by R and a mean of zero. Hence the diagonal entries of R are unity, and, in general, the off diagonal entries are non-zero and measure the correlation between components.

The density of $C_{R_{n \times n}}$ is obtained by taking its $n^{th}$ order mixed partial of Equation 74:

$$c_{R_{m \times n}}(x_1, x_2 \ldots x_n) = \frac{\partial(\Phi_{R_{n \times m}}(\Phi^{-1}(x_1), \Phi^{-1}(x_2) \ldots \Phi^{-1}(x_n)))}{\partial x_1 \partial x_2 \ldots \partial x_n} = \qquad (75)(2)$$

$$\frac{\phi_{R_{n \times n}}(\Phi^{-1}(x_1), \Phi^{-1}(x_2) \ldots \Phi^{-1}(x_n))}{\prod_{i=1}^{n} \phi(\Phi^{-1}(x_i))}$$

where $\phi$ is the pdf of the standard normal distribution and $\phi_{R_{n \times n}}$ is the joint pdf of $\Phi_{R_{n \times n}}$ and is n-dimensional normal distribution with mean zero and covariance matrix R. Hence, the Gaussian copula function can be written in terms of the exponential function:

$$c_{R_{n \times n}}(x) = \frac{\frac{1}{(\sqrt{2\pi})^n |R|} \exp\left(-\frac{1}{2} z^T R^{-1} z\right)}{(\sqrt{2\pi})^n \prod_{i=1}^{n} e^{-\frac{1}{2} z_i^2}} \qquad (3)(76)$$

$$= \frac{1}{|R|} \exp\left(-\frac{1}{2} z^T R^{-1} z + \prod_{i=1}^{n} \frac{z_i^2}{2}\right)$$

where $|R|$ is the determinant of the matrix R, $x=[x_1, x_2, \ldots, x_n]^T$ is an n-dimensional column vector (the superscript T indicates transpose), and $z=[z_1, z_2, \ldots, z_n]^T$ is an n-dimensional column vector with $z_i = \Phi^{-1}(x_i)$.

The score tuple $s=[s_1, s_2, \ldots, s_n]$ of an n-dimensional biometric identification system is distributed according to the joint pdf $f(s_1, s_2, \ldots, s_n)$. The pdf f can be either the authentic pdf, $f_{Au}$, or the impostor pdf, $f_{Im}$. The associated marginals are $f_i(s_i)$, for $i=1, \ldots, n$, which have cumulative distribution functions $F_i(s_i)$.

Sklar's Theorem guarantees the existence of a copula function that constructs multidimensional joint distributions by coupling them with the one-dimensional marginals [1][2]. In general, the Gaussian copula function in Equation 74 is not that function, but it serves as a good approximation. So, if we set $z_i = \Phi^{-1}(F_i(s_i))$ for $i=1, \ldots, n$, then we can use Equation 76 to estimate the joint density as $$f(s_i, s_2, \ldots s_n) \approx \frac{\prod_{i=1}^{n} f_i(s_i) \exp\left(-\frac{1}{2} z^T R^{-1} z + \prod_{i=1}^{n} \frac{z_i^2}{2}\right)}{|R|} \qquad (4)(77)$$

Equation 77 is the copula model that we use to compute the densities for the Neyman-Pearson ratio. That is, $$\lambda = \frac{f_{Au}}{f_{Im}} = \frac{\dfrac{\prod_{i=1}^{n} f_{Au_i}(s_i) \exp\left(-\frac{1}{2} z^T R_{Au}^{-1} z + \prod_{i=1}^{n} \frac{z_i^2}{2}\right)}{|R_{Au}|}}{\dfrac{\prod_{i=1}^{n} f_{Im_i}(s_i) \exp\left(-\frac{1}{2} z^T R_{Im}^{-1} z + \prod_{i=1}^{n} \frac{z_i^2}{2}\right)}{|R_{Im}|}} \qquad (5)(78)$$

The densities $f_{Au}$ and $f_{Im}$ are assumed to have been computed in another section using non-parametric techniques and extreme value theory, an example of which appears below. To compute $R_{Au}$ and $R_{Im}$ we need two sets of scores. Let $S_{Au}$ be a simple random sample of $n_{Au}$ authentic score tuples. That is, $S_{Au} = \{s_{Au}^1, s_{Au}^2, \ldots, s''_{Au}{}^{Au}\}$, where $s_{Au}^i$ is a column vector of scores from the "n" recognition systems. Likewise, let $S_{Im} = \{s_{Im}^1, s_{Im}^2, \ldots, s''_{Im}{}^{Im}\}$ be a simple random sample of $n_{Im}$ impostor scores. We compute the covariance matrices for $S_{Au}$ and $S_{Im}$ with $$C_{Au} = \sum_{i=1}^{n_{Au}} (s_{Au}^i - \bar{s}_{Au})(s_{Au}^i - \bar{s}_{Au})^T \text{ and}$$

$$C_{Im} = \sum_{i=1}^{n_{Im}} (s_{Im}^i - \bar{s}_{Im})(s_{Im}^i - \bar{s}_{Im})^T,$$

where $\bar{s}_{Au}$ and $\bar{s}_{Im}$ are the sample means of $S_{Au}$ and $S_{Im}$ respectively. As mentioned above, the diagonal entries of the associated R matrices are unity because the copula components are standard normal distributions, and the off diagonal entries are the correlation coefficients in the C matrices just computed. Recall that the correlation coefficient between the $i^{th}$ and $j^{th}$ element of C, $i \neq j$, is given by $$\rho_{ij} = \frac{\sigma_{ij}}{\sqrt{\sigma_i \sigma_j}} = \frac{C(i, j)}{\sqrt{C(i, i)C(j, j)}}.$$

So, an algorithm to compute $R_{Au}$ is:

$$R_{Au}(i, j) = \frac{C_{Au}(i, j)}{\sqrt{C_{Au}(i, i)C_{Au}(j, j)}}$$

$$R_{Au}(j, i) = R_{Au}(i, j)$$

For i=1: $n_{Au}$
$R_{Au}(i,i)=1$

We compute $R_{Im}$ in a similar manner.

The only remaining values to compute in Equation 78 are $z_i = \Phi^{-1}(F_i(s_i))$ for each i. There are two values to compute: $x_i = F_i(s_i)$ and then $z_i = \Phi^{-1}(x_i)$. We compute $x_i = F_i(s_i)$ by numerically computing the integral:

$$x_i = \int_{s_{min_i}}^{s_i} f_i(x)dx.$$

Note that $x_i = F_i(s_i)$ is the probability of obtaining a score less than $s_i$, hence $x_i \in [0,1]$. The value $z_i = \Phi^{-1}(x_i)$ is the random deviate of the standard normal distribution for which there is probability $x_i$ of drawing a value less than $z_i$, hence $x_i \in (-\infty, \infty)$. We numerically solve $z_i = \Phi^{-1}(x_i) = \sqrt{2}\text{erf}^{-1}(2x_i - 1)$, where $\text{erf}^{-1}(x)$ is the inverse error function.

Use of Extreme Values

Statistical modeling of biometric systems at score level may be extremely important. It can be the foundation for biometric systems performance assessment, including determination of confidence intervals, test sample size of a simulation and prediction of real world system performances. Statistical modeling used in multimodal biometric systems integrates information from multiple biometric sources to compensate for the limitations in performance of each individual biometric system. We propose a new approach for estimating marginal biometric matching score distributions by using a combination of non-parametric methods and extreme value theory. Often the tail parts of the score distributions are problematic and difficult to estimate due to lack of testing samples. Below, we describe procedures for fitting a score distribution curve. A general non-parametric method is used for fitting the center body part of a distribution curve. A parametric model, the general Pareto distribution, is used for fitting the tail parts of the curve, which is theoretically supported by extreme value theory. A biometric fusion scheme using Gaussian copula may be adapted to incorporate a set of marginal distributions estimated by the proposed procedures.

Biometric systems authenticate or identify subjects based on their physiological or behavioral characteristics such as fingerprints, face, voice and signature. In an authentication system, one is interested in confirming whether the presented biometric is in some sense the same as or close to the enrolled biometrics of the same person. Generally biometric systems compute and store a compact representation (template) of a biometric sample rather than the sample of a biometric (a biometric signal). Taking the biometric samples or their representations (templates) as patterns, an authentication of a person with a biometric sample is then an exercise in pattern recognition.

Let the stored biometric template be pattern P and the newly acquired pattern be $P^1$. In terms of hypothesis testing, $H_0$: P=P', the claimed identity is correct; (38)

$H_1$: P≠P', the claimed identity is not correct,

Often some similarity measure $s = \text{Sim}(P, P^1)$ determines how similar patterns P and $P^1$ are. Decisions are made based on a decision threshold t. In most applications this threshold is fixed, i.e., $t = t_0$ and $H_0$ is decided if $s \geq t_0$ and $H_1$ is decided if $s < t_0$.

Figure 19:
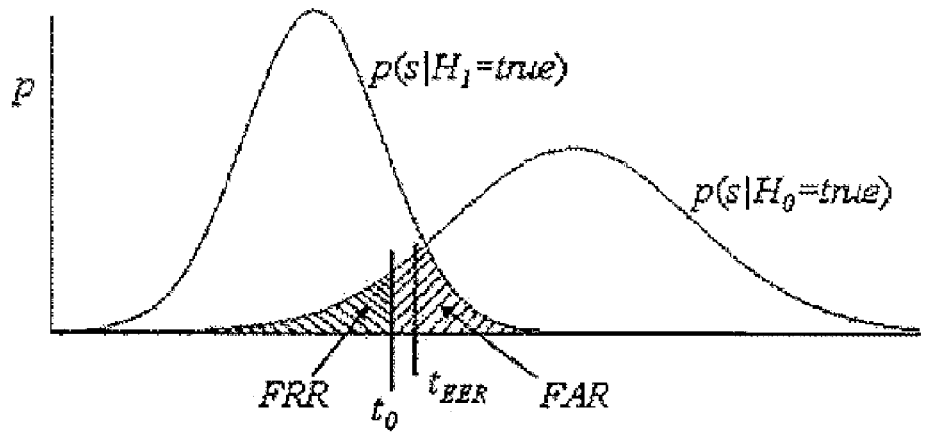
FIG. 19, which shows probability density functions (pdfs) of mismatch (impostor) and match (genuine) scores. The shaded areas denote FRR and FAR.

The similarity measure s is often referred to as a score. If s is the score of a matched pair P=P', we refer to s as a match (genuine) score; if s is the score of a mismatched pair P≠P', we refer to s as a non-match or mismatch (impostor) score. Deciding $H_0$ when $H_1$ is true gives a false accept (FA), erroneously accepting an individual (false positive). Deciding $H_1$ when $H_0$ is true, on the other hand, results in a false reject (FR), incorrectly rejecting an individual (false negative). The False Accept Rate (FAR) and False Reject Rate (FRR) together characterize the accuracy of a recognition system, which can be expressed in terms of cumulative probability distributions of scores. The FAR and FRR are two interrelated variables and depend very much on decision threshold $t_0$ (see FIG. 19).

Biometric applications can be divided into two types: verification tasks and identification tasks. For verification tasks a single matching score is produced, and an application accepts or rejects a matching attempt by thresholding the matching score. Based on the threshold value, performance characteristics of FAR and FRR can be estimated. For identification tasks a set of N matching scores $\{s_1, s_2, \ldots, s_N\}$, $s_1 > s_2 > \ldots > s_N$ is produced for N enrolled persons. The person can be identified as an enrollee corresponding to the best ranked score $s_1$, or the identification attempt can be rejected. Based on the decision algorithm FAR and FRR can be estimated. The usual decision algorithm for verification and identification involves setting some threshold $t_0$ and accepting a matching score s if this score is greater than threshold: $s > t_0$.

The objective of this work is to model the behavior of a biometric system statistically in terms of Probability Density Functions (PDFs). The data we present for purposes of illustrating the invention are basically two types, the biometric matching scores of genuine and impostor. In a biometric verification system, we are mostly concerned with the distribution of genuine matching scores. For an identification system, we also need to know the behavior of the impostor matching scores as well as the relation between genuine score distribution and impostor score distribution.

Applications of statistic modeling also include the following [1]:
1. Evaluation of a biometric technique:
   a) Distinctiveness evaluation, statistical modeling of the biometric modalities to study how well they distinguish persons absolutely.
   b) Understanding of error probabilities and correlations between different biometric modalities.
2. Performance prediction:
   a) Statistical prediction of operational performance from laboratory testing.

b) Prediction of large database identification performance from small-scale performance.
3. Data quality evaluation:
   a) Quality evaluation of biometric data, relating biometric sampling quality to performance improvement.
   b) Standardization of data collection to ensure quality; determine meaningful metrics for quality.
4. System performance:
   a) Modeling the matching process as a parameterized system accounting for all the variables (joint probabilities).
   b) Determine the best payoff for system performance improvement.

The behavior of distributions can be modeled by straightforward parametric methods, for example, a Gaussian distribution can be assumed and a priori training data can be used to estimate parameters, such as the mean and the variance of the model. Such a model is then taken as a normal base condition for signaling error or being used in classification, such as a Bayesian based classifiers. More sophisticated approaches use Gaussian mixture models [2] or kernel density estimates [3]. The main limitation of all of these methods is that they make an unwarranted assumption about the nature of the distribution. For instance, the statistical modeling based on these methods weigh on central statistics such as the mean and the variance, and the analysis is largely insensitive to the tails of the distribution. Therefore, using these models to verify biometrics can be problematic in the tail part of the distribution. An incorrect estimation of a distribution especially at tails or making an unwarranted assumption about the nature of the PDFs can lead to a false positive or a false negative matching.

There is a large body of statistical theory based on extreme value theory (EVT) that is explicitly concerned with modeling the tails of distributions. We believe that these statistical theories can be applied to produce more accurate biometric matching scores. Most of the existing works that we consider as related to our work using extreme value theory are for novelty detections in medical image processing [2], [4], [5], financial risk management [6], [7], structure damage control [8], etc. Extreme values can be considered as outliers or as a particular cluster. The methods used for the detection of extreme values are based on the analysis of residuals.

This document describes a general statistical procedure for modeling probability density functions (PDFs) which can be used for a biometric system. The design of the algorithm will follow a combination of non-parametric approach and application of extreme value theory for accurate estimation of the PDFs.

Previous Works

A. Distribution Estimations for Biometric Systems. Statistical modeling has long been used in pattern recognition. It provides robust and efficient pattern recognition techniques for applications such as data mining, web searching, multimedia data retrieval, face recognition, and handwriting recognition. Statistical decision making and estimation are regarded as fundamental to the study of pattern recognition [7]. Generally, pattern recognition systems make decisions based on measurements. Most of the evaluation and theoretical error analysis are based on assumptions about the probability density functions (PDFs) of the measurements. There are several works which have been done for estimating error characteristics specifically for biometric systems [9]-[11].

Assume a set of matching (genuine) scores $X=\{X_1, \ldots, X_M\}$ and a set of mismatching (impostor) scores $Y=\{Y_1, \ldots, Y_N\}$ to be available. Here M<N because collecting biometrics always results in more mismatching than matching pairs. (From this it immediately follows that the FAR can be estimated more accurately than the FRR [10]). For the set of matching scores, X, assume that it is a sample of M numbers drawn from a population with distribution $F(x)=Prob(X \leq x)$. Similarly, let the mismatch scores Y be a sample of N numbers drawn from a population with distribution $G(y)=Prob(Y \leq y)$. The functions F and G are the probability distributions or cumulative distribution functions of match scores X and Y. They represent the characteristic behaviors of the biometric system. Since the random variables X and Y are matching scores, the distribution functions at any particular value $x=t_0$ can be estimated by $\hat{F}(t_0)$ and $\hat{F}(t_0)$ using data X and Y. In [10], [11] a simple naive estimator that is also called empirical distribution function is used:

$$\hat{F}(t_0) = \frac{1}{M}\sum_{i=1}^{M} 1_{\{x_i \leq t_0\}} = \frac{1}{M}(\# X_i \leq t_0) \tag{39}$$

where the estimation is simply done by counting the $X_i \in X$ that are smaller than to and dividing by M.

In general, there are many other choices for estimating data such as matching scores. For example, among the parametric models and non-parametric models, the kernel-based methods are generally considered to be a superior non-parametric model than the naive formula in (39).

B. Another Similar Approach. In [13], another similar approach is proposed, which uses an estimate (39) for constructing the marginal distribution functions F from the observed vector of similarity scores, $\{X_i: i=1, 2, \ldots, N\}$. The same empirical distribution function for the marginal distribution is written as $$E(t) = \frac{1}{N}\sum_{i=1}^{N} I(X_i \leq t) \tag{40}$$

where I(A) is the indicator function of the set A; I(A)=1 if A is true, and 0 otherwise. Note that E(t)=0 for all $t<t_{min}$ and E(t)=1 for all $t \geq t_{max}$, where $t_{min}$ and $t_{max}$, respectively, are the minimum and maximum of the observations $\{X_i: i=1, \ldots, N\}$. Next, they define $H(t)=-\log(1-E(t))$, and note that discontinuity points of E(t) will also be points of discontinuity of H(t). In order to obtain a continuous estimate of H(t), the following procedure is adopted: For an M-partition [ ], the value of H(t) at a point $t \in [t_{min}, t_{max}]$ is redefined via the linear interpolation formula $$H(t) = H(t_m) + (h(t_{m+1}) - H(t_m)) \cdot \frac{t - t_m}{t_{m+1} - t_m} \tag{41}$$

whenever $t_m \leq t \leq t_{m+1}$ and subsequently, the estimated distribution function, $\hat{F}(t)$, of $\hat{F}(t)$ is obtained as $$\hat{F}(t) = 1 - e^{-\hat{H}(t)} \tag{42}$$

It follows that $\hat{F}(t)$ is a continuous distribution function. Next they generate B*=1,000 samples from $\hat{F}$:
(1) Generate a uniform random variable U in [0,1];
(2) Define V=−log(1−U), and
(3) Find the value V* such that $\hat{H}(V^*)=V$.

It follows that V* is a random variable with distribution function $\hat{F}$. To generate 1,000 independent realizations from $\hat{F}$, the steps (1-3) are repeated 1,000 times. Finally, a nonparametric density estimate of F is obtained based on the simulated samples using a Gaussian kernel.

Although they did not explain why the simulation or estimation procedure is so designed, we can see the underlying assumption is basically that the data follows the exponential distribution. This can be roughly seen from the following explanation. Firstly, we define an exponential distribution function by $G(t)=1-e^{-t}$. Then the above $H(t)=-\log(1-E(t))=G^{-1}(E(t))$ is actually exponential quantile of the empirical distribution, which is a random variable hopefully following exponential distribution. The linear interpolation $\hat{H}(t)$ of $H(t)$ is then an approximation of the random variable. Also $\hat{F}(t)$ is $$\hat{F}(t)=G(\hat{H}(t)).$$

To generate simulation data, as usual, start from uniform random variable U in [0,1], data following distribution $\hat{F}$ is then generated as $$V^*=\hat{F}^{-1}(U)=\hat{H}^{-1}G^{-1}(U).$$

C. The Problems. When attempting to fit a tail of a pdf using other techniques, certain problems arise or are created. They include:

- Unwarranted assumption about the nature of the distribution.
- Types of data used in estimation (most data are regular, the problematic data such as outliers and clusters which contribute most of the system errors are not addressed or not address enough).
- Forgotten error analysis/estimation (decision boundaries are usually heuristic without enough understanding, which may end up with higher than lab estimated errors).

Data Analysis

For biometric matching scores, we usually adopt that a higher score means a better match. The genuine scores are generally distributed in a range higher than the corresponding impostor scores are. For most biometric verification/identification systems, an equal error rate (EER) of 5% or lower is expected. Among such systems, those for fingerprint verification can normally get even 2% EER. For setting an optimal threshold level for a new biometric system as well as assessing the claimed performance for a vendor system, estimations of the tail distributions of both genuine and impostor scores are critical (See FIG. 19).

Most statistical methods weigh on central statistics such as the mean and the variance, and the analysis is largely insensitive to the tails of the distribution. Verification of biometrics is problematic mostly in the tail part of the distribution, and less problematic in the main body of the PDF. An incorrect estimation of a distribution especially at the tails can lead to false positive and false negative responses.

In fact, there is a large body of statistical theory based on extreme value theory (EVT) that is explicitly concerned with modeling the tails of distributions. We believe that these statistical theories can be applied to produce fewer false positives and fewer false negatives.

Although we are interested in the lower end of the genuine score distribution, we usually reverse the genuine scores so that the lower end of the distribution is flipped to the higher end when we work on finding the estimation of the distribution. Let us first concentrate on this reversed genuine matching scores and consider our analysis for estimation of right tail distributions.

To use Extreme Value Statistic Theory to estimate the right tail behaviors, we treat the tail part of the data as being realizations of random variables truncated at a displacement σ. We only observe realizations of the reversed genuine scores which exceed σ.

Figure 20:
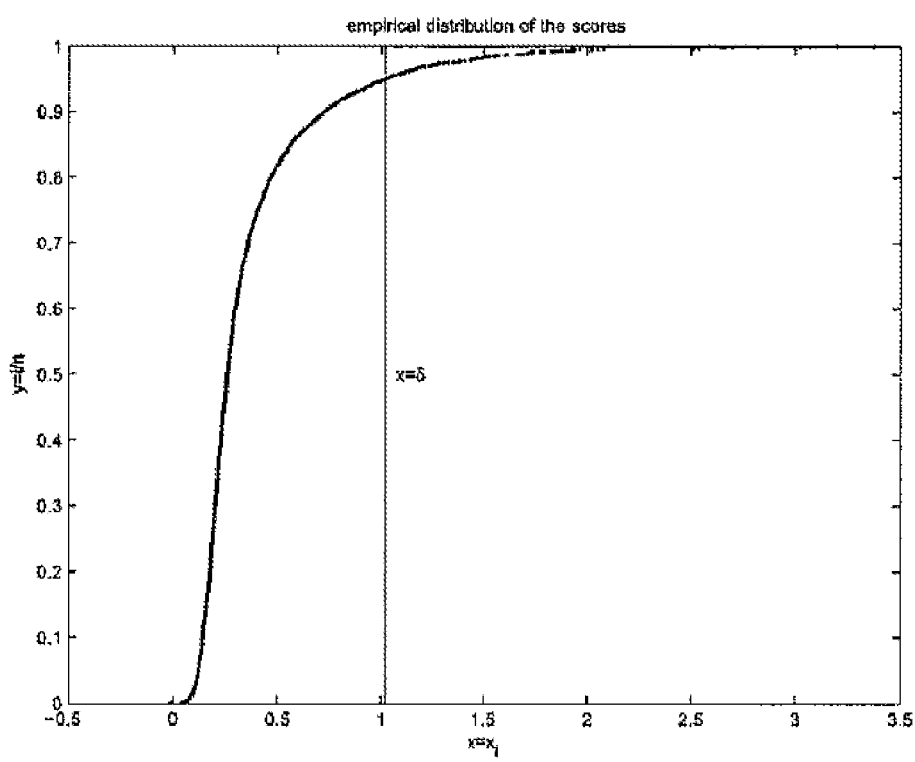
FIG. 20, which depicts empirical distribution of genuine scores of CUBS data generated on DB1 of FVC 2004 fingerprint images.

The distribution function (d.f.) of the truncated scores can be defined as in Hogg & Klugman (1984) by $$F_{X^\delta}(x) = P\{X \le x/X > \delta\} = \begin{cases} 0 & \text{if } x \le \delta, \\ \dfrac{F_x(x) - F_x(\delta)}{1 - F_x(\delta)} & \text{if } x \le \delta, \end{cases}$$

and it is, in fact, the d.f. that we shall attempt to estimate. FIG. 20 depicts the empirical distribution of genuine scores of CUBS data generated on DB1 of FVC2004 fingerprint images. The vertical line indicates the 95% level.

With adjusted (reversed) genuine score data, which we assume to be realizations of independent, identically distributed, truncated random variables, we attempt to find an estimate $\hat{F}_{X^\delta}(x)$, of the truncated score distribution $F_{X^\delta}(x)$. One way of doing this is by fitting parametric models to data and obtaining parameter estimates which optimize some fitting criterion—such as maximum likelihood. But problems arise when we have data as in FIG. 20 and we are interested in a high-excess layer, that is to say the extremes of the tail where we want to estimate, but for which we have little or no data.

FIG. 20 shows the empirical distribution function of the CUBS genuine fingerprint matching data evaluated at each of the data points. The empirical d.f. for a sample of size n is defined by $$F_n(x) = \frac{1}{n}\sum_{i=1}^{n} 1_{\{X_i \le x\}}$$

i.e. the number of observations less than or equal to x divided by n. The empirical d.f. forms an approximation to the true d.f. which may be quite good in the body of the distribution; however, it is not an estimate which can be successfully extrapolated beyond the data.

The CUBS data comprise 2800 genuine matching scores that is generated using DB1 of FVC 2004 fingerprint images (database #1 of a set of images available from the National Bureau Of Standards, fingerprint verification collection).

Suppose we are required to threshold a high-excess layer to cover the tail part 5% of the scores. In this interval we have only 139 scores. A realistic ERR level of 2% tail will leave us only 56 scores. If we fit some overall parametric distribution to the whole dataset it may not be a particularly good fit in this tail area where the data are sparse. We must obtain a good estimate of the excess distribution in the tail. Even with a good tail estimate we cannot be sure that the future does not hold some unexpected error cases. The extreme value methods which we explain in the next section do not predict the future with certainty, but they do offer good models for explaining the extreme events we have seen in the past. These models are not arbitrary but based on rigorous mathematical theory concerning the behavior of extrema.

Extreme Value Theory

In the following we summarize the results from Extreme Value Theory (EVT) which underlie our modeling. General texts on the subject of extreme values include Falk, Husler & Reiss (1994), Embrechts, Kluppelberg & Mikosch (1997) and Reiss & Thomas (1996).

A. The Generalized Extreme Value Distribution. Just as the normal distribution proves to be the important limiting distribution for sample sums or averages, as is made explicit in the central limit theorem, another family of distributions proves important in the study of the limiting behavior of sample extrema. This is the family of extreme value distributions. This family can be subsumed under a single parameterization known as the generalized extreme value distribution (GEV). We define the d.f. of the standard GEV by $$H_\xi(x) = \begin{cases} e^{-(1+\xi x)^{-\frac{1}{\xi}}} & \text{if } \xi \neq 0, \\ e^{-e^{-x}} & \text{if } \xi = 0, \end{cases}$$

where x is such that $1+\xi x>0$ and $\xi$ is known as the shape parameter. Three well known distributions are special cases: if $\xi>0$ we have the Fréchet distribution with shape parameter $\alpha=1/\xi$; if $\xi=0$ we have the Weibull distribution with shape $\alpha=-1/\xi$; if $\xi=0$ we have the Gumbel distribution.

If we introduce location and scale parameters $\mu$ and $\delta>0$ respectively we can extend the family of distributions. We define the GEV $H_{\xi,\mu,\sigma}(x)$ to be $H_\xi((x-\mu)/\sigma)$ and we say that $H_{\xi,\mu,\sigma}$ is of the type $H_\xi$.

B. The Fisher-Tippett Theorem. The Fisher-Tippett theorem is the fundamental result in EVT and can be considered to have the same status in EVT as the central limit theorem has in the study of sums. The theorem describes the limiting behavior of appropriately normalized sample maxima.

If we have a sequence of i.i.d. ("independently and identically distributed") random variables $X_1, X_2 \ldots$ from an unknown distribution F. We denote the maximum of the first n observations by $M_n = \max\{X_1 \ldots X_n\}$. Suppose further that we can find sequences of real numbers $a_n>0$ and $b_n$ such that $(M_n-b_n)/a_n$, the sequence of normalized maxima, converges in distribution. That is $$P\{(M_n - b_n)/a_n \leq x\} = F^n(a_n x + b_n) \to H(x), \tag{43}$$

as $n \to \infty$, for some non-degenerate d.f. $H_{(x)}$. If this condition holds we say that F is in the maximum domain of attraction of F and we write F∈MDA(H).

It was show by Fisher & Tippet (1928) that

F∈MDA(H) ⇒ H is of the type $H_\xi$ for some $\xi$.

Thus, if we know that suitably normalized maxima converge in distribution, then the limit distribution must be an extreme value distribution for some value of the parameters $\xi$, $\mu$, and $\sigma$.

The class of distributions F for which the condition (43) holds is large. A variety of equivalent conditions may be derived (see Falk et at. (1994)).

Gnedenko (1943) showed that for $\xi>0$, F∈MDA($H_\xi$) if and only if $1-F(x)^{-1/\xi}L(x)$ for some slowly varying function L(x). This result essentially says that if the tail of the d.f. F(x) decays like a power function, then the distribution is in the domain of attraction of the Fréchet. The class of distributions where the tail decays like a power function is quite large and includes the Pareto, Burr, loggamma, Cauchy and t-distributions as well as various mixture models. These are all so-called heavy tailed distributions.

Distributions in the maximum domain of attraction of the Gumbel (MDA($H_0$)) include the normal, exponential, gamma and lognormal distributions. The lognormal distribution has a moderately heavy tail and has historically been a popular model for loss severity distributions; however it is not as heavy-tailed as the distributions in MDA($H_\xi$) for $\xi<0$. Distributions in the domain of attraction of the Weibull ($H_\epsilon$ for $\xi<0$) are short tailed distributions such as the uniform and beta distributions.

The Fisher-Tippett theorem suggests the fitting of the GEV to data on sample maxima, when such data can be collected. There is much literature on this topic (see Embrechts et al. (1997)), particularly in hydrology where the so-called annual maxima method has a long history. A well-known reference is Gumbel (1958).

C. The Generalized Pareto Distribution (GPD). Further results in EVT describe the behavior of large observations which exceed high thresholds, and these are the results which lend themselves most readily to the modeling of biometric matching scores. They address the question: given an observation extreme, how extreme might it be? The distribution which comes to the fore in these results is the generalized Pareto distribution (OPD). The GPD is usually expressed as a two parameter distribution with d.f.

$$G_{\xi,\sigma}(x) = \begin{cases} 1 - \left(1 + \frac{\xi}{\sigma}x\right)^{-\frac{1}{\xi}} & \text{if } \xi \neq 0, \\ 1 - e^{\frac{-x}{\sigma}} & \text{if } \xi = 0, \end{cases}$$

where $\sigma>0$, and the support is $x \geq 0$ when $\xi \geq 0$ and $0 \leq x \leq -\sigma/\xi$ when $\xi<0$. The GPD again subsumes other distributions under its parameterization. When $\xi>0$ we have a re-parameterized version of the usual Pareto distribution with shape $\alpha=1/\xi$; if $\xi<0$ we have a type II Pareto distribution; $\xi=0$ gives the exponential distribution.

Again we can extend the family by adding a location parameter $\mu$. The GPD $G_{\xi,\mu,\sigma}(x)$ is defined to be $G_{\xi,\sigma}(x-\mu)$.

D. The Pickands-Balkema-de Haan Theorem. Consider a certain high threshold u which might, for instance, be the general acceptable (low) level threshold for an ERR. At any event u will be greater than any possible displacement $\delta$ associated with the data. We are interested in excesses above this threshold, that is, the amount by which observations overshoot this level.

Let $x_0$ be the finite or infinite right endpoint of the distribution F. That is to say, $x_0 = \sup\{x \in R: F(x)<1\} \leq \infty$. We define the distribution function of the excesses over the high threshold u by $$F_u(y) = P\{X - u \leq y / X > u\} = \frac{F(y+u) - F(u)}{1 - F(u)}, \tag{44}$$

where X is a random variable and $y=x-u$ are the excesses. Thus $0 \leq y \leq x_0 - u$.

The theorem (Balkema & de Haan 1974, Pickands 1975) shows that under MDA ("Maximum Domain of Attraction") conditions (43) the generalized Pareto distribution (44) is the limiting distribution for the distribution of the excesses, as the threshold tends to the right endpoint. That is, we can find a positive measurable function $\sigma(u)$ such that $$\lim_{u \to x_0} \sup_{0 \leq y < x_0 - u} |F_u(y) - G_{\xi,\sigma(u)}(y)| = 0,$$

if and only if F∈MDA($H_\xi$).

This theorem suggests that, for sufficiently high thresholds u, the distribution function of the excesses may be approximated by $G_{\xi,\sigma}(y)$ for some values of $\xi$ and $\sigma$. Equivalently, for x−u≧0, the distribution function of the ground-up exceedances $F_u(x-u)$ (the excesses plus u) may be approximated by $G_{\xi,\sigma}(x-u) = G_{\xi,\mu,\sigma}(x)$.

The statistical relevance of the result is that we may attempt to fit the GPD to data which exceed high thresholds. The theorem gives us theoretical grounds to expect that if we choose a high enough threshold, the data above will show generalized Pareto behavior. This has been the approach developed in Davison (1984) and Davison & Smith (1990).

E. Fitting Tails Using GPD. If we can fit the GPD to the conditional distribution (45) of the excesses above a high threshold, we may also fit it to the tail of the original distribution above the high threshold For x≧u, i.e. points in the tail of the distribution, from (45), $$F(x) = F(y + u) \quad (45)$$
$$= (1 - F(u))F_u(y) + F(u)$$
$$= (1 - F(u))F_u(x - u) + F(u)$$

We now know that we can estimate $F_u(x-u)$ by $G_{\xi,\sigma}(x-u)$ for u large. We can also estimate $F(u) = P\{X \leq u\}$ from the data by $F_n(u)$, the empirical distribution function evaluated at u. This means that for x≧u we can use the tail estimate $$\hat{F}(x) = 1 - F_n(u))G_{\xi,\mu,\sigma}(x) + F_n(u) \quad (46)$$

to approximate the distribution function F(x). It is easy to show that $\hat{F}(x)$ is also a generalized Pareto distribution, with the same shape parameter $\xi$, but with scale parameter $\overline{\sigma} = \sigma(1-F_n(u))^\xi$ and location parameter $\overline{\mu} = \mu - \overline{\sigma}((1-F_n(u))^{-\xi}-1/\xi$.

F. Statistical Aspects. The theory makes explicit which models we should attempt to fit to biometric matching data. However, as a first step before model fitting is undertaken, a number of exploratory graphical methods provide useful preliminary information about the data and in particular their tail. We explain these methods in the next section in the context of an analysis of the CUBS data. The generalized Pareto distribution can be fitted to data on excesses of high thresholds by a variety of methods including the maximum likelihood method (ML) and the method of probability weighted moments (PWM). We choose to use the ML-method. For a comparison of the relative merits of the methods we refer the reader to Hosking & Wallis (1987) and Rootzén & Tajvidi (1996).

Analysis Using Extreme Value Techniques

Figure 21:
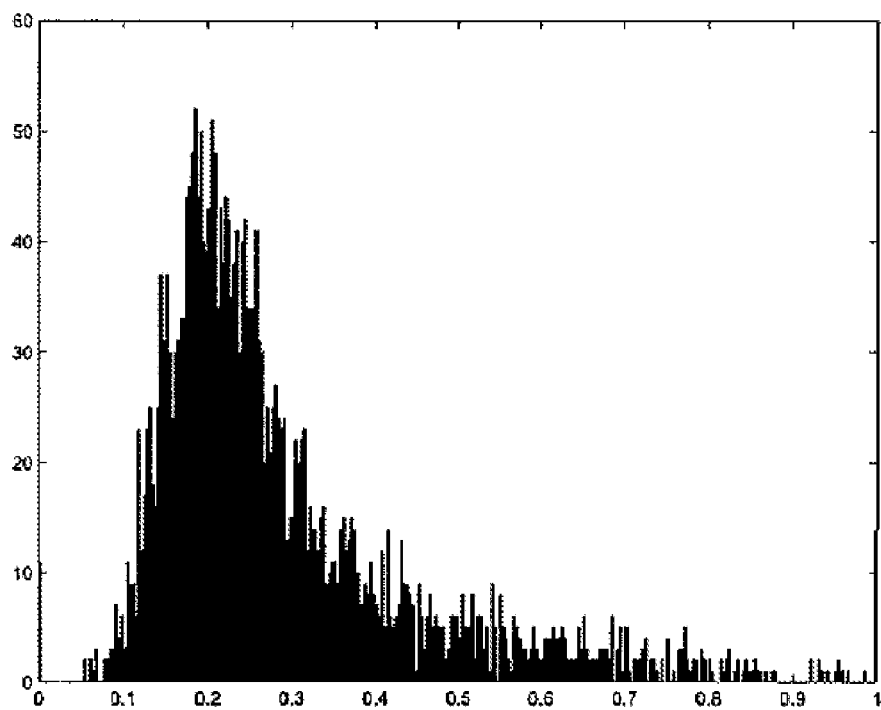
FIG. 21, which depicts a histogram of the CUBS genuine scores (flipped). Sample size is 2800.
Figure 22:
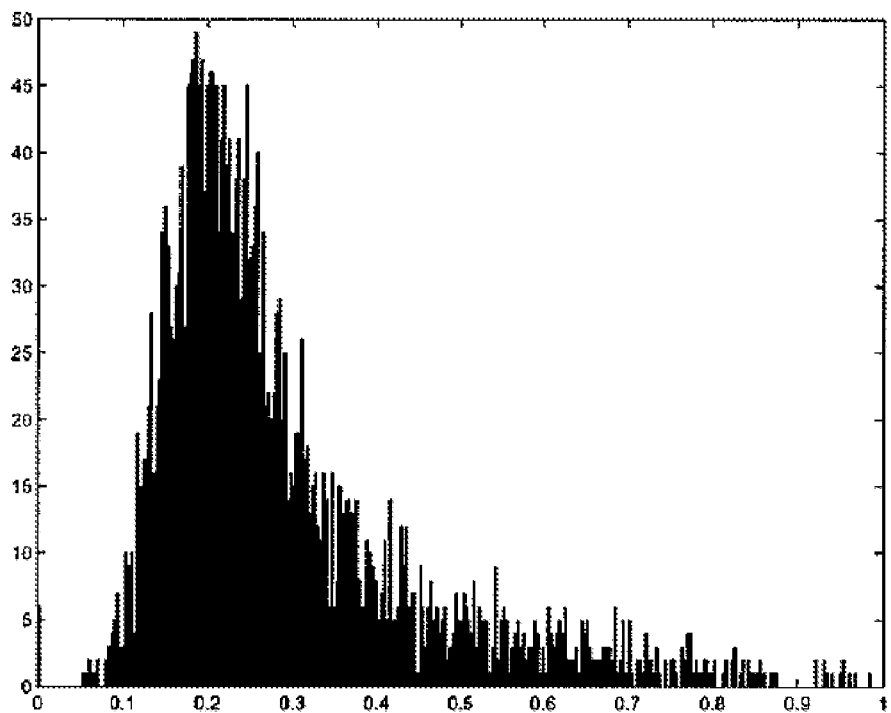
FIG. 22, which depicts a histogram of the CUBS genuine scores after removing repeated entries.

The CUBS Fingerprint Matching Data consist of 2800 genuine matching scores and 4950 impostor matching scores that are generated by CUBS fingerprint verification/identification system using DB1 of FVC 2004 fingerprint images. Results described in this section are from using the genuine matching scores for clarity, although the same results can be generated using the impostor scores. For convenience of applying EVS, we first flip (i.e. reverse the scores so that the tail is to the right) the genuine scores so that the higher values represent better matching. The histogram of the scores gives us an intuitive view of the distribution. The CUBS data values are re-scaled into range of [0,1]. See FIG. 21.

A. Quantile-Quantile Plot. The quantile-quantile plot (QQ-plot) is a graphical technique for determining if two data sets come from populations with a common distribution. A QQ-plot is a plot of the quantiles of the first data set against the quantiles of the second data set. By a quantile, we mean the fraction (or percent) of points below the given value. A 45-degree reference line is also plotted. If the two sets come from a population with the same distribution, the points should fall approximately along this reference line. The greater the departure from this reference line, the greater the evidence for the conclusion that the two data sets have come from populations with different distributions. The QQ-plot against the exponential distribution is a very useful guide. It examines visually the hypothesis that the data come from an exponential distribution, i.e. from a distribution with a mediumsized tail. The quantiles of the empirical distribution function on the x-axis are plotted against the quantiles of the exponential distribution function on the y-axis. The plot is $$\left\{ \left( X_{k:n}, G_{0,1}^{-1}\left(\frac{n-k+1}{n+1}\right) \right), k = 1, \ldots, n \right\}$$

where $X_{k:n}$ denotes the kth order statistic, and $G_{0,1}^{-1}$ is the inverse of the d.f. of the exponential distribution (a special case of the GPD). The points should lie approximately along a straight line if the data are an i.i.d. sample from an exponential distribution.

The closeness of the curve to the diagonal straight line indicates that the distribution of our data show an exponential behaviour.

The usual caveats about the QQ-plot should be mentioned. Even data generated from an exponential distribution may sometimes show departures from typical exponential behaviour. In general, the more data we have, the clearer the message of the QQ-plot.

B. Sample Mean Excess Plot. Selecting an appropriate threshold is a critical problem with the EVS using threshold methods. Too low a threshold is likely to violate the asymptotic basis of the model; leading to bias; and too high a threshold will generate too few excesses; leading to high variance. The idea is to pick as low a threshold as possible subject to the limit model providing a reasonable approximation. Two methods are available for this: the first method is an exploratory technique carried out prior to model estimation and the second method is an assessment of the stability of parameter estimates based on the fitting of models across a range of different thresholds (Coles (2001) (b)).

The first method is a useful graphical tool which is the plot of the sample mean excess function of the distribution. If X has a GPD with parameters $\xi$ and $\sigma$, the excess over the threshold u has also a GPD and its mean excess function over this threshold is given by $$e(u) = E[X - u / X > u] = \frac{\sigma + \xi u}{1 - \xi}, \text{ for } \xi < 1. \quad (47)$$

We notice that for the GPD the mean excess function is a linear function of the threshold u. Hence, if the empirical mean excess of scores has a linear shape then a generalized Pareto might be a good statistical model for the overall distribution. However, if the mean excess plot does not have a linear shape for all the sample but is roughly linear from a certain point, then it suggests that a GPD might be used as a model for the excesses above the point where the plot becomes linear.

The sample mean plot is the plot of the points:

$$\{(u, e_n(u)), X_{1:n} < u < X_{n:n}\}$$

where $X_{1:n}$ and $X_{n:n}$ are the first and nth order statistics and $e_n(u)$ is the sample mean excess function defined by $$e_n(u) = \frac{\sum_{i=1}^{n}(X_i - u)^+}{\sum_{i=1}^{n} 1_{\{x_i > x\}}}$$

that is the sum of the excesses over the threshold u divided by the number of data points which exceed the threshold u.

The sample mean excess function $e_n(u)$ is an empirical estimate of the mean excess function which is defined in (47) as $e(u)=E[X-u/X>U]$. The mean excess function describes the expected overshoot of a threshold given that exceedance occurs.

Figure 24:
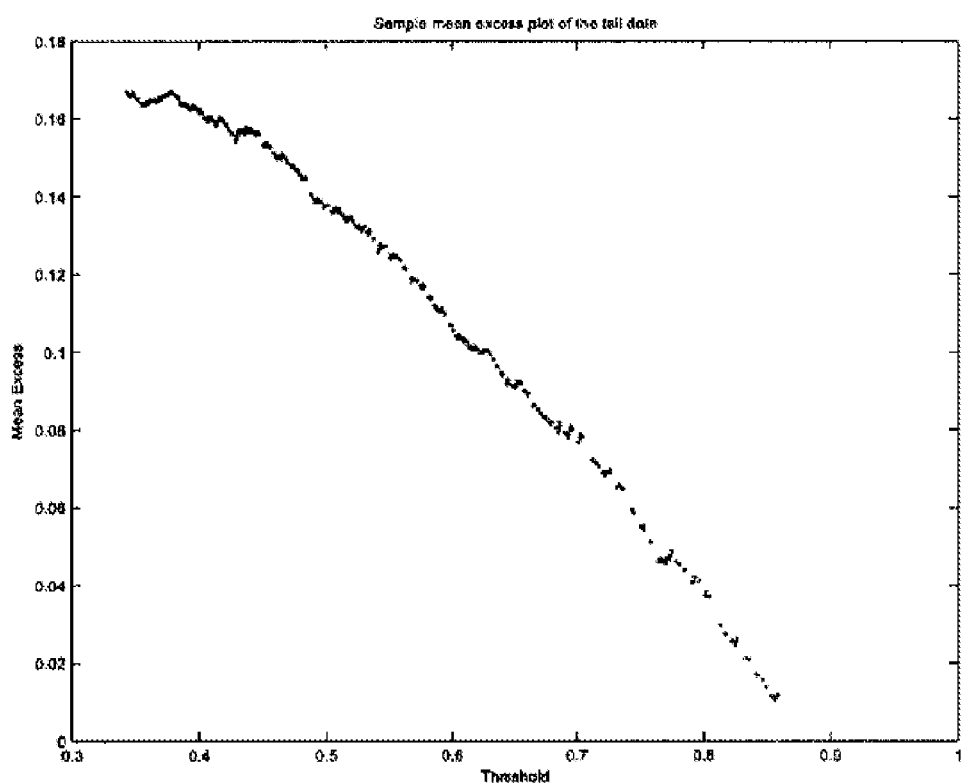
FIG. 24, which depicts a sample mean excess plot of the CUBS genuine scores.

FIG. 24 shows the sample mean excess plot of the CUBS data. The plot shows a general linear pattern. A close inspection of the plot suggests that a threshold can be chosen at the value u=0.45 which is located at the beginning of a portion of the sample mean excess plot that is roughly linear.

Figure 23:
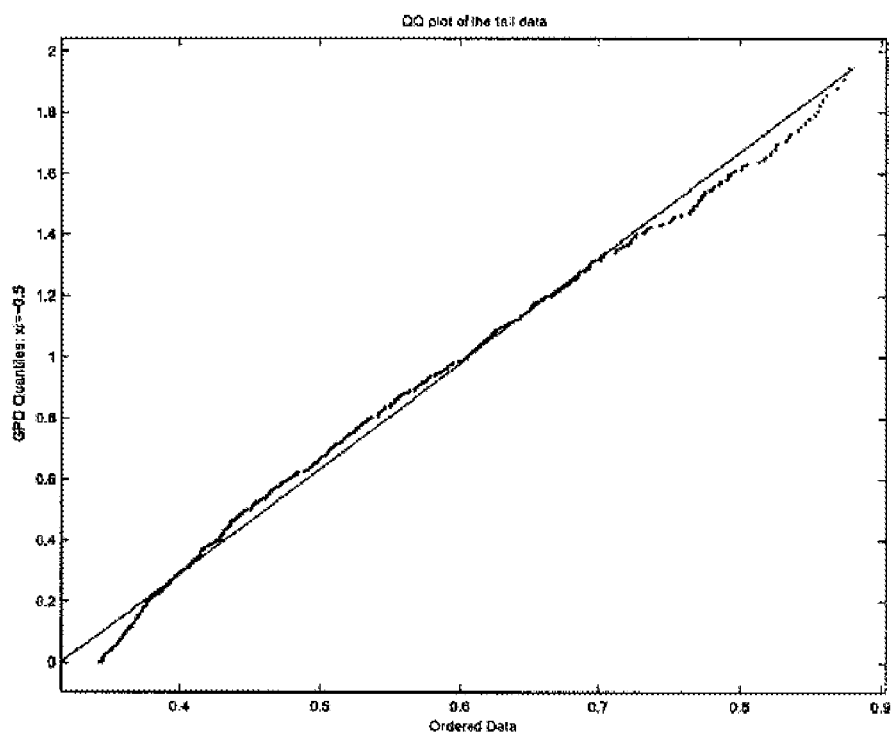
FIG. 23, which is the QQ-plot of CUBS data against the exponential distribution.

C. Maximum Likelihood Estimation. According to the theoretical results presented in the last section, we know that the distribution of the observations above the threshold in the tail should be a generalized Pareto distribution (GPD). This is confirmed by the QQ-plot in FIG. 23 and the sample mean excess plot in FIG. 24. These are different methods that can be used to estimate the parameters of the GPD. These methods include the maximum likelihood estimation, the method of moments, the method of probability-weighted moments and the elemental percentile method. For comparisons and detailed discussions about their use for fitting the GPD to data, see Hosking and Wallis (1987), Grimshaw (1993), Tajvidi (1996a), Tajvidi (1996b) and Castillo and Hadi (1997). We use the maximum likelihood estimation method.

To get the distribution density function of the GPD, we take the first derivative of the distribution function in (7)

$$\frac{dG_{\xi,\sigma}(x)}{dx} = \begin{cases} \frac{1}{\sigma}\left(1 + \frac{\xi}{\sigma}x\right)^{-\frac{1}{\xi}-1} & \text{if } \xi \neq 0, \\ \frac{1}{\sigma}e^{\frac{-x}{\sigma}} & \text{if } \xi = 0. \end{cases} \quad (48)$$

Therefore for a sample $x=\{x_1, \ldots, x_n\}$ the log-likelihood function $L(\xi,\sigma/x)$ for the GPD is the logarithm of the joint density of the n observations:

$$L(\xi, \sigma/x) = \begin{cases} -n\log\sigma - \left(\frac{1}{\xi}+1\right)\sum_{i=1}^{n}\log\left(1 + \frac{\xi}{\sigma}x_i\right) & \text{if } \xi \neq 0, \\ -n\log\sigma - \frac{1}{\sigma}\sum_{i=1}^{n}x_i & \text{if } \xi = 0. \end{cases}$$

Confidence Band Of CDF: No matter which statistical model we choose to estimate the biometric matching scores, the fundamental question is how reliable the estimation can be. The reliability ranges of the estimates or the error intervals of the estimations have to be assessed. A confidence interval is defined as a range within which a distribution $F(t_0)$ is reliably estimated by $\hat{F}(t_0)$. For example a confidence interval can be formed as $\lfloor\hat{F}(t_0)-a,\hat{F}(t_0)+a\rfloor$ so that the true distribution F at $t_0$ can be guaranteed as $F(t_0)\in\lfloor\hat{F}(t_0)-a,\hat{F}(t_0)+a\rfloor$ There are several research on confidence interval for error analysis of biometric distribution estimations. In [10] there are two approaches given for obtaining a confidence interval.

A. Reliability of a Distribution Estimated by Parametric Models. For estimating a confidence interval, first we define that $$\Gamma(X)=\hat{F}(t_0) \quad (49)$$

are the estimates of a matching score distribution at specific value $t_o$. See FIG. 25. If we define a random variable Z as the number of successes of X such that $X<t_0$ is true with probability of success $F(t_0)$=Prob $(X<t_o)$, then in M trials, the random variable Z has binomial probability mass distribution $$P(Z=z) = \binom{M}{Z}F(t_0)^z(1-F(t_0))^{M-z}, z = 0, \ldots, M \quad (50)$$

The expectation of Z,$E(Z)=MF(t_0)$ and the variance of Z,$\sigma^2(Z)=MF(t_0)(1-F(t_0))$. Therefore the random variable Z/M has expectation $E(Z/M)=F(t_0)$ and variance $\sigma^2(t_0)=F(t_0)(1-F(t_0))/M$. When M is large enough, by the law of large numbers, Z/M is distributed according to a norm distribution, i.e., $Z/M \sim N(F(t_0),\sigma(t_0))$.

From (39) it can be seen that, with M the number of match scores, the number of success $\hat{Z}=(\#X_i \leq t_0)=M\hat{F}(t_0)$. Hence for large M, $F(t_0)=\hat{Z}/M$ is norm distributed with an estimate of the variance given by $$\hat{\sigma}(t_0) = \sqrt{\frac{\hat{F}(t_0)(1-\hat{F}(t_0))}{M}} \quad (51)$$

With percentiles of the normal distribution, a confidence interval can be determined. For example, a 90% interval of confidence is $$F(t_0)\in[\hat{F}(t_0)-1.645\hat{\sigma}(t_0),\hat{F}(t_0)+1.645\hat{\sigma}(t_0)].$$

Figure 25:
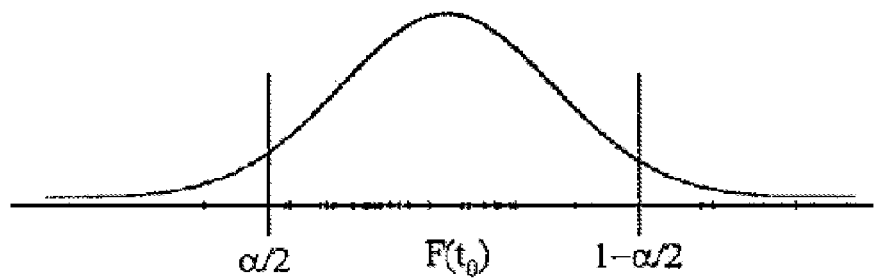
FIG. 25, which depicts the distribution of estimates $F(t_o)$.

FIG. 25 depicts $F(t_o)$.

B. Reliability of a distribution estimated by bootstrap approach. The bootstrap uses the available data many times to estimate confidence intervals or to perform hypothesis testing [10]. A parametric approach, again, makes assumptions about the shape of the error in the probability distribution estimates. A non-parametric approach makes no such assumption about the errors in $\hat{F}(t_0)$ and $\hat{G}(t_0)$.

If we have the set of match scores X, then we want to have some idea as to how much importance should be given to $\Gamma(x)=\hat{F}(t_0)$. That is, for the random variable $\hat{F}(t_0)$, we are interested in a $(1-\alpha)$ 100% confidence region for the true value of $\hat{F}(t_0)$ in the form of $$[q(\alpha/2),q(1-\alpha/2)]$$

where $q(\alpha/2)$ and $q(1-\alpha/2)$ are the $\alpha/2$ and $1-\alpha/2$ quantiles of $H_F(z)=\text{Prob}(\hat{F}(t_0)\leq z)$, where $H_F(z)$ is the probability distribution of the estimate $\hat{F}(t_0)$ and is a function of the data X.

The sample population X has empirical distribution $\hat{F}(t_0)$ defined in (39) or GPD defined in (46). It should be noted that the samples in set X are the only data we have and the distribution estimates of $\hat{F}(t_0)$ is the only distribution we have. The bootstrap proceeds, therefore, by assuming that the distribution $\hat{F}(t_0)$ is a good enough approximation of the true distribution $\hat{F}(t_0)$. To obtain samples that are distributed as $\hat{F}$ one can draw samples from the set X with replacement, i.e., putting the sample back into set X each time. Hence, any statistic, including $\Gamma(X)=\hat{F}(t_0)$, for fixed $t_0$, can be re-estimated by simply re-sampling.

The bootstrap principle prescribes sampling, with replacement, the set X a large number (B) of times, resulting in the bootstrap sets $$X\overset{*}{k}, k = 1, \ldots, B.$$

Using these sets, one can calculate the estimates $$\hat{F}\overset{*}{k}(t_0) = \Gamma\overset{*}{k}(X\overset{*}{k}), k = 1, \ldots, B.$$

Determining confidence intervals now essentially amounts to a counting exercise. One can compute (say) a 90% confidence interval by counting the bottom 5% and top 5% of the estimates $$\hat{F}\overset{*}{k}(t_0)$$

and subtracting these estimates from the total set of the estimates $$\hat{F}\overset{*}{k}(t_0).$$

Figure 26:
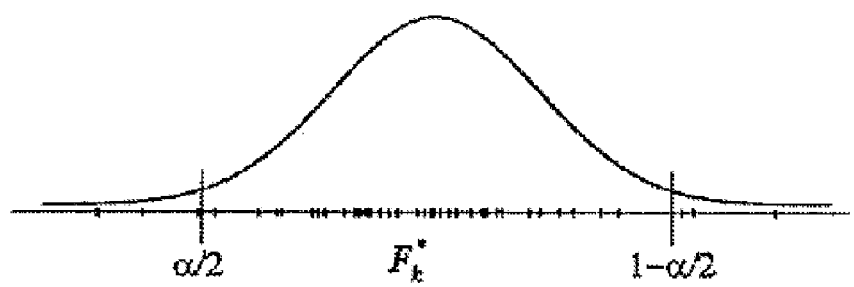
FIG. 26, which depicts the bootstrap estimates ordered in ascending order.

The leftover set determines the interval of confidence. In FIG. 26, the bootstrap estimates are ordered in ascending order and the middle 90% (the samples between | and |) determine the bootstrap interval.

In summary, with fixed $x=t_0$, what we are interested in is $F(t_0)$, but all that we can possibly do is to make an estimate $\Gamma(X)=\hat{F}(t_0)$. This estimate is itself a random variable and has distribution $H_F(Z)=\text{Prob}(\Gamma(X) \leq z)=\text{Prob}(\hat{F}(t_0) \leq z)$. We are able to determine a bootstrap confidence interval of $F(t_0)$ by sampling with replacement from X as follows:

1) Calculate the estimate $F(t_0)$ from the sample X using an estimation scheme such as (39) of empirical distribution, or (10) of GPD, of X.
2) Resampling. Create a bootstrap sample $$X^* = \{X\overset{*}{1}, \ldots, X\overset{*}{M}\}$$

by sampling X with replacement.
3) Bootstrap estimate. Calculate $$\hat{F}\overset{*}{k}(t_0)$$

from X*, again using (39) or (46).
4) Repetition. Repeat steps 2-3 B times (B large), resulting in $$\hat{F}\overset{*}{1}(t_0), \hat{F}\overset{*}{2}(t_0), \ldots, \hat{F}\overset{*}{B}(t_0).$$

The bootstrap estimate of distribution $H_F(Z)=\text{Prob}(\hat{F}(t_0) \leq z)$ is then $$H_F^*(z) = \text{Prob}(\hat{F}(t_0) \leq z) \quad (52)$$
$$= \frac{1}{B} \sum_{k=1}^{B} 1(\hat{F}_k^*(t_0) \leq z)$$
$$= \frac{1}{B}(\# \hat{F}_k^*(t_0) \leq z)$$

To construct a confidence interval for $F(t_0)$, we sort the bootstrap estimates in increasing order to obtain $$\hat{F}_{(1)}^*(t_0), \hat{F}_{(2)}^*(t_0), \ldots, \hat{F}_{(B)}^*(t_0),$$

And from (52) by construction, it follows that $$\hat{H}_F^*(z) = \hat{H}_F^*(\hat{F}_{(k)}(t_0)) = \text{Prob}(\hat{F}(t_0) \leq \hat{F}_{(k)}(t_0)) = \frac{k}{B}$$

A $(1+\alpha)$ 100% bootstrap confidence interval is $$\left[\hat{F}_{(k1)}^*(t_0), \hat{F}_{(k2)}^*(t_0)\right]$$

with $k_1=\lfloor(\alpha/2)B\rfloor$ and $k_2=\lfloor(1-\alpha/2)B\rfloor$, the integer parts of $(\alpha/2)B$ and $(1-\alpha/2)B$ (as in FIG. 26).

Confidence interval using GPD model. In this section we present a close form confidence interval for the tail estimation using Generalized Pareto Distribution. From the equation for the GPD, for a given percentile $p=G_{\epsilon,\sigma}(x)$, quantile of the generalized Pareto distribution is given in terms of the parameters by $$x(p) = \frac{\sigma}{\epsilon}((1-p)^{-\epsilon} - 1), \quad \epsilon \neq 0 \quad (53)$$
$$= -\sigma\log(1-p), \quad \epsilon = 0$$

A quantile estimator $\hat{x}(p)$ is defined by substituting estimated parameters $\epsilon$ and $\sigma$ for the parameters in (17). The variance of $\hat{x}(p)$ is given asymptotically by [12]

$$\text{Var}\hat{x}(p) \sim (s(\hat{\epsilon}))^2 \text{var}\hat{\sigma} + 2*\hat{\sigma}s(\hat{\epsilon})s'(\hat{\epsilon})\text{cov}(\hat{\epsilon},\hat{\sigma}) + \hat{\sigma}^2(s'(\hat{\epsilon}))^2 \text{var}\hat{\epsilon} \quad (54)$$

where $$s(\epsilon) = ((1-p)^{-\epsilon} - 1)/\epsilon$$

$$s'(\epsilon) = -(s(\epsilon) + (1-p)^{-\epsilon}\log(1-p))/\epsilon$$

The Fisher information matrix gives the asymptotic variance of the MLE (Smith 1984 [13]):

$$N_u \text{var}\begin{pmatrix}\hat{\epsilon} \\ \hat{\sigma}\end{pmatrix} \sim \begin{pmatrix}(1+\hat{\epsilon})^2 & \hat{\sigma}(1+\hat{\epsilon}) \\ \hat{\sigma}(1+\hat{\epsilon}) & 2\hat{\sigma}^2(1+\hat{\epsilon})\end{pmatrix}$$

Thus $$\text{var}\epsilon = (1+\hat{\epsilon})^2/N_u, \text{var}\sigma = 2\hat{\sigma}^2(1+\hat{\epsilon})/N_u, \text{ and } \text{cov}(\hat{\epsilon},\hat{\sigma}) = \hat{\sigma}(1+\hat{\epsilon})/N_u. \quad (55)$$

Substitute into (54), we have $$\text{var}\hat{x}(p) \sim \hat{\sigma}^2(1+\hat{\epsilon})(2(s(\hat{\epsilon}))^2 + 2s(\hat{\epsilon})s'(\hat{\epsilon}) + (s'(\hat{\epsilon}))^2(1+\hat{\epsilon}))/N_u \quad (56)$$

Above is considering only for the estimation of exceedances using Generalized Pareto Distribution. When we use GPD to estimate the tail part of our data, recall from (46), $$\hat{F}(x) = (1-F_n(u))G_{\epsilon,\sigma}(x-u) + F_n(u),$$

for x>u. This formula is a tail estimator of the underlying distribution F(x) for x>u, and the only additional element that we require is an estimate of F(u), the probability of the underlying distribution at the threshold [6]. Taking the empirical estimator $(n-N_u)/n$ with the maximum likelihood estimates of the parameters of the GPD we arrive at the tail estimator $$\hat{F}(x) = 1 - \frac{N_u}{n}\left(1 + \hat{\epsilon}\frac{x-u}{\hat{\sigma}}\right)^{-\frac{1}{\hat{\epsilon}}} \quad (57)$$

thus the quantile from inverse of (57) is $$\hat{x} = u + \frac{\hat{\sigma}}{\hat{\epsilon}}\left(\left(\frac{n}{N_u}(1-p)\right)^{-\hat{\epsilon}} - 1\right)$$

Compare with 53 and 56 we have $$\text{var}\hat{x}(p) \sim \hat{\sigma}^2(1+\hat{\epsilon})(2(s(\hat{\epsilon}))^2 + 2s(\hat{\epsilon})s'(\hat{\epsilon}) + (s'(\hat{\epsilon}))^2(1+\hat{\epsilon}))/N_u \quad (58)$$

where $$s(\epsilon) = (\alpha^{-\epsilon} - 1)/\epsilon$$

$$s'(\epsilon) = -(s(\epsilon) + \alpha^{-\epsilon}\log\alpha)/\epsilon$$

and $$a = \frac{n}{N^u}(1-p).$$

Finally, according to Hosking & Wallis 1987 [12], for quantiles with asymptotic confidence level α, the (1−α) 100% confidence interval is $$\hat{x} - z_{1-\frac{\alpha}{2}}\sqrt{\text{var}\hat{x}} \leq x \leq \hat{x} + z_{1-\frac{\alpha}{2}}\sqrt{\text{var}\hat{x}} \quad (59)$$

where $$z_{1-\frac{\alpha}{2}}$$

is the $$1 - \frac{\alpha}{2}$$

quantile of the standard normal distribution.

D. Confidence interval for CDF using GPD model. To build a confidence band of a ROC curve, we need the confidence band or interval for the estimated CDF. To derive the confidence interval we start from the Taylor expansion of the tail estimate (21). As a function of ε and σ, we name $$g = g(\epsilon, \sigma) = 1 - \frac{N_u}{n}\left(1 + \epsilon\frac{x-u}{\sigma}\right)^{-1/\epsilon} \quad (60)$$

The Taylor expansion around $(\hat{\epsilon}, \hat{\sigma})$ to linear terms is $$g(\epsilon, \sigma) \approx g(\hat{\epsilon}, \hat{\sigma}) + g'_\epsilon(\hat{\epsilon}, \hat{\sigma})(\epsilon - \hat{\epsilon}) + g'_\sigma(\hat{\epsilon}, \hat{\sigma})(\sigma - \hat{\sigma}) \quad (61)$$
$$= g'_\epsilon(\hat{\epsilon}, \hat{\sigma})\epsilon + g'_\sigma(\hat{\epsilon}, \hat{\sigma})\sigma + g(\hat{\epsilon}, \hat{\sigma}) - g'_\epsilon(\hat{\epsilon}, \hat{\sigma})\hat{\epsilon} - g'_\sigma(\hat{\epsilon}, \hat{\sigma})\hat{\sigma}$$

Therefore the variance of $\hat{F}(x)$ is given asymptotically by $$\begin{cases} a = g'_\epsilon(\hat{\epsilon},\hat{\sigma}) = -\frac{N_u}{n}\left(1+\frac{\hat{\epsilon}}{\hat{\sigma}}(x-u)\right)^{-\frac{1}{\hat{\epsilon}}}\left(\frac{1}{\hat{\epsilon}}\log\left(1+\frac{\hat{\epsilon}}{\hat{\sigma}}(x-u)\right) - \frac{x-u}{\hat{\epsilon}\hat{\sigma}+\hat{\epsilon}^2(x-u)}\right) \\ b = g'_\sigma(\hat{\epsilon},\hat{\sigma}) = -\frac{N_u}{n}\left(1+\frac{\hat{\epsilon}}{\hat{\sigma}}(x-u)\right)^{-\frac{1}{\hat{\epsilon}}}\frac{x-u}{\hat{\sigma}^2+\hat{\epsilon}(x-u)} \end{cases} \quad (63)$$

Substitute (19) and (27) into (26), we have the estimate of variance of the CDF. For CDF with asymptotic confidence level α, the (1−α) 100% confidence interval is $$\hat{F} - z_{1-\alpha/2}\sqrt{\text{var}\hat{F}} \leq F \leq \hat{F} + z_{1-\alpha/2}\sqrt{\text{var}\hat{F}} \quad (64)$$

where $$z_{1-\frac{\alpha}{2}}$$

is the $$1 - \frac{\alpha}{2}$$

quantile of the standard normal distribution.

Experiments

Fitting Tails with GPD

We apply the above method to fit the tails of biometric data. We have a set of fingerprint data from Ultra-scan matching system. The matching scores are separated into training sets and testing sets. In each category, there are two sets of matching scores each from authentic matchings and imposter matchings. Both training and testing imposter matching score sets contain 999000 values, and both training and testing authentic score sets contain 1000 values.

Figure 27A:
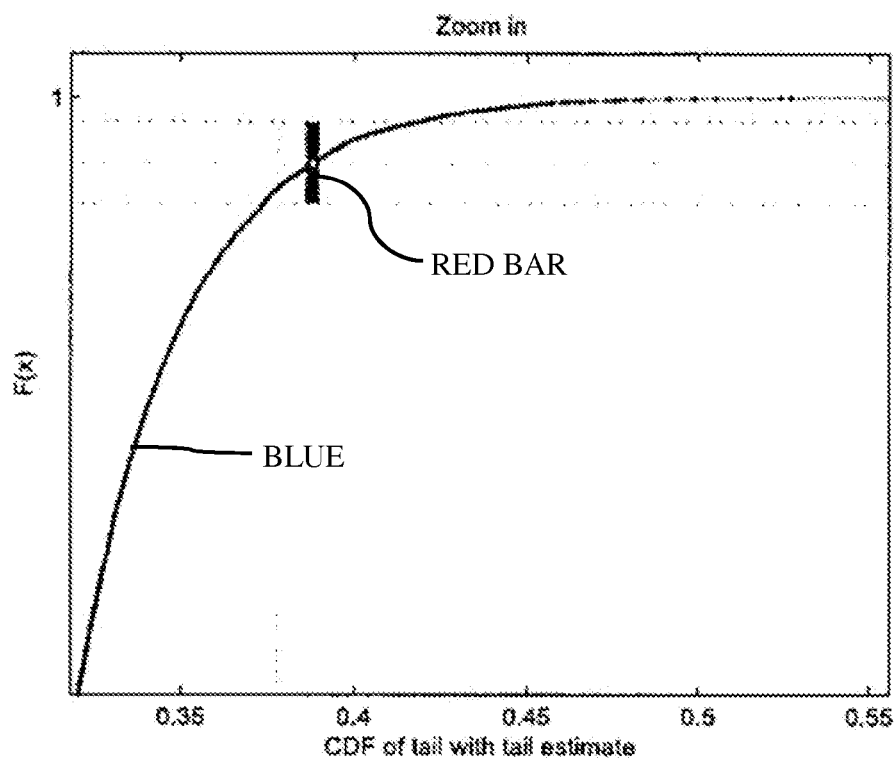
FIGS. 27A and 27B, which show GPD fit to tails of imposter data and authentic data.
Figure 27B:
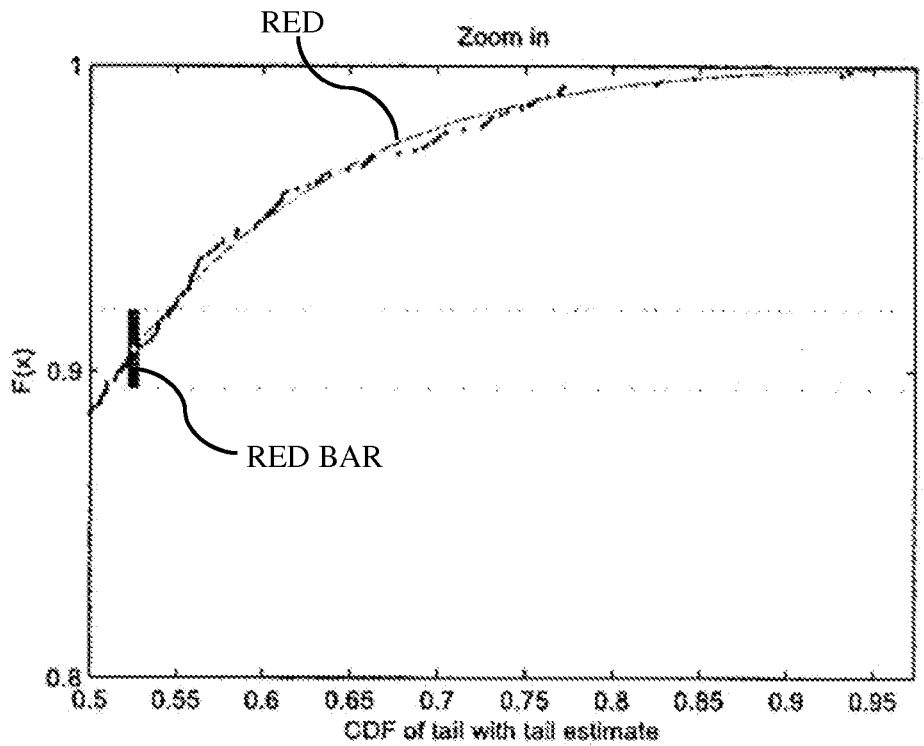

FIGS. 27A and 27B show GPD fit to tails of imposter data and authentic data. From the figure we can see that the tail estimates using GPD represented by red lines are well fitted with the real data, which are inside the empirical estimate of the score data in blue color. The data are also enclosed safely inside a confidence interval. The thick red bars are examples of confidence intervals.

Figure 28A:
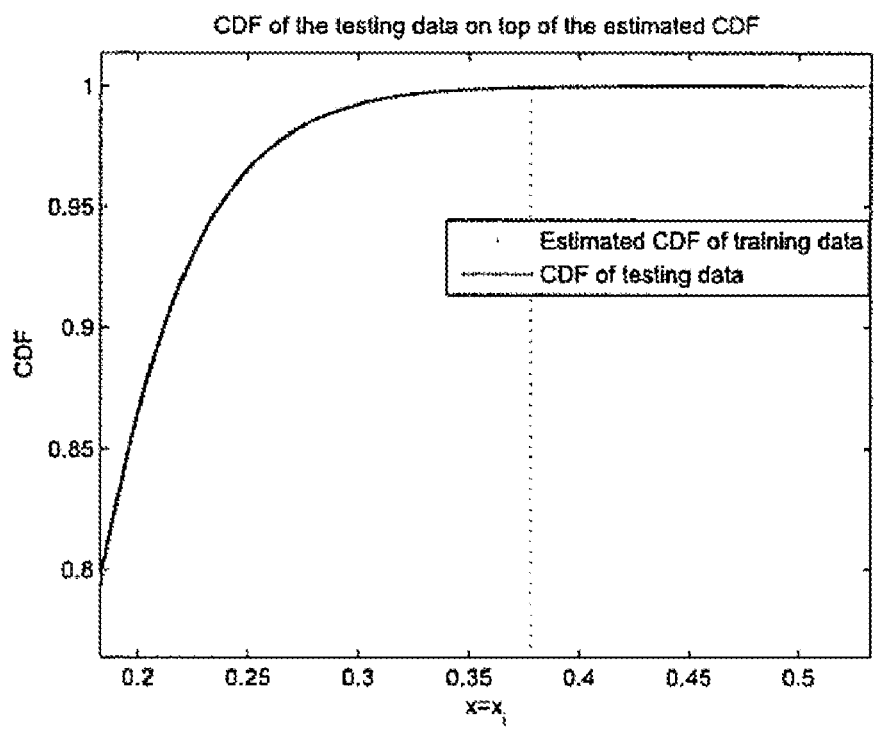
FIGS. 28A and 28B, which depict the test CDFs (in black color) are matching or close to the estimates of training CDFs.
Figure 28B:
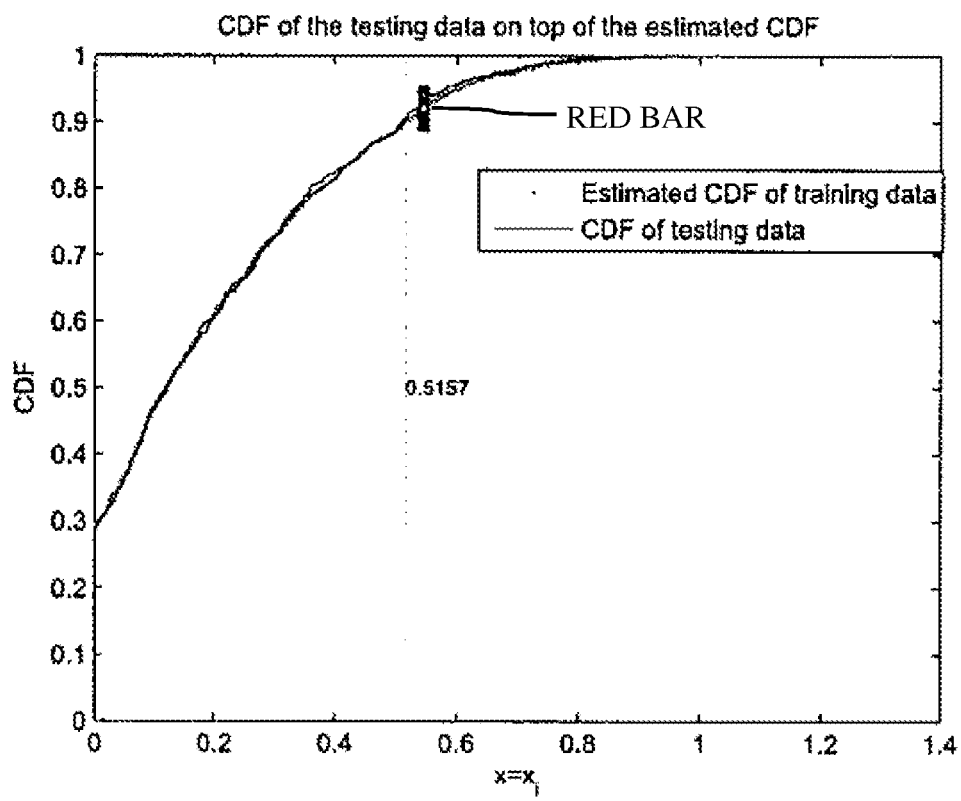

To test the fit of tail data of testing data with tail estimate of GPD using the training data, we plot the CDF of testing data on top of the CDF of training data with GPD fits to the tails. FIGS. 28A and 28B depict the test CDFs (in black color) are matching or close to the estimates of training CDFs. In FIGS. 28A and 28B, we can see that the test CDFs (in black color) are matching or close to the estimates of training CDFs. The red bars again are examples of confidence intervals. The confidence for imposter data is too small to see.

Figure 29:
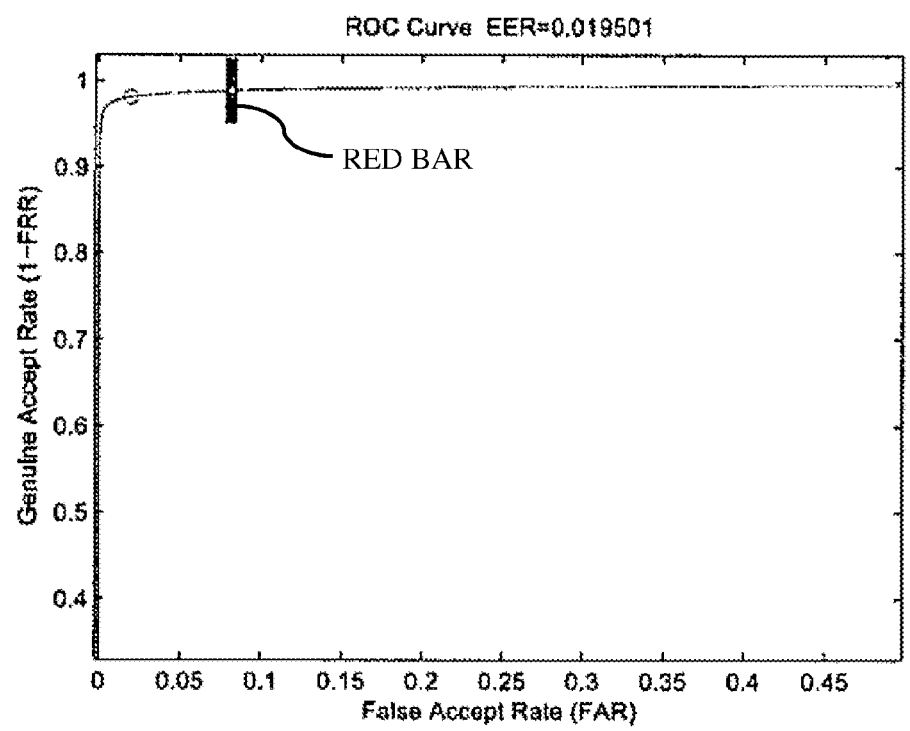
FIG. 29, which depicts an ROC with an example of confidence box. Note that the box is narrow in the direction of imposter score due to ample availability of data.

Finally, with CDF estimates available, we can build a ROC for each pair of authentic data and imposter data. Each CDF is estimated using an empirical method for the main body and GPD for the tail. At each score level there is a confidence interval calculated. For the score falling into a tail part, the confidence interval is estimated using the method in the last section for GPD. For a score value in main body part, the confidence interval is estimated using the parametric method in A. of the last section. FIG. 29 shows an ROC with an example of confidence box. Note that the box is narrow in the direction of imposter score due to ample availability of data.

Conclusions Regarding Use Of Extreme Value Theory: Extreme Value Theory (EVT) is a theoretically supported method for problems with interest in tails of probability distributions. Methods based around assumptions of normal distributions are likely to underestimate the tails. Methods based on simulation can only provide very imprecise estimates of tail distributions. EVT is the most scientific approach to an inherently difficult problem—predicting the probability of a rare event.

In this report we have introduced in general the theoretical foundation of EVT. With further investigation of biometric data from fingerprint matching of various sources, we have done an analysis in terms of feasibility of the method being used for the data—the matching scores of biometrics. Among the theoretical works, the derivation of confidence interval for GPD estimation and building of confidence band for ROC, are most important contribution to the field of research. Further, we have specifically implemented EVT tools in Matlab so that we are able to conduct all the experiments, which have confirmed the success of the application of EVT on biometric problems.

The theory, the experiment result and the implemented toolkit are useful not only for biometric system performance assessment, they are also the foundation for biometric fusion.

Algorithm for Estimating a Joint PDF Using a Gaussian Copula Model

If all the score producing recognition systems that comprise a biometric identification system were statistically independent, then it is well known that the joint pdf is a product of its marginal densities. It is almost certain that when we use multiple methods within one modality (multiple fingerprint matching algorithms and one finger) or multiple biometric features of a modality within one method (multiple fingers and one fingerprint matching algorithm, or multiple images of the same finger and one fingerprint matching algorithm) that the scores will be correlated. It is possible that different modalities are not statistically independent. For example, can we be sure that fingerprint identification scores are independent of palm print identification scores? Are they even a different modality?

Correlation leads to the "curse of dimensionality." If we cannot rule out correlation in an n-dimensional biometric system of "n" recognition systems, then to have an accurate representation of the joint pdf, which is required by our optimal fusion algorithm, we would have to store an n-dimensional array. Because each dimension can require a partition of 1000 bins or more, an "n" of four or more could easily swamp storage capacity of most computers.

Fortunately, an area of mathematical statistics known as copulas provides an accurate estimate of the joint pdf by weighting a product of the marginal densities with an n-dimensional normal distribution that has the covariance of the correlated marginals. This Gaussian copula model is derived in [1: Nelsen, Roger B., *An Introduction to Copulas*, $2^{nd}$ Edition, Springer 2006, ISBN 10-387-28659-4]. Copulas are a relatively new area of statistics; as is stated in [1], the word "copula" did not appear in the *Encyclopedia of Statistical Sciences* until 1997 and [1] is essentially the first text on the subject. The theory allows us to defeat the "curse" by storing the one-dimensional marginal densities and an n-by-n covariance matrix, which transforms storage requirements from products of dimensions to sums of dimensions, from billions to thousands.

A biometric system with "n" recognition systems that produce "n" scores $s=[s_1, s_2, \ldots, s_n]$ for each identification event has both an authentic and an impostor cdf ("cumulative distribution function") of the form $F(s_1, s_2, \ldots, s_n)$ with an n-dimensional joint density $f(s_1, s_2, \ldots, s_n)$. According to Sklar's Theorem (see [1] and [2: Duss, Sarat C., Nandakumar, Karthik, Jain, Anil K., *A Principled Approach to Score Level Fusion in Multimodal Biometric Systems*, Proceedings of AVBPA, 2005]), we can represent the density f as the product of its associated marginals, $f_i(s_i)$, for $i=1, \ldots, n$, and an n-dimensional Gaussian copula function with correlation matrix R is given by $$C_{R_{n\times n}}(x_1, x_2, \ldots, x_n) = \Phi_{R_{n\times n}}(\Phi^{-1}(x_1), \Phi^{-1}(x_2) \ldots \Phi^{-1}(x_n)) \quad (65)(1)$$

In Equation 65, $x_i \in [0,1]$ for $i=1, \ldots, n$, $\Phi$ is the cdf of the standard normal distribution and $\Phi^{-1}$ is its inverse, and $\Phi_{R_{n\times n}}$ is an n-dimensional Gaussian cdf whose arguments are the random deviates of standard normal distributions, that is they have a mean of zero and a standard deviation of unity. $\Phi_{R_{n\times n}}$ is assumed to have covariance given by R and a mean of zero. Hence the diagonal entries of R are unity, and, in general, the off diagonal entries are non-zero and measure the correlation between components.

The density of $C_{R_{n\times n}}$ is obtained by taking its $n_{th}$ order mixed partial of Equation 65:

$$C_{R_{n\times n}}(x_1, x_2 \ldots x_n) = \frac{\partial(\Phi_{R_{n\times n}}(\Phi^{-1}(x_1), \Phi^{-1}(x_2) \ldots \Phi^{-1}(x_n)))}{\partial x_1 \partial x_2 \ldots \partial x_n} \quad (2)(66)$$

$$= \frac{\phi_{R_{n\times n}}(\Phi^{-1}(x_1), \Phi^{-1}(x_2) \ldots \Phi^{-1}(x_n))}{\prod_{i=1}^{n} \phi(\Phi^{-1}(x_i))}$$

where $\phi$ is the pdf of the standard normal distribution and $\phi_{R_{n\times n}}$ is the joint pdf of $\Phi_{R_{n\times n}}$ and is n-dimensional normal distribution with mean zero and covariance matrix R. Hence, the Gaussian copula function can be written in terms of the exponential function:

$$C_{R_{n \times n}}(x) = \frac{\frac{1}{(\sqrt{2\pi})^n |R|} \exp\left(-\frac{1}{2} z^T R^{-1} z\right)}{(\sqrt{2\pi})^n \prod_{i=1}^{n} e^{-\frac{1}{2} z_i^2}} \quad (3) \quad (67)$$

$$= \frac{1}{|R|} \exp\left(-\frac{1}{2} z^T R^{-1} z + \prod_{i=1}^{n} \frac{z_i^2}{2}\right)$$

where $|R|$ is the determinant of the matrix R, $x=[x_1, x_2, \ldots, x_n]^T$ is an n-dimensional column vector (the superscript T indicates transpose), and $z=[z_1, z_2, \ldots, z_n]^T$ is an n-dimensional column vector with $z_i = \Phi^{-1}(x_i)$.

The score tuple $s=[s_1, s_2, \ldots, s_n]$ of an n-dimensional biometric identification system is distributed according to the joint pdf $f(s_1, s_2, \ldots, s_n)$. The pdf f can be either the authentic pdf, $f_{Au}$, or the impostor pdf, $f_{Im}$. The associated marginals are $f_i(s_i)$, for $i=1, \ldots, n$, which have cumulative distribution functions $F_i(s_i)$.

Sklar's Theorem guarantees the existence of a copula function that constructs multidimensional joint distributions by coupling them with the one-dimensional marginals [1][2]. In general, the Gaussian copula function in Equation 65 is not that function, but it serves as a good approximation. So, if we set $z_i = \Phi^{-1}(F_i(s_i))$ for $i=1, \ldots, n$, then we can use Equation 67 to estimate the joint density as $$f(s_1, s_2, \ldots s_n) \approx \frac{\prod_{i=1}^{n} f_i(s_i) \exp\left(-\frac{1}{2} z^T R^{-1} z + \prod_{i=1}^{n} \frac{z_i^2}{2}\right)}{|R|} \quad (4) \quad (68)$$

Equation 68 is the copula model that we use to compute the densities for the Neyman-Pearson ratio. That is, $$\lambda = \frac{f_{Au}}{f_{Im}} = \frac{\dfrac{\prod_{i=1}^{n} f_{Au_i}(s_i) \exp\left(-\frac{1}{2} z^T R_{Au}^{-1} z + \prod_{i=1}^{n} \frac{z_i^2}{2}\right)}{|R_{Au}|}}{\dfrac{\prod_{i=1}^{n} f_{Im_i}(s_i) \exp\left(-\frac{1}{2} z^T R_{Im}^{-1} z + \prod_{i=1}^{n} \frac{z_i^2}{2}\right)}{|R_{Im}|}} \quad (5) \quad (69)$$

The densities $f_{Au}$ and $f_{Im}$ are assumed to have been computed in another section using non-parametric techniques and Extreme Value Theory. To compute $R_{Au}$ and $R_{Im}$ we need two sets of scores. Let $S_{Au}$ be a simple random sample of $n_{Au}$ authentic score tuples. That is, $S_{Au} = \{s_{Au}^1, s_{Au}^2, \ldots, s''^{Au}_{Au}\}$, where $s_{Au}^i$ is a column vector of scores from the "n" recognition systems. Likewise, let $S_{Im} = \{s_{Im}^1, s_{Im}^2, \ldots, s''^{Im}_{Im}\}$ be a simple random sample of $n_{Im}$ impostor scores. We compute the covariance matrices for $S_{Au}$ and $S_{Im}$ with $$C_{Au} = \sum_{i=1}^{n_{Au}} (s_{Au}^i - \bar{s}_{Au})(s_{Au}^i - \bar{s}_{Au})^T \text{ and } C_{Im} = \sum_{i=1}^{n_{Im}} (s_{Im}^i - \bar{s}_{Im})(s_{Im}^i - \bar{s}_{Im})^T,$$

where $\bar{s}_{Au}$ and $\bar{s}_{Im}$ are the sample means of $S_{Au}$ and $S_{Im}$ respectively. As mentioned above, the diagonal entries of the associated R matrices are unity because the copula components are standard normal distributions, and the off diagonal entries are the correlation coefficients in the C matrices just computed. Recall that the correlation coefficient between the $i^{th}$ and $j^{th}$ element of C, $i \neq j$, is given by $$\rho_{ij} = \frac{\sigma_{ij}}{\sqrt{\sigma_i \sigma_j}} = \frac{C(i,j)}{\sqrt{C(i,i)C(j,j)}}.$$

So, an algorithm to compute $R_{Au}$ is:

$$R_{Au}(i,j) = \frac{C_{Au}(i,j)}{\sqrt{C_{Au}(i,i)C_{Au}(j,j)}}$$

$$R_{Au}(j,i) = R_{Au}(i,j)$$

For $i=1: n_{Au}$
  $R_{Au}(i,i) = 1$

We compute $R_{Im}$ in a similar manner.

The only remaining values to compute in Equation 69 are $z_i = \Phi^{-1}(F_i(s_i))$ for each i. There are two values to compute: $x_i = F_i(s_i)$ and then $z_i = \Phi^{-1}(x_i)$. We compute $x_i = F_i(s_i)$ by numerically computing the integral:

$$x_i = \int_{s_{min_i}}^{s_i} f_i(x) \, dx.$$

Note that $x_i = F_i(s_i)$ is the probability of obtaining a score less than $s_i$, hence $x_i \in [0,1]$. The value $z_i = \Phi^{-1}(x_i)$ is the random deviate of the standard normal distribution for which there is probability $x_i$ of drawing a value less than $z_i$, hence $x_i \in (-\infty, \infty)$. We numerically solve $z_i = \Phi^{-1}(x_i) = \sqrt{2} \text{erf}^{-1}(2x_i - 1)$, where $\text{erf}^{-1}(x)$ is the inverse error function.

Algorithm for Tail Fitting Using Extreme Value Theory

The tails of the marginal probability density function (pdf) for each biometric are important to stable, accurate performance of a biometric authentication system. In general, we assume that the marginal densities are nonparametric, that is, the forms of the underlying densities are unknown. Under the general subject area of density estimation [Reference 1: *Pattern Classification, 2nd Edition*, by Richard O. Duda, Peter E. Hart, and David G. Stork, published by John Wiley and Sons, Inc.], there are several well known nonparametric techniques, such as the Parzen-window and Nearest-Neighbor, for fitting a pdf from sample data and for which there is a rigorous demonstration that these techniques converge in probability with unlimited samples. Of course the number of samples is always limited. This problem is negligible in the body of the density function because there is ample data there, but it is a substantial problem in the tails where we have a paucity of data. Because identification and verification systems are almost always concerned with small errors, an accurate representation of the tails of biometric densities drives performance.

Our invention uses a two-prong approach to modeling a pdf from a given set of representative sample data. For the body of the density, where abundant data is available, we use well-known non-parametric techniques such as the Parzen-window. In the tail data, in the extreme is always sparse and beyond the maximum sample value it is missing. So, to estimate the tail we use results from Extreme Value Theory (EVT) (see [1: *Statistical Modeling of Biometric Systems Using Extreme Value Theory*, A USC STTR Project Report to the U.S. Army] and [2: *An Introduction to Statistical Modeling of Extreme Values*, Stuart Coles, Springer, ISBN 1852334592]), which provides techniques for predicting rare events; that is, events not included in the observed data. Unlike other methods for modeling tails, EVT uses rigorous statistical theory in the analysis of residuals to derive a family of extreme value distributions, which is known collectively as the generalized extreme value (GEV) distribution. The GEV distribution is the limiting distribution for sample extrema and is analogous to the normal distribution as the limiting distribution of sample means as explained by the central limit theorem.

As discussed in [1], the member of the GEV family that lends itself most readily to the modeling of biometric matching scores is the Generalized Pareto Distribution (GPD), given by the following cumulative distribution function (cdf)

$$G_{\xi,\sigma}(x) = \begin{cases} 1 - \left(1 + \frac{\xi}{\sigma}x\right)^{-\frac{1}{\xi}} & \text{if } \xi \neq 0, \\ 1 - e^{\frac{x}{\sigma}} & \text{if } \xi \neq 0 \end{cases} \quad (1) \quad (70)$$

where the parameter $\sigma > 0$ and $\xi$ are determined from the sample data.

Given a sample of matching scores for a given biometric, we employ the algorithmic steps explained below to determine the values for $\sigma$ and $\xi$ to be used in Equation 70, which will be used to model the tail that represents the rare event side of the pdf. In order to more clearly see what it is we are going to model and how we are going to model it, consider the densities shown in FIG. 30. The red curve is the frequency histogram of the raw data for 390,198 impostor match scores from a fingerprint identification system. The blue curve is the histogram for 3052 authentic match scores from the same system. These numbers are typical sample sizes seen in practice. In general, each biometric has two such marginal densities to be modeled, but only one side of each density will be approximated using the GPD. We need consider only the red, impostor curve in FIG. 30 for our discussion because treatment of the authentic blue curve follows in identically the same manner.

Figure 30:
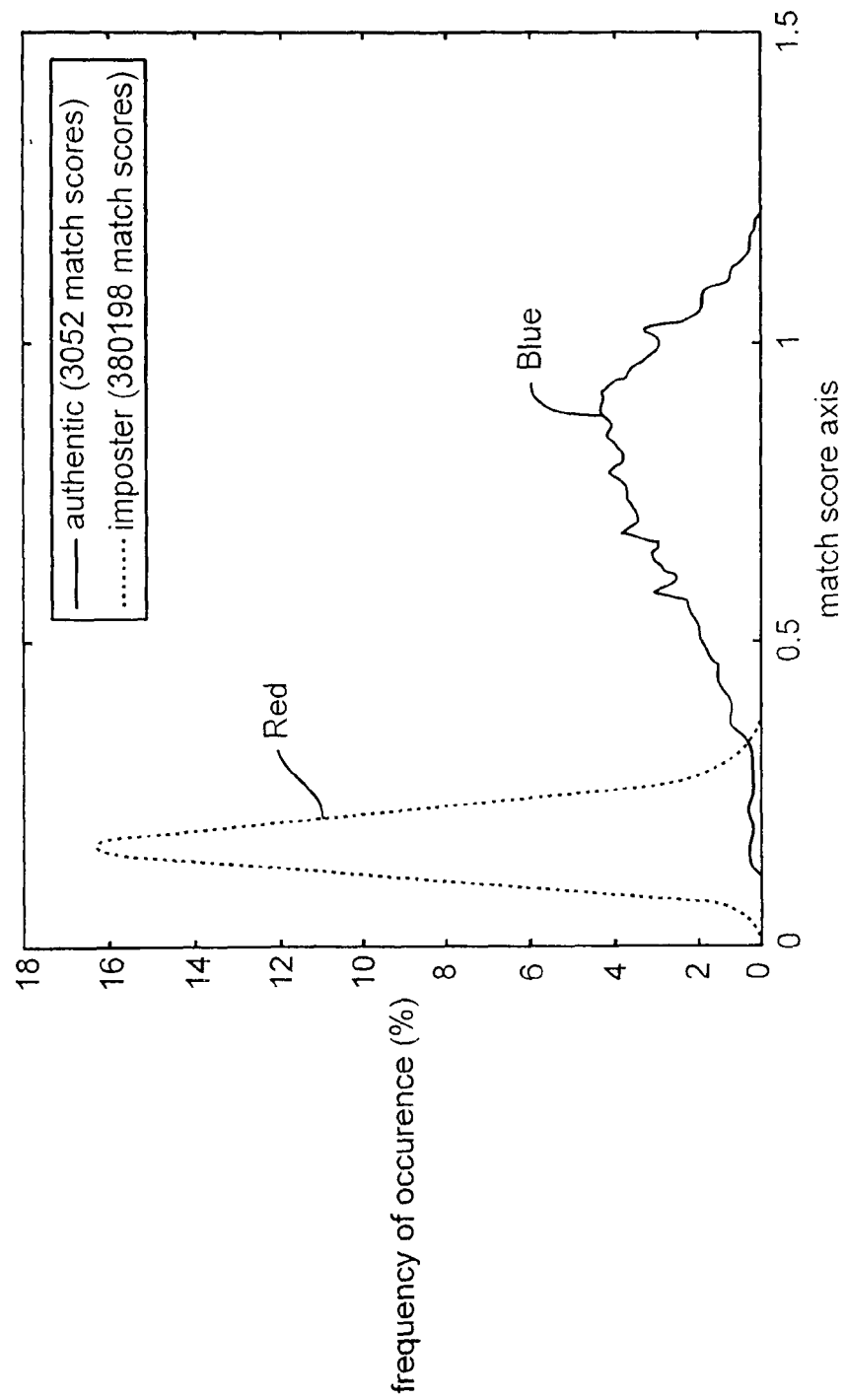
FIG. 30, which shows a red curve that is the frequency histogram of raw data for 390,198 impostor match scores from a fingerprint identification system, and shows a blue curve that is the histogram for 3052 authentic match scores from the same system.

Looking at the red curve in FIG. 30, we see that the tail decaying to the right reflects the fact that it is less and less likely that a high matching score will be observed. As a result, as we proceed to the right down the score axis we have fewer and fewer samples, and at some point depending on the sample size, we have no more sample scores. The maximum impostor score observed in our collection was 0.5697. This, of course, does not mean that the maximum score possible is 0.5697. So how likely is it that we will get a score of 0.6 or 0.65, etc.? By fitting the right-side tail with a GPD we can answer this question with a computable statistical confidence.

To find the GPD with the best fit to the tail data we proceed as follows:

Step 1: Sort the sample scores in ascending order and store in the ordered set S.

Step 2: Let $s_{t_i}$ be an ordered sequence of threshold values that partition S into body and tail. Let this sequence of threshold be uniformly spaced between $s_{t_{min}}$ and $s_{t_{max}}$. The values of $s_{t_{min}}$ and $s_{t_{max}}$ are chosen by visual inspection of the histogram of S with $s_{t_{min}}$ set at the score value in S above which there is approximately 7% of the tail data. The value for $s_{t_{min}}$ may be chosen so that the tail has at least 100 elements. For each $s_{t_i}$ we construct the set of tail values $T_i = \{s \in S : s \geq s_{t_i}\}$.

Step 3: In this step, we estimate the values of $\sigma_i$ and $\xi_i$ the parameters of the GPD, for a given $T_i$. To do this, we minimize the negative of the log-likelihood function for the GPD, which is the negative of the logarithm of the joint density of the $N_{T_i}$ scores in the tail given by $$negL(\xi_i, \sigma_i | s) = \begin{cases} N_{T_i}\ln(\sigma_i) + \left(\frac{1}{\xi_i} + 1\right)\sum_{j=i}^{N_{T_i}} \left(\ln(1 + \frac{\xi_i}{\sigma_i}s_j\right) & \text{if } \xi \neq 0 \\ N_{T_i}\ln(\sigma_i) + \frac{1}{\sigma_i}\sum_{j=1}^{N_{T_i}} s_j & \end{cases} \quad (71)$$

This is a classic minimization problem and there are well-known and well-documented numerical techniques available for solving this equation. We use the Simplex Search Method as described in [3: Lagarias, J. C., J. A. Reeds, M. H. Wright, and P. E. Wright, "Convergence Properties of the Nelder-Mead Simplex Method in Low Dimensions," SIAM Journal of Optimization, Vol. 9 Number 1, pp. 112-147, 1998.]

Step 4: Having estimated the values of $\sigma_i$ and $\xi_i$, we may now compute a linear correlation coefficient that tells us how good the fit is to the values in $T_i$. To do this we may use the concept of a QQ plot. A QQ plot is the plot of the quantiles of one probability distribution versus the quantiles of another distribution. If the two distributions are the same, then the plot will be a straight line. In our case, we would plot the set of sorted scores in $T_i$, which we call $Q_{T_i}$, versus the quantiles of the GPD with $\sigma_i$ and $\xi_i$, which is the set $$Q_{GPD} = \left\{ G_{\xi_i,\sigma_i}^{-1}\left(\frac{N_{T_i} - k + 1}{N_{T_i} + 1}\right), k = 1, \ldots, N_{T_i} \right\} \quad (72)$$

where $G_{\xi_i,\sigma_i}^{-1}$ is the inverse of the cdf given in Equation 70. If the fit is good, then a point-by-point plot $Q_{T_i}$ versus $Q_{GPD}$ will yield a straight line. From the theory of linear regression, we can measure the goodness of fit with the linear correlation coefficient given by $$r_i = \frac{N_{T_i}\sum sq - \sum s \sum q}{\sqrt{N_{T_i}\sum s^2 - (\sum s)^2}\sqrt{N_{T_i}\sum q^2 - (\sum q)^2}}, s \in Q_{T_i}, q \in Q_{GPD} \quad (73)$$

Step 5: The $G_{\xi_i,\sigma_i}$ with the maximum $r_i$ is chosen as the model for the tail of the pdf.

Step 6: The complete modeling of the pdf uses the fit from a non-parametric technique for scores up to the associated $s_{t_i}$, and for scores above $s_{t_i}$, $G_{\xi_i,\sigma_i}$ is used.

To demonstrate the power of EVT, we applied this algorithm to our "red" curve example in FIG. 30. First, a rough outline of what we did and what we observed. As mentioned earlier, there are 380,198 scores in the sample. We randomly selected 13,500 scores and used this for S to show that using EVT on approximately only 3.5% of the data available resulted in an excellent fit to the tail of all the data. In addition, we show that while the Parzen window gives a good fit for the body it is unsuitable for the tail.

Figure 31:
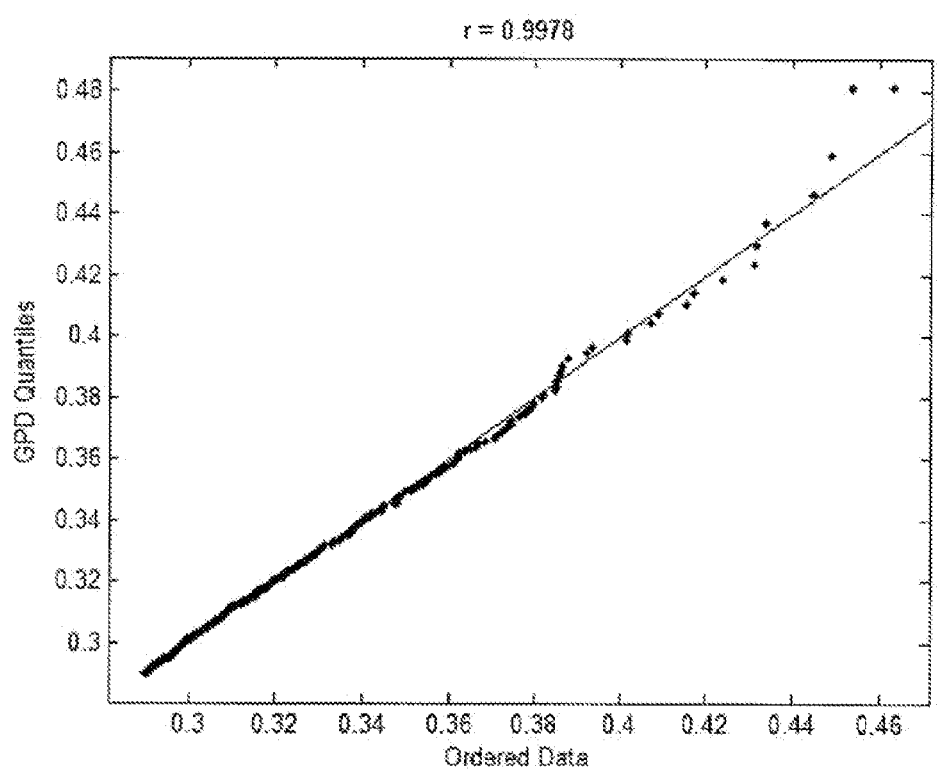
FIG. 31, which depicts the QQ-plot for the data depicted in FIG. 30.
Figure 32A:
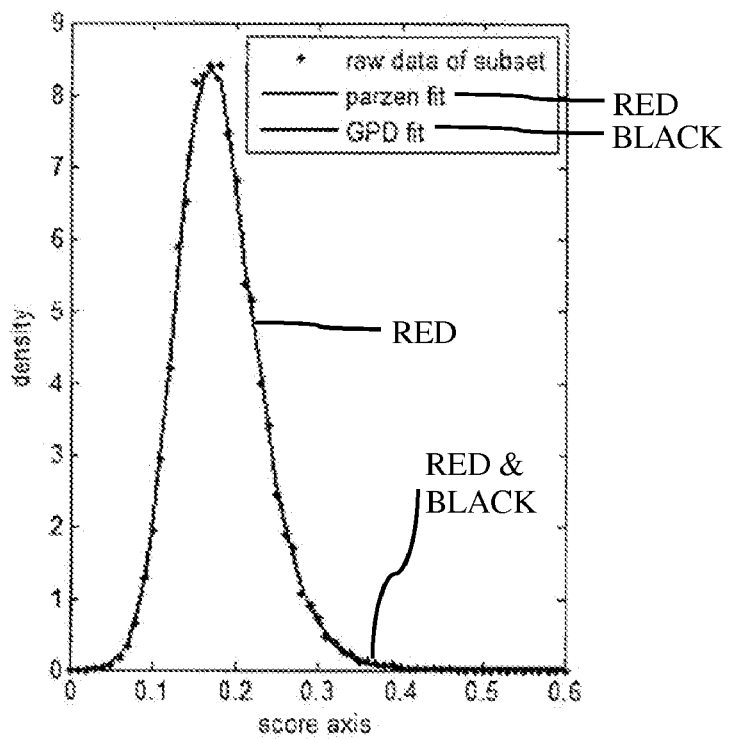
FIGS. 32A and 32B, which depict probability density functions showing the Parzen window fit and the GPD (Gaussian Probability Distribution) fit.
Figure 32B:
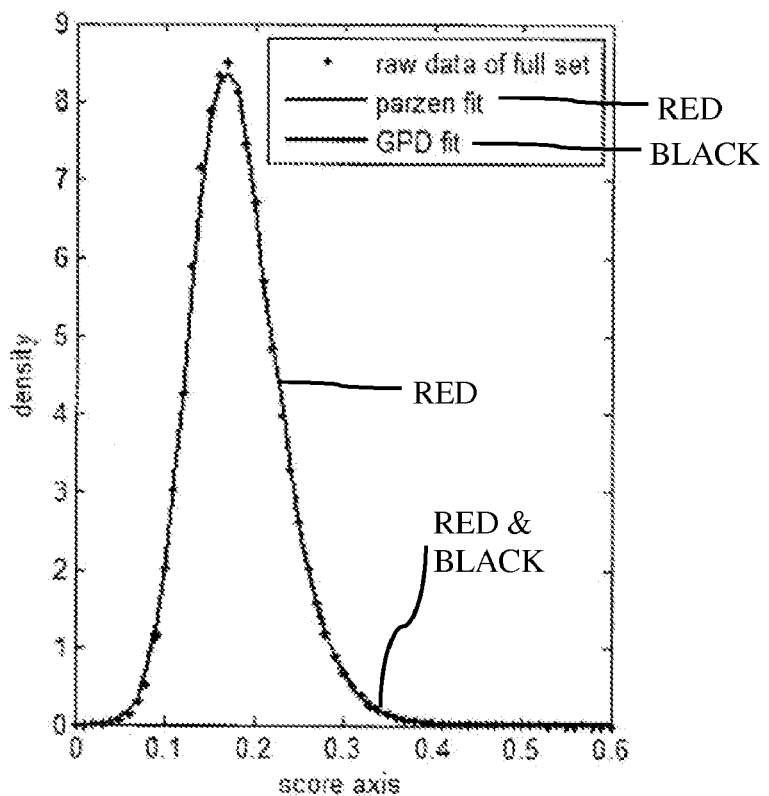
Figure 33A:
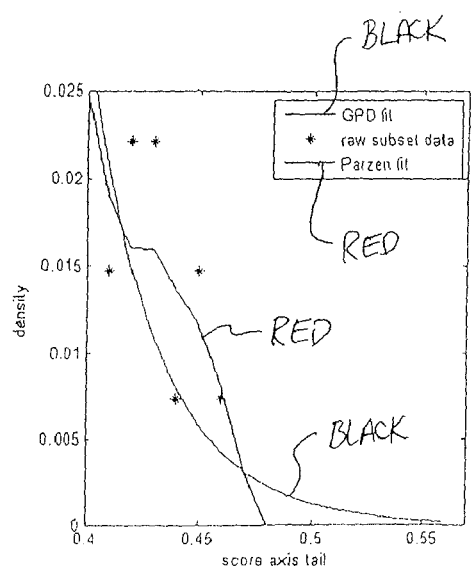
FIGS. 33A and 33B, which are enlarged views of the right-side tail sections of FIGS. 32A and 32B respectively.
Figure 33B:
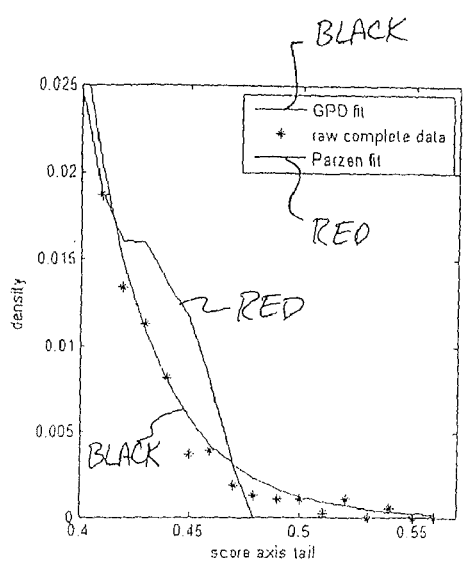

In Steps 1 through 4 above, we have the best fit with, $s_{t_i}=0.29$, $N_{t_i}=72$, $r_i=0.9978$, $\sigma_i=0.0315$, and $\xi_i=0.0042$. The QQ plot is shown in FIG. 31 revealing an excellent linear fit. In FIGS. 32A and 32B it appears that the Parzen window and GPD models provide a good fit to both the subset of scores (left-hand plot) and the complete set of scores (right-hand plot). However, a closer look at the tails tells the story. In the left-side of FIGS. 33A and 33B, we have zoomed in on the tail section and show the GPD tail-fit in the black line, the Parzen window fit in red, and the normalized histogram of the raw subset data in black dots. As can be seen, both the Parzen fit and the GPD fit look good but they have remarkably different shapes. Both the Parzen fit and the raw data histogram vanishes above a score of approximately 0.48. The histogram of the raw data vanishes because the maximum data value in the subset is 0.4632, and the Parzen fit vanishes because it does not have a mathematical mechanism for extrapolating beyond the observed data. Because extrapolation is the basis of the GPD, and as you can see, the GPD fit continues on. We appeal to the right-side of FIGS. 33A and 33B where we repeat the plot on the left but replace the histogram of the subset data with the histogram of the complete data of 380,198 points. The GPD has clearly predicted the behavior of the complete set of sampled score data.

With the foregoing disclosure in mind, the present invention may be embodied as a method of deciding whether to accept a specimen. For example, a specimen may include two or more biometrics, such as two fingerprints, two iris scans, or a combination of different biometrics, such as a fingerprint and an iris scan. In order to determine whether the specimen is from a particular individual, a dataset of samples may be provided. The data set may have information pieces about objects, each object having a number of modalities, the number being at least two. The modalities may be information about two biometrics that were previously enrolled. The invention may be used to determine whether it is likely that the specimen matches an object in the dataset.

Each object in the dataset may include information corresponding to at least two biometric samples that were previously taken from an individual. The information pieces may be scores describing features of the biometric samples. For example, the scores may be provided by a biometric reader device.

Since such datasets can be very large, it would be useful to identify those objects in the dataset that are more likely to correspond to the specimen, and then make a comparison between the specimen and those objects, rather than the entire dataset. Those objects in the dataset that are more likely to correspond to the specimen are referred to herein as the Cn index set. If a match is determined to exist between Cn and the specimen, then the specimen may be deemed to be like one of the objects in the dataset. But if a match between Cn and the specimen is determined not to exist, then the specimen may be deemed to be unlike any of the objects in the dataset. In so doing, the size (and cost) of a computer needed to determine whether or not a specimen matches the samples having objects in the dataset is reduced, and the amount of time needed to determine such a match (or not) is reduced.

Figure 34:
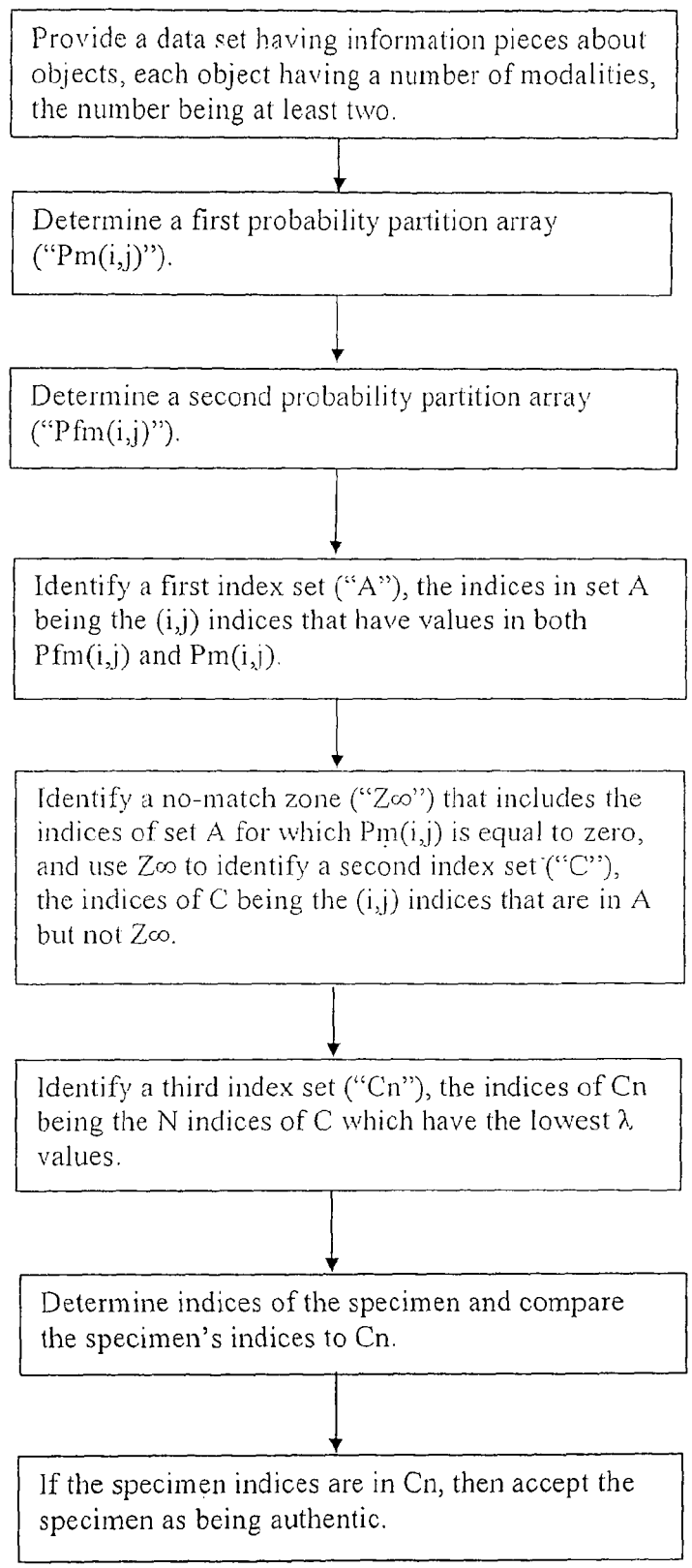
FIG. 34 depicts a method according to the invention.

FIG. 34 illustrates one method according to the invention, a first probability partition array ("Pm(i,j)") may be determined. The Pm(i,j) may be comprised of probability values for information pieces in the data set. Each probability value in the Pm(i,j) may correspond the probability of an authentic match.

With respect to the phrase "(i,j)", it should be noted that "i" and "j" each represent a particular modality. The number of modalities in the partition array is at least two, but may be more than two. Although the phrase "(i,j)" refers to only two modalities, it is intended that the phrase "(i,j)" refers not only to the situation in which there are two modalities, but also to a larger set of modalities i, j, k, l, m, etc., as the case may be. These, although the phrase "(i,j)" is used herein, it is understood that this phrase is intended to refer to two or more modalities, and the invention is not limited to the instance in which only two modalities are present.

Then a second probability partition array ("Pfm(i,j)") may be determined. The Pfm(i,j) may be comprised of probability values for information pieces in the data set, each probability value in the Pfm(i,j) may correspond to the probability of a false match.

The Pfm(i,j) may be similar to a Neyman-Pearson Lemma probability partition array. Further, the Pm(i,j) may be similar to a Neyman-Pearson Lemma probability partition array.

Then the method may be executed so as to identify a first index set ("A"). The indices in set A may be the (i,j) indices that have values in both Pfm(i,j) and Pm(i,j). A no-match zone ("Z∞") may be identified. The Z∞ may include the indices of set A for which Pm(i,j) is equal to zero, and use Z∞ to identify a second index set ("C"), the indices of C being the (i,j) indices that are in A but not Z∞.

Next, a third index set ("Cn") may be identified. The indices of Cn may be the N indices of C which have the lowest λ values. The λ value may equal $$\frac{P_{fm}(i,j)_k}{P_m(i,j)_k},$$

where N is a number for which the following is true:

$$FAR_{Z_\infty \cup C_N} = 1 - \Sigma_{(i,j) \in Z_\infty} P_{fm}(i,j) - \Sigma_{(i,j) \in C_N} P_{fm}(i,j) \leq FAR$$

where FAR is the false acceptance rate that is acceptable.

Once indices of the specimen are determined, they may be compared to Cn, and if the specimen indices are in Cn, then a decision may be made to accept the specimen as being authentic, that is a decision may be made that the specimen is like a sample in the dataset. In addition, or alternatively, if the indices of the specimen are not in Cn, then a decision may be made to reject the specimen as being not authentic, that is a decision may be made that the specimen is not like a sample in the dataset.

Cn may be identified by arranging the (i,j) indices of C such that $$\frac{P_{fm}(i,j)_k}{P_m(i,j)_k} >= \frac{P_{fm}(i,j)_{k+1}}{P_m(i,j)_{k+1}}$$

to provide an arranged C index. The first N indices (i,j) of the arranged C index may be identified as being in Cn.

Figure 35:
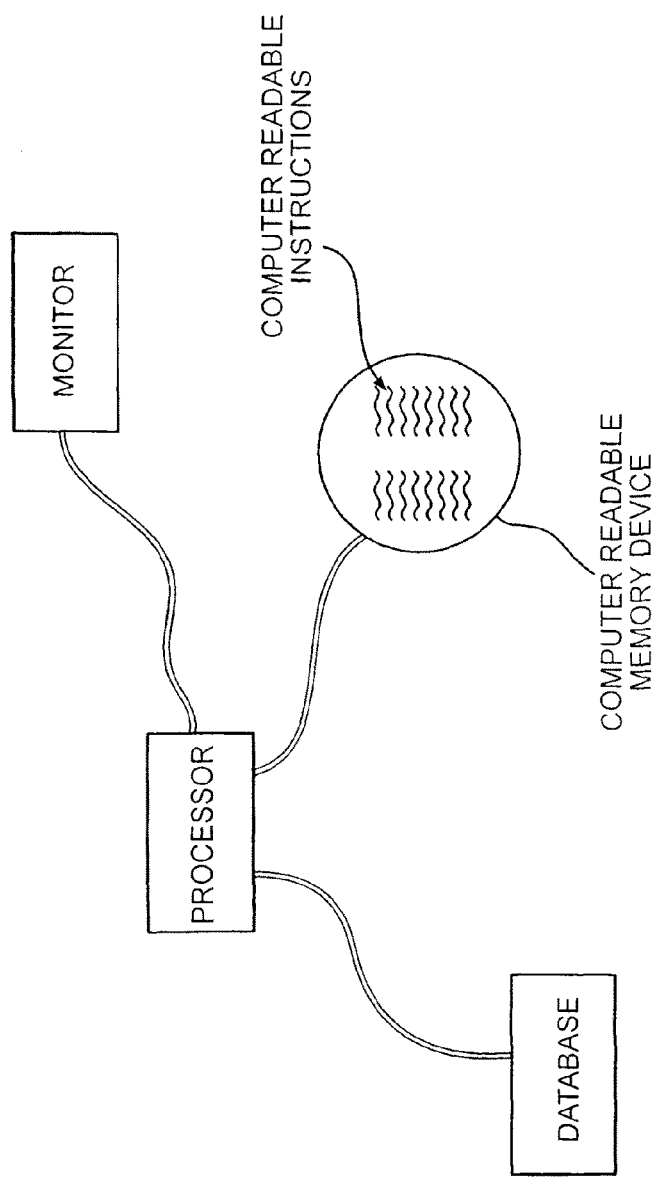
FIG. 35 depicts a computer readable memory device according to the invention.

The invention also may be implemented as a computer readable memory device having stored thereon instructions that are executable by a computer to carry out the method described above. FIG. 35 depicts one such memory device. The memory device may be used to decide whether to accept or reject a specimen. The instructions may cause a computer to:

provide a data set having information pieces about objects, each object having a number of modalities, the number being at least two:

determine a first probability partition array ("Pm(i,j)") the Pm(i,j, etc.) being comprised of probability values for information pieces in the data set, each probability value in the Pm(i,j) corresponding to the probability of an authentic match;

determine a second probability partition array ("Pfm(i,j)"), the Pfm(i,j) being comprised of probability values for information pieces in the data set, each probability value in the Pfm(i,j) corresponding to the probability of a false match;

identify a first index set ("A"), the indices in set A being the (i,j) indices that have values in both Pfm(i,j) and Pm(i,j);

identify a no-match zone ("Z∞") that includes the indices of set A for which Pm(i,j) is equal to zero, and used Z∞ to identify a second index set ("C"), the indices of C being the (i,j) indices that are in A but not Z∞;

identify a third index set ("Cn"), the indices of Cn being the N indices of C which have the lowest λ values, where λ equals $$\frac{P_{fm}(i,j)_k}{P_m(i,j)_k},$$

where N is a number for which the following is true:

$$FAR_{Z_\infty \cup C_N} = 1 - \Sigma_{(i,j) \in Z_\infty} P_{fm}(i,j) - \Sigma_{(i,j) \in C_N} P_{fm}(i,j) \leq FAR$$

determine indices of the specimen and compare the specimen's indices to Cn; and if the specimen indices are in Cn, then accept the specimen as being authentic.

The memory device may include instructions for causing the computer to identify Cn by arranging the (i,j) indices of C such that $$\frac{P_{fm}(i,j)_k}{P_m(i,j)_k} >= \frac{P_{fm}(i,j)_{k+1}}{P_m(i,j)_{k+1}}$$

to provide an arranged C index, and identifying the first N indices (i,j) of the arranged C index as being in Cn.

The memory device may include instructions for causing the computer to reject the specimen as being not authentic if the specimen indices are not in Cn.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

REFERENCES

[1] Duda R O, Hart P E, Stork D G, *Pattern Classification*, John Wiley & Sons, Inc., New York, N.Y., 2nd edition, 2001, ISBN 0-471-05669-3.

[2] Lindgren B W, *Statistical Theory*, Macmillan Publishing Co., Inc., New York, N.Y., 3rd edition, 1976, ISBN 0-02-370830-1.

[3] Neyman J and Pearson E S, "On the problem of the most efficient tests of statistical hypotheses," *Philosophical Transactions of the Royal Society of London*, Series A, Vol. 231, 1933, pp. 289-237.

[4] Jain A K, et al, *Handbook of Fingerprint Recognition*, Springer-Verlag New York, Inc., New York, N.Y., 2003, ISBN 0-387-95431-7

[5] Jain A K, Prabhakar S, "Decision-level Fusion in Biometric Verification", 2002.

[6] E. P. Rood and A. K. Jain, "Biometric research agenda," in *Report of the NSF Workshop*, vol. 16, Apr. 30-May 2, 2003, Morgantown, W. Va., pp. 38-47.

[7] S. J. Roberts, "Extreme value statistics for novelty detection in biomedical signal processing," in *IEEE Proceedings in Science, Technology and Measurement*, vol. 147, 2000, pp. 363-367.

[8] B. W. Silverman, *Density Estimation for Statistics and Data Analysis*. Chapman and Hall, 1986.

[9] S. J. Roberts, "Novelty detection using extreme value statistics, iee proc. on vision," *Image and Signal Processing*, vol. 146, no. 3, pp. 124-129, 1999.

[10] —, "Extreme value statistics for novelty detection in biomedical signal processing," in *Proc. 1st International Conference on Advances in Medical Signal and Information Processing*, 2002, pp. 166-172.

[11] A. J. McNeil, "Extreme value theory for risk managers," in *Internal Modeling and CAD II*. RISK Books, 1999.

[12] —, "Estimating the tails of loss severity distributions using extreme value theory." ASTIN Bulletin, 1997, vol. 27.

[13] H. Sohn, D. W. Allen, K. Worden, and C. R. Farrar, "Structural damage classification using extreme value statistics," in *ASME Journal of Dynamic Systems, Measurement, and Control*, vol. 127, no. 1, pp. 125-132.

[14] M. Golfarelli, D. Maio, and D. Maltoni, "On the error-reject trade-off in biometric verification systems," *IEEE Trans. Pattern Analysis and Machine Intelligence*, vol. 19, no. 7, pp. 786-796, 1997.

[15] R. M. Bolle, N. K. Ratha, and S. Pankanti, "Error analysis of pattern recognition systems—the subsets bootstrap," *Computer Vision and Image Understanding*, no. 93, pp. 1-33, 2004.

[16] S. C. Dass, Y. Zhu, and A. K. Jain, "Validating a biometric authentication system: Sample size requirements," *Technical Report MSU-CSE*-05-23, Computer Science and Engineering, Michigan State University, East Lansing, Michigan, 2005.

[17] J. R. M. Hosking and J. R. Wallis, "Parameter and quantile estimation for the generalized pareto distribution," *Technometrics*, vol. 29, pp. 339-349, 1987.

[18] R. Smith, "Threshold methods for sample extremes," in *Statistical Extremes and Applications*, T. de Oliveria, Ed. Dordrecht: D. Reidel, 1984, pp. 621-638.

What is claimed is:

1. A method of deciding whether to accept a specimen, comprising:

provide a data set having information pieces about objects, each object having a number of modalities, the number being at least two;

determine a first probability partition array ("Pm(i,j)"), the Pm(i,j) being comprised of probability values for information pieces in the data set, each probability value in the Pm(i,j) corresponding to the probability of an authentic match;

determine a second probability partition array ("Pfm(i,j)"), the Pfm(i,j) being comprised of probability values for information pieces in the data set, each probability value in the Pfm(i,j) corresponding to the probability of a false match;

identify a first index set ("A"), the indices in set A being the (i,j) indices that have values in both Pfm(i,j) and Pm(i,j);

identify a no-match zone ("Z∞") that includes the indices of set A for which Pm(i,j) is equal to zero, and use Z∞ to identify a second index set ("C"), the indices of C being the (i,j) indices that are in A but not Z∞;

identify a third index set ("Cn"), the indices of Cn being the N indices of C which have the lowest λ values, where λ equals $$\frac{P_{fm}(i,j)_k}{P_m(i,j)_k},$$

where N is a number for which the following is true:

$$FAR_{Z_\infty \cup C_N} = 1 - \Sigma_{(i,j) \in Z_\infty} P_{fm}(i,j) - \Sigma_{(i,j) \in C_N} P_{fm}(i,j) \leq FAR$$

determine indices of the specimen and compare the specimen's indices to Cn; and if the specimen indices are in Cn, then accept the specimen as being authentic.

2. The method of claim 1, wherein identifying Cn includes:
arranging the (i,j) indices of C such that $$\frac{P_{fm}(i,j)_k}{P_m(i,j)_k} >= \frac{P_{fm}(i,j)_{k+1}}{P_m(i,j)_{k+1}}$$

to provide an arranged C index;
identifying the first N indices (i,j) of the arranged C index as being in Cn.

3. The method of claim 1, wherein if the specimen indices are not in Cn, then reject the specimen as being not authentic.

4. The method of claim 1, wherein Pfm(i,j) is similar to a Neyman-Pearson Lemma probability partition array.

5. The method of claim 1, wherein Pm(i,j) is similar to a Neyman-Pearson Lemma probability partition array.

6. The method of claim 1, wherein each object includes information corresponding to at least two biometric samples taken from an individual.

7. The method of claim 6, wherein the information pieces are scores describing features of the biometric samples.

8. The method of claim 7, wherein at least one of the scores is provided by a biometric reader device.

9. A computer readable memory device having stored thereon instructions that are executable by a computer to decide whether to accept a specimen, the instructions causing a computer to:

provide a data set having information pieces about objects, each object having a number of modalities, the number being at least two:

determine a first probability partition array ("Pm(i,j)"), the Pm(i,j) being comprised of probability values for information pieces in the data set, each probability value in the Pm(i,j) corresponding to the probability of an authentic match;

determine a second probability partition array ("Pfm(i,j)"), the Pfm(i,j) being comprised of probability values for information pieces in the data set, each probability value in the Pfm(i,j) corresponding to the probability of a false match;

identify a first index set ("A"), the indices in set A being the (i,j) indices that have values in both Pfm(i,j) and Pm(i,j);

identify a no-match zone ("Z∞") that includes the indices of set A for which Pm(i,j) is equal to zero, and use Z∞ to identify a second index set ("C"), the indices of C being the (i,j) indices that are in A but not Z∞;

identify a third index set ("Cn"), the indices of Cn being the N indices of C which have the lowest λ values, where λ equals $$\frac{P_{fm}(i,j)_k}{P_m(i,j)_k},$$

where N is a number for which the following is true:

$$FAR_{Z_\infty \cup C_N} = 1 - \Sigma_{(i,j) \in Z_\infty} P_{fm}(i,j) - \Sigma_{(i,j) \in C_N} P_{fm}(i,j) \leq FAR$$

determine indices of the specimen and compare the specimen's indices to Cn; and if the specimen indices are in Cn, then accept the specimen as being authentic.

10. The memory device of claim 9, wherein identifying Cn includes:
arranging the (i,j) indices of C such that $$\frac{P_{fm}(i,j)_k}{P_m(i,j)_k} >= \frac{P_{fm}(i,j)_{k+1}}{P_m(i,j)_{k+1}}$$

to provide an arranged C index;
identifying the first N indices (i,j) of the arranged C index as being in Cn.

11. The memory device of claim 9, wherein if the specimen indices are not in Cn, then the computer is instructed to reject the specimen as being not authentic.

12. The memory device of claim 9, wherein Pfm(i,j) is similar to a Neyman-Pearson Lemma probability partition array.

13. The memory device of claim 9, wherein Pm(i,j) is similar to a Neyman-Pearson Lemma probability partition array.

14. The memory device of claim 9, wherein each object includes information corresponding to at least two biometric samples taken from an individual.

15. The memory device of claim 14, wherein the information pieces are scores describing features of the biometric samples.

16. The memory device of claim 15, wherein at least one of the scores is provided by a biometric reader device.

* * * * *